United States Patent
Miyase

(10) Patent No.: US 10,971,313 B2
(45) Date of Patent: Apr. 6, 2021

(54) SWITCH DEVICE

(71) Applicant: Valeo Japan Co., Ltd., Saitama (JP)

(72) Inventor: Yasuo Miyase, Tokyo (JP)

(73) Assignee: Valeo Japan Co., Ltd.

( * ) Notice: Subject to any disclaimer, the term of this patent is extended or adjusted under 35 U.S.C. 154(b) by 0 days.

(21) Appl. No.: 16/590,370

(22) Filed: Oct. 1, 2019

(65) Prior Publication Data

US 2020/0105483 A1 Apr. 2, 2020

(30) Foreign Application Priority Data

Oct. 2, 2018 (JP) .............................. JP2018-187653

(51) Int. Cl.
*H01H 3/14* (2006.01)
*H01H 3/38* (2006.01)
*H01H 9/02* (2006.01)
*H01H 1/36* (2006.01)

(52) U.S. Cl.
CPC ................ *H01H 3/14* (2013.01); *H01H 3/38* (2013.01); *H01H 9/02* (2013.01); *H01H 1/36* (2013.01); *H01H 2221/058* (2013.01); *H01H 2231/026* (2013.01)

(58) Field of Classification Search
CPC .. H01H 3/14; H01H 3/38; H01H 9/02; H01H 1/36; H01H 2221/058; H01H 2231/026; H01H 13/16; H01H 2003/167; H01H 3/161; H01H 13/18; H01H 1/44; H01H 3/32; H01H 3/50; B60T 2220/04; B60T 7/042; B60T 17/22; B60Q 1/441

USPC .............................................. 200/61.89, 86.5
See application file for complete search history.

(56) References Cited

U.S. PATENT DOCUMENTS

| 7,807,936 | B2 * | 10/2010 | Kim | ......................... | G05G 1/30 |
| | | | | | 200/61.89 |
| 2003/0111328 | A1 * | 6/2003 | Kasakawa | .............. | H01H 3/166 |
| | | | | | 200/86.5 |
| 2004/0051377 | A1 | 3/2004 | Stringos | | |
| 2009/0152080 | A1 * | 6/2009 | Kim | ........................ | B60T 17/22 |
| | | | | | 200/61.89 |

FOREIGN PATENT DOCUMENTS

JP 4276835 B2 6/2009

* cited by examiner

*Primary Examiner* — Anthony R Jimenez
*Assistant Examiner* — Lheiren Mae A Caroc
(74) *Attorney, Agent, or Firm* — Fishman Stewart PLLC

(57) ABSTRACT

A switch device may include a rod movable in association with an operation of a brake pedal, a main body case in which one end side of the rod is disposed, a movable board disposed in the main body case, and a connecting mechanism configured to connect the rod and the movable board. The movable board may be displaceable via the movement of the rod such that a movable contact point of the movable board is in contact with or separate from a fixed contact point. The connecting mechanism may include a protruding portion radially protruding from the rod, and a wall portion provided in the movable board. After pushing the rod into the main body case by a predetermined length, a tooth portion disposed on the protruding portion may mesh with a tooth portion disposed on the wall portion connecting the rod and the movable board.

20 Claims, 48 Drawing Sheets

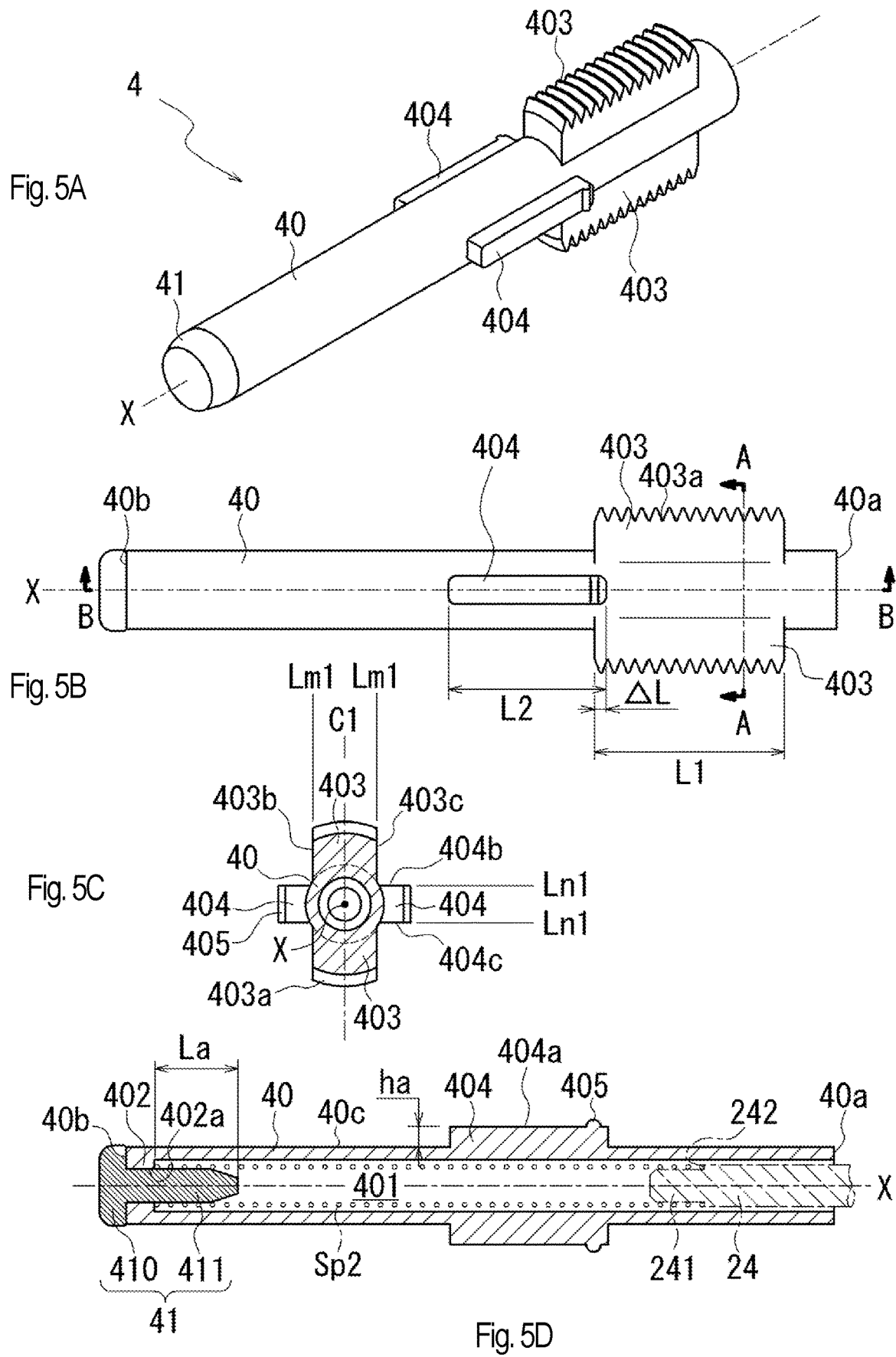

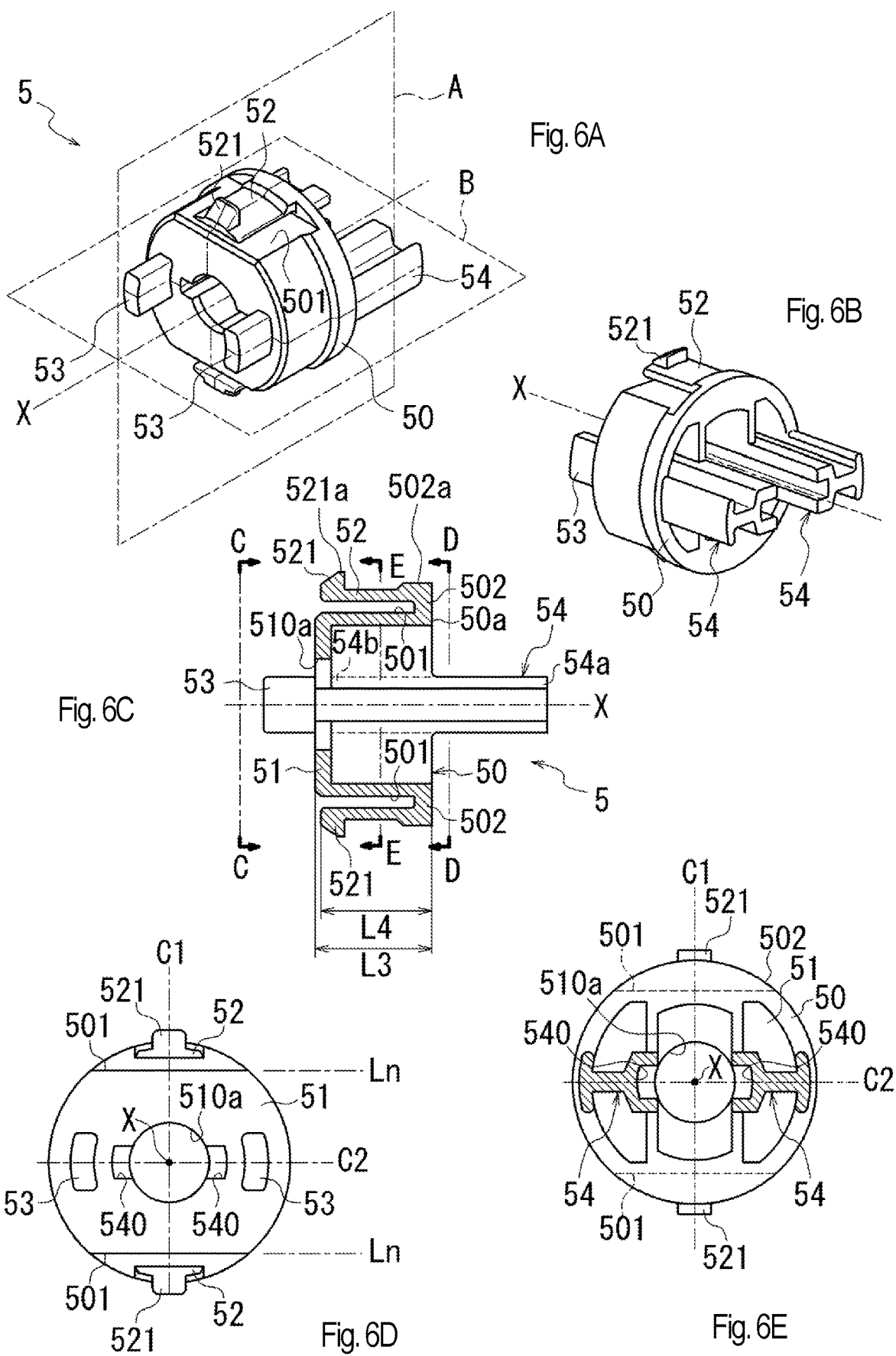

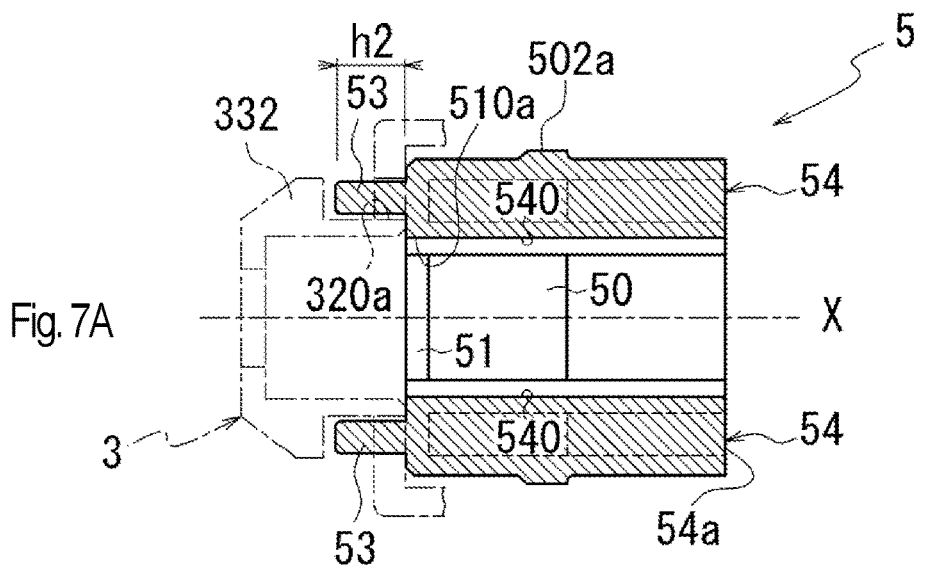
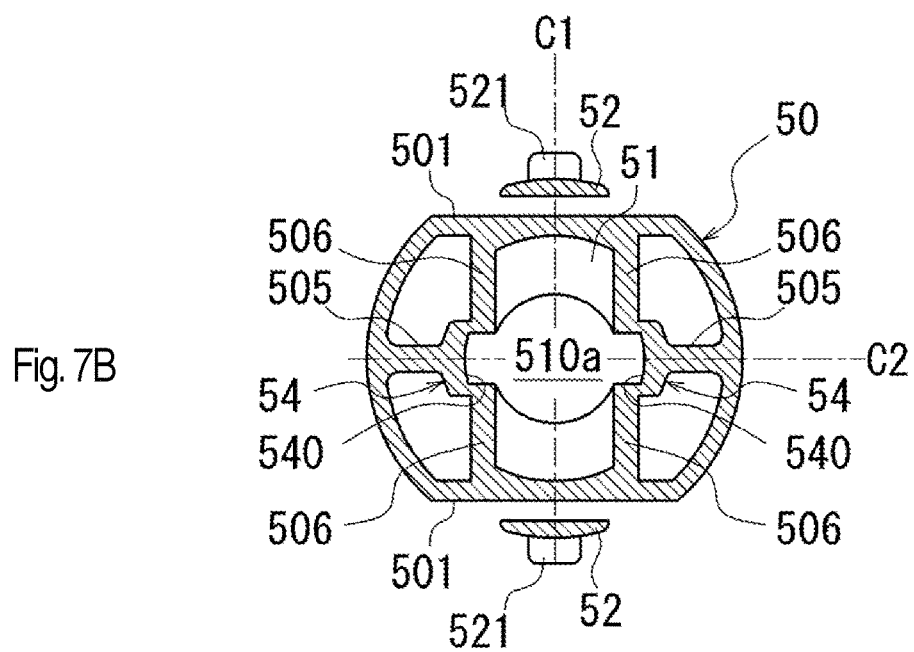
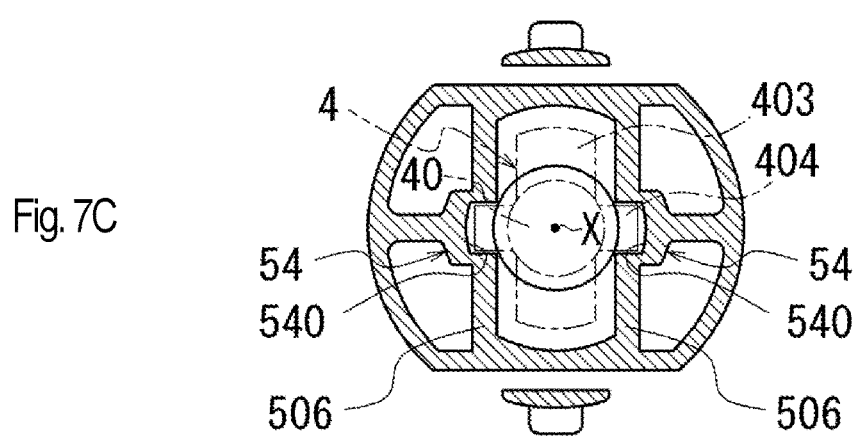

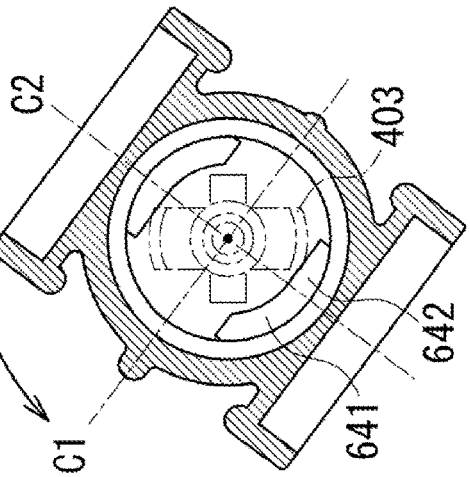
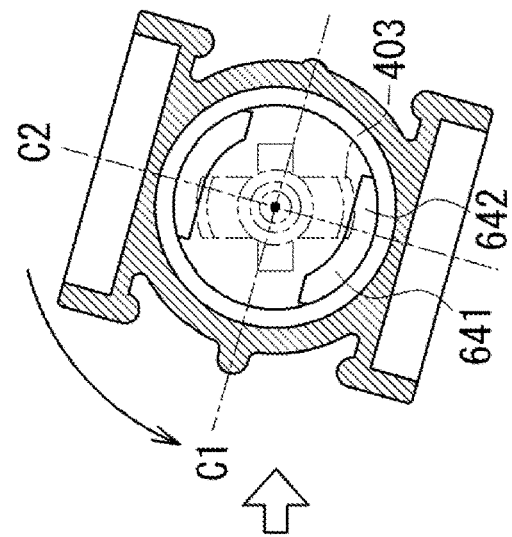

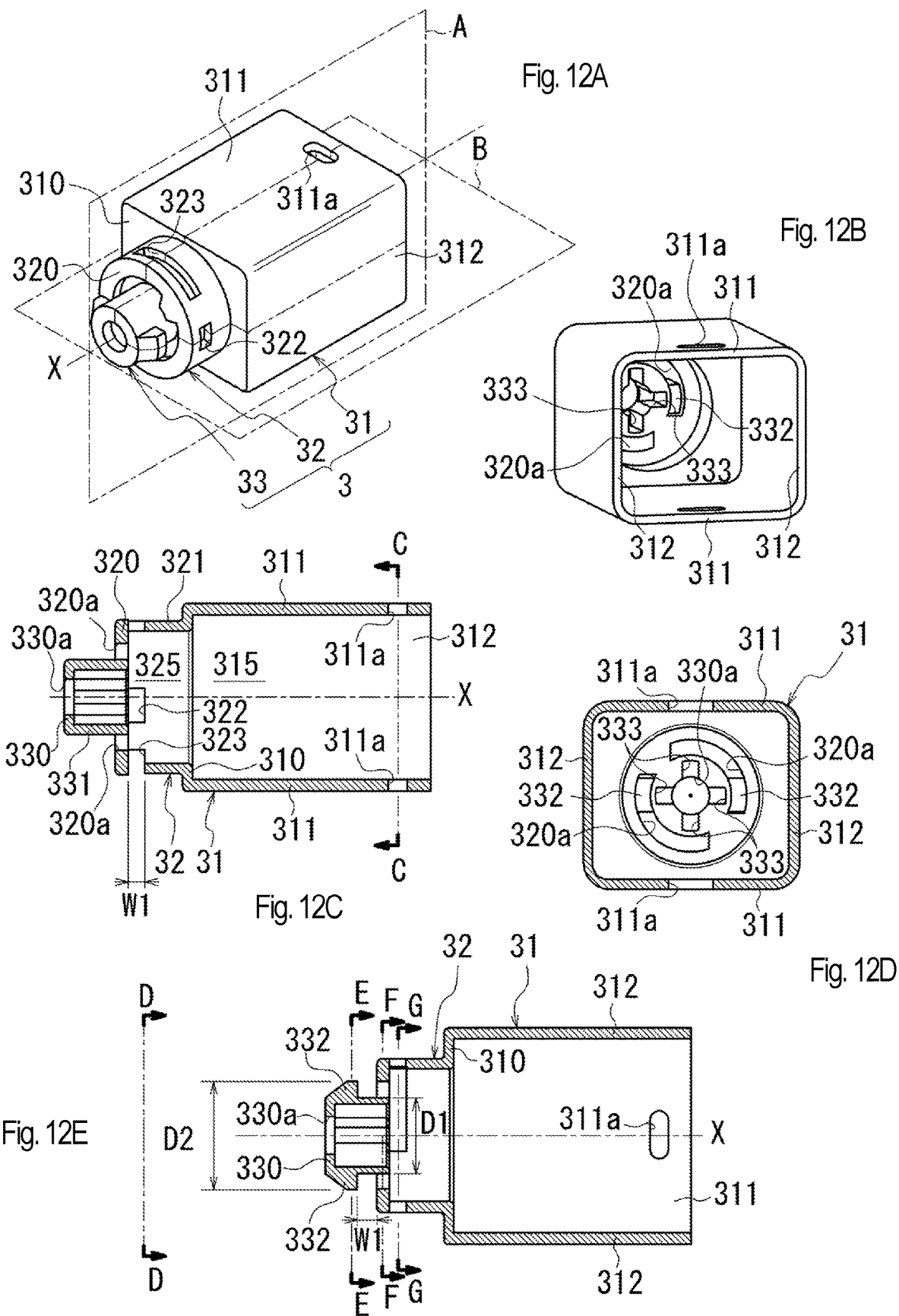

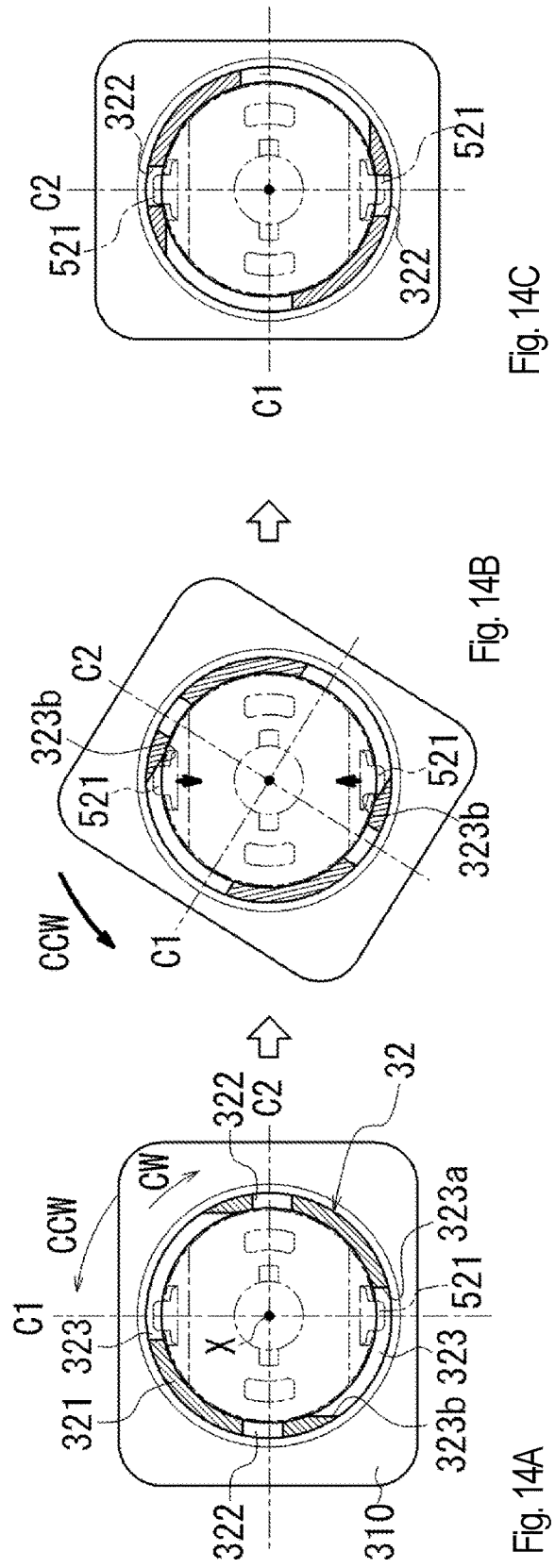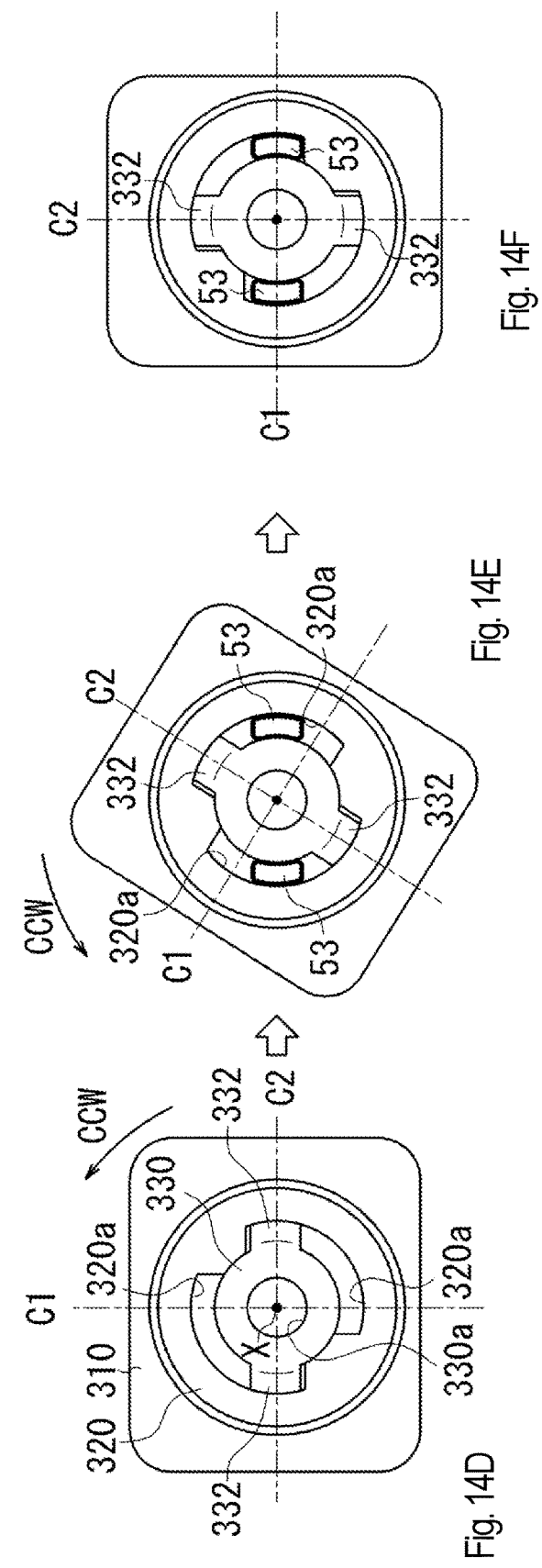

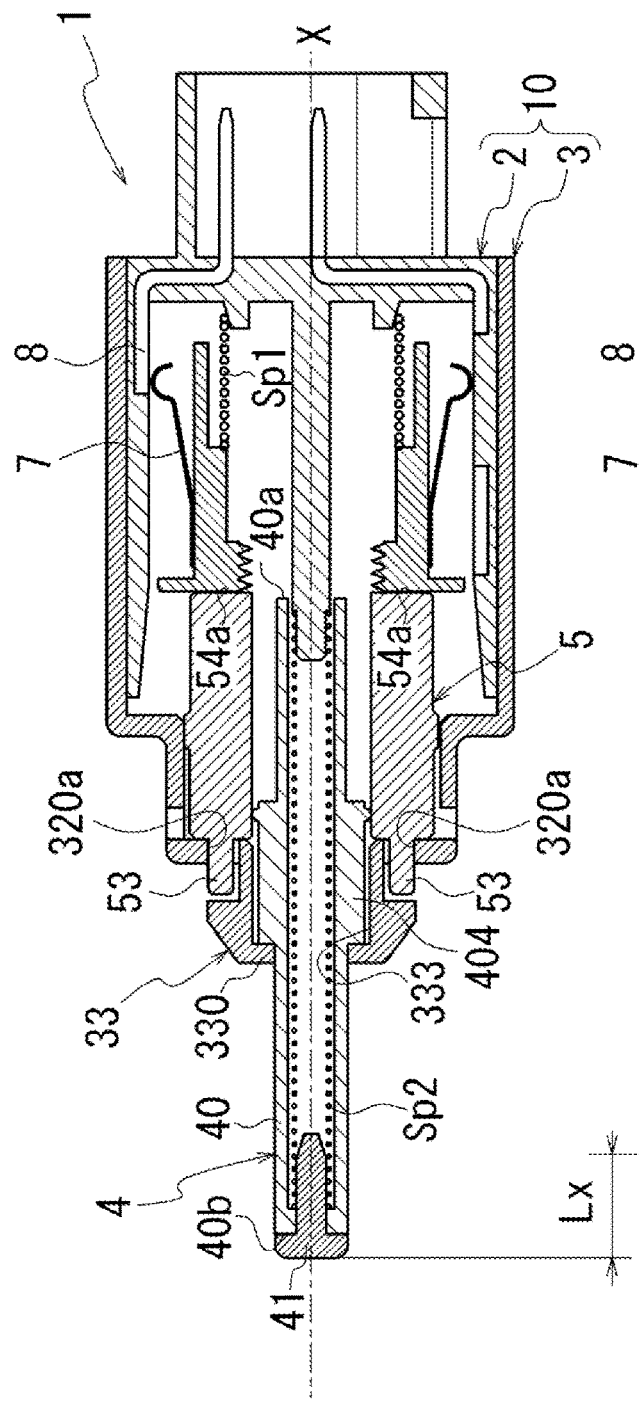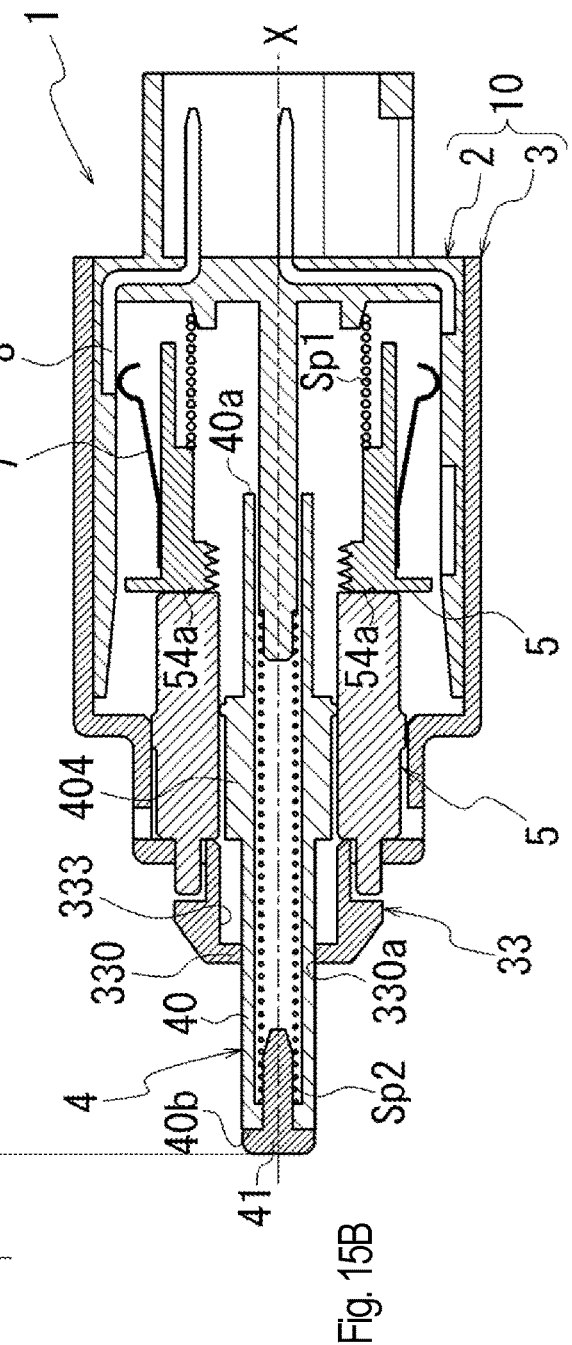

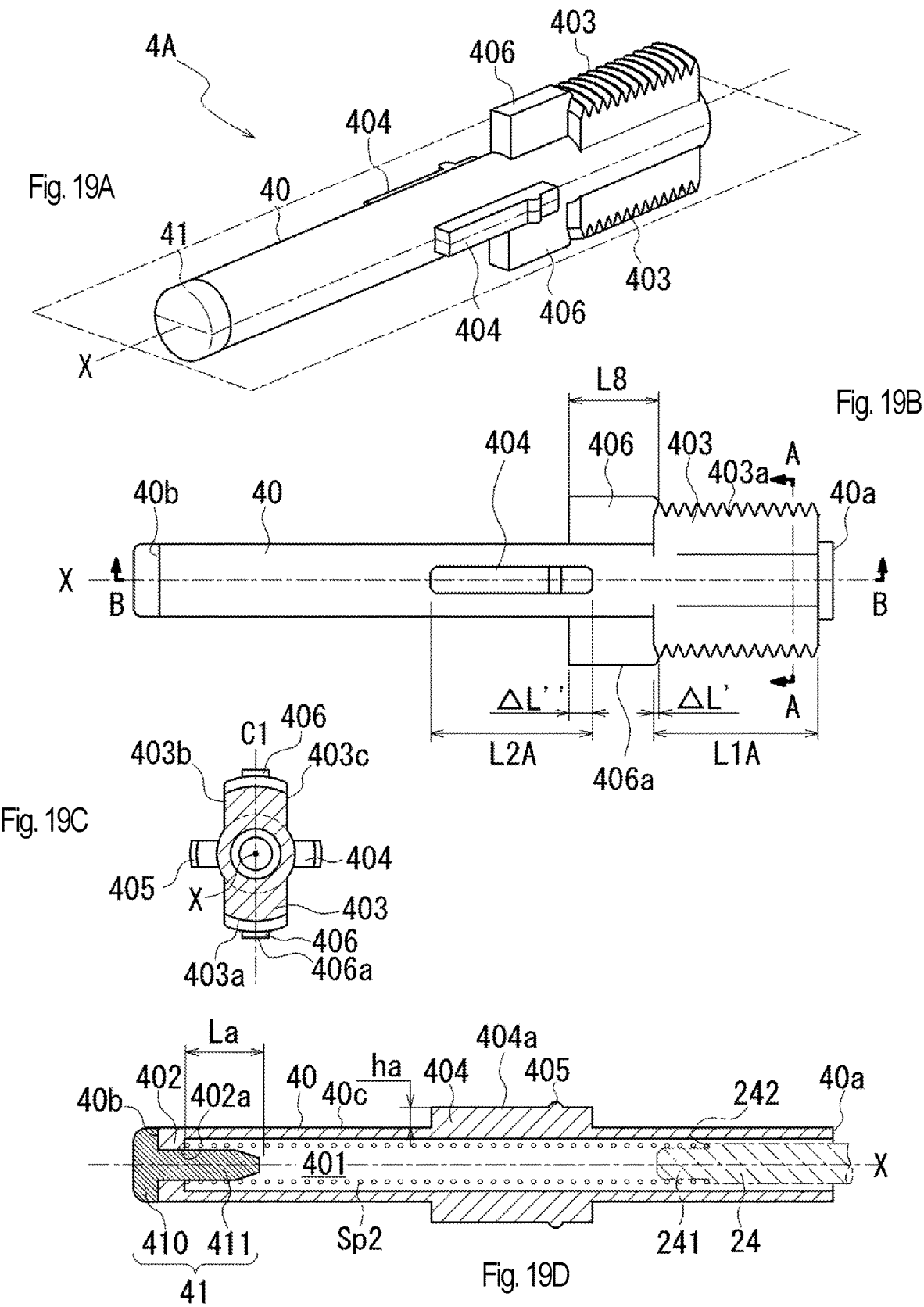

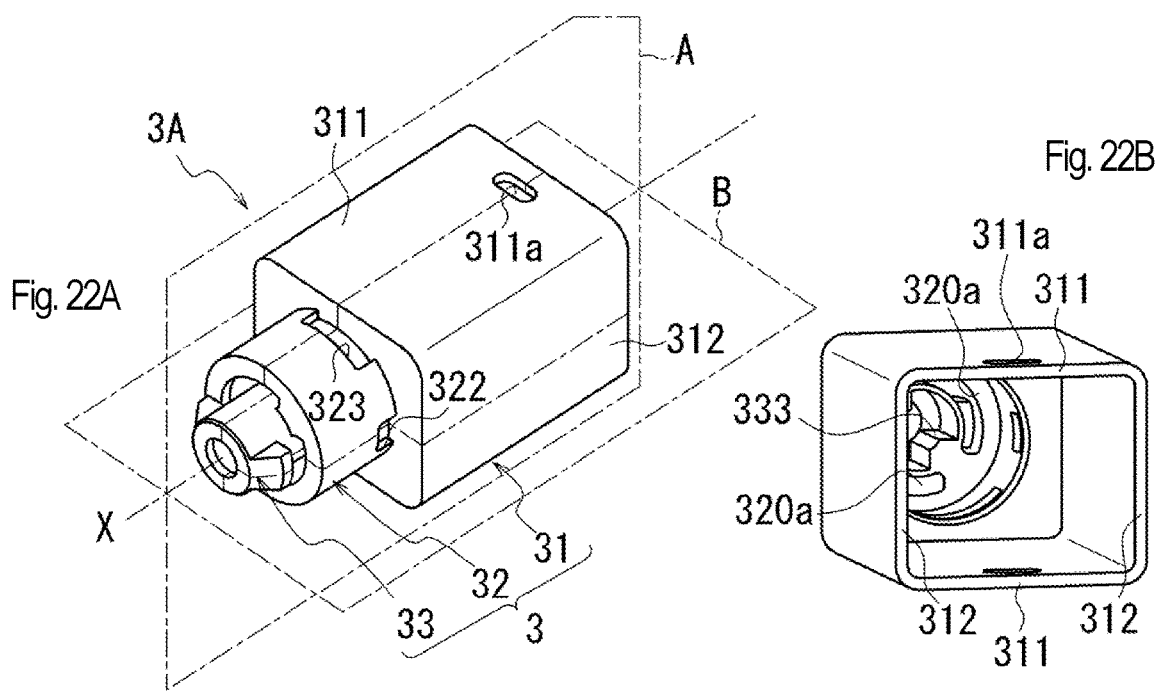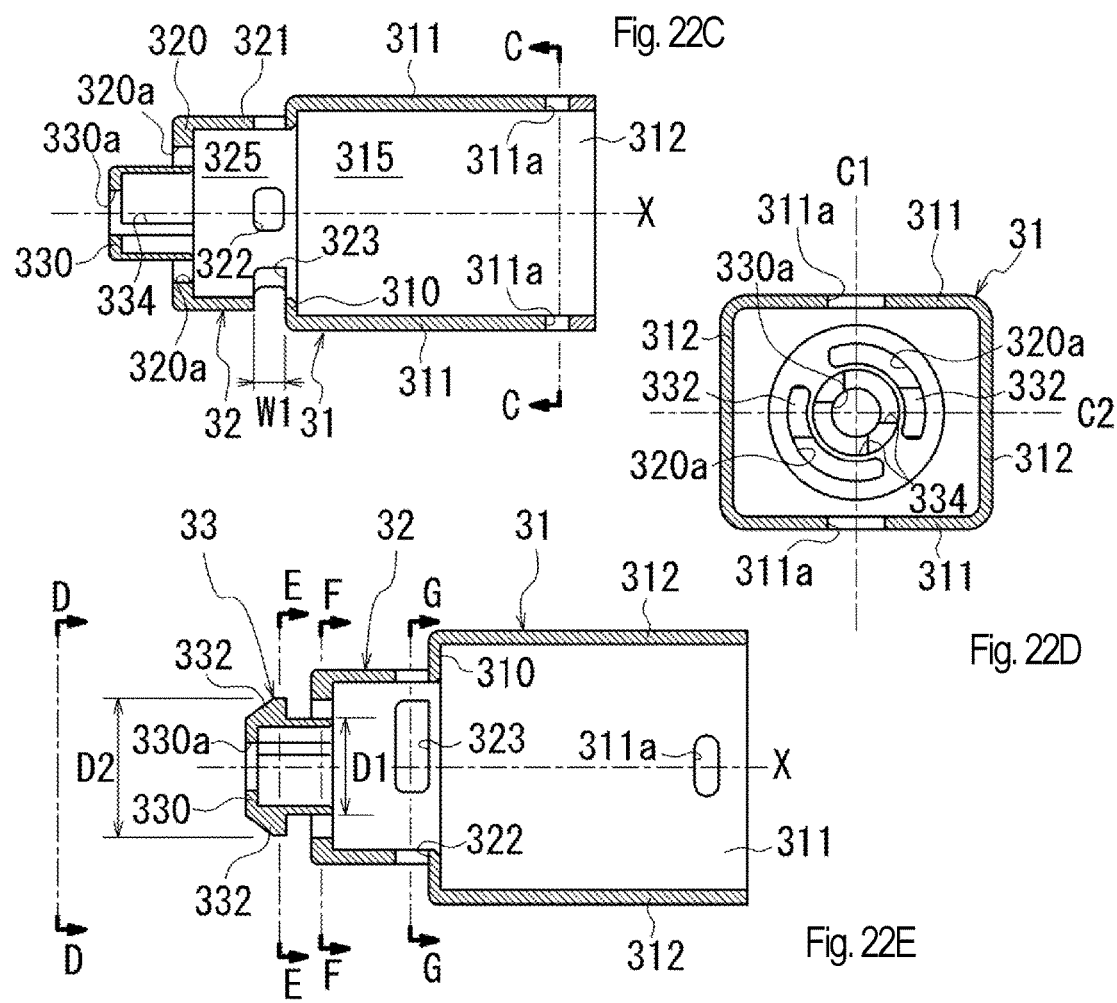

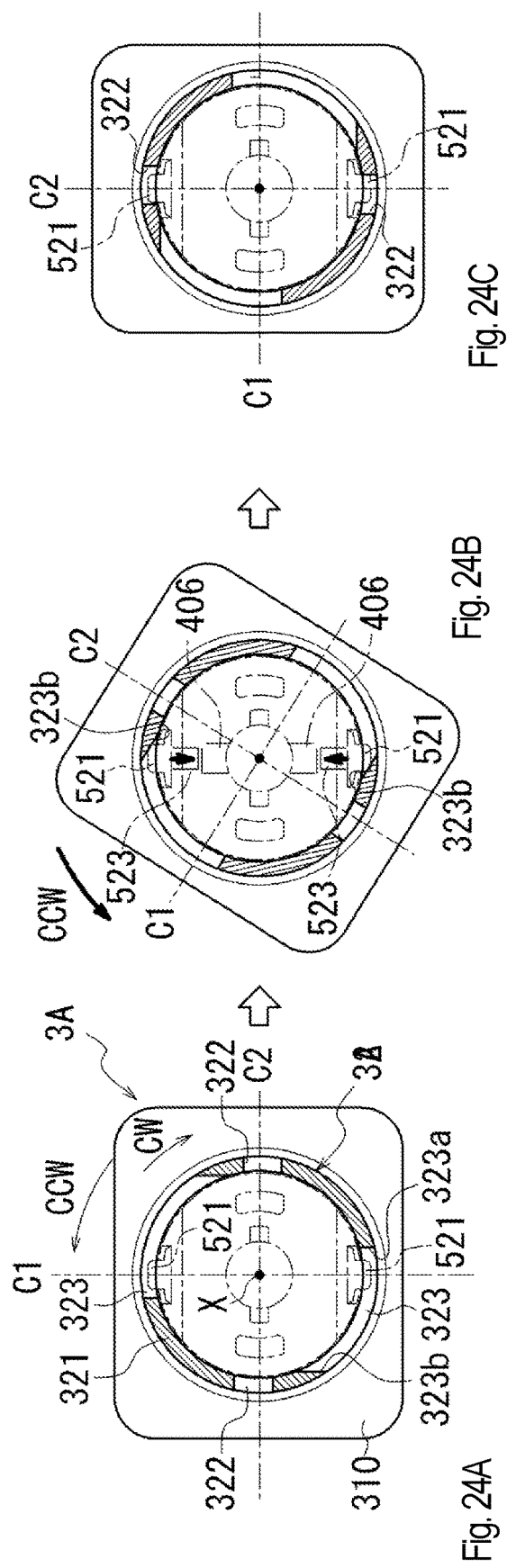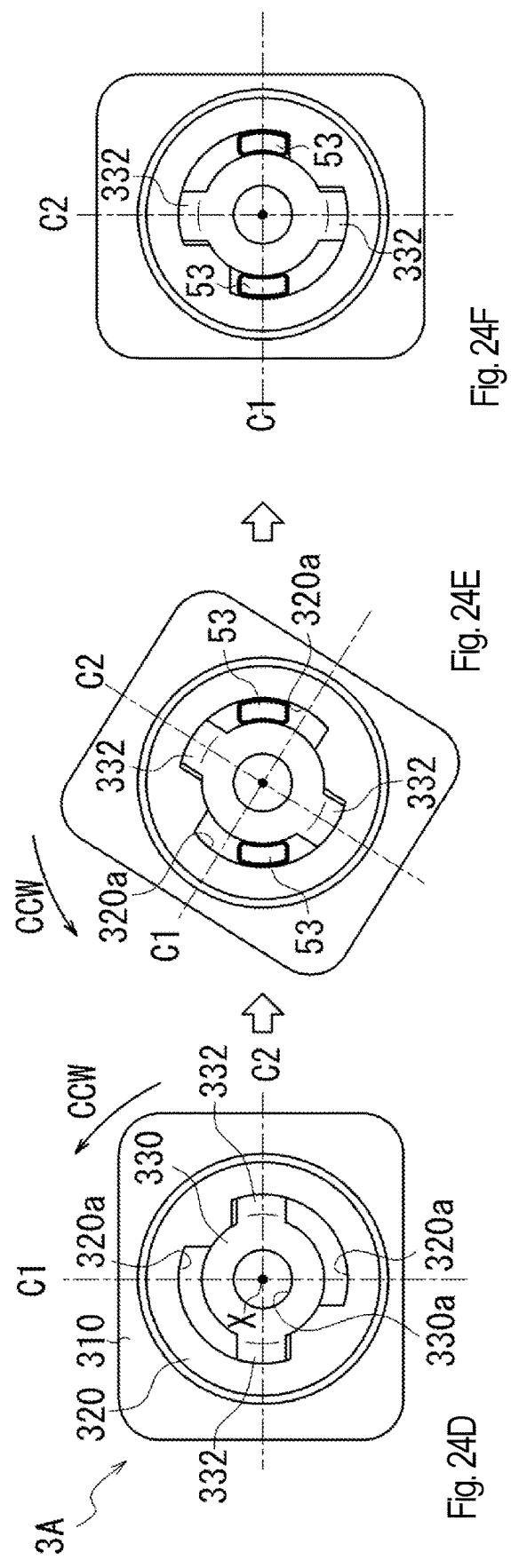

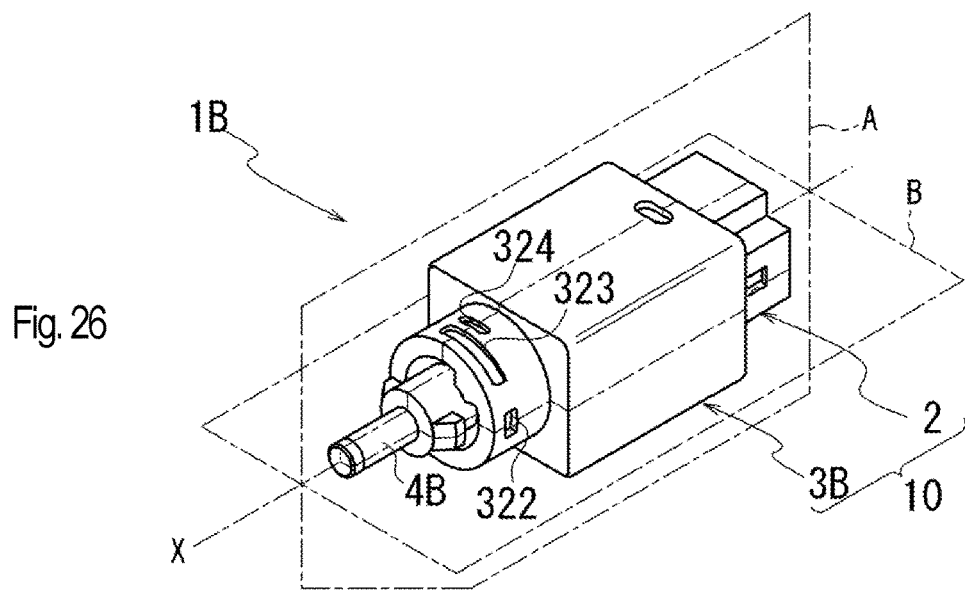
Fig. 26
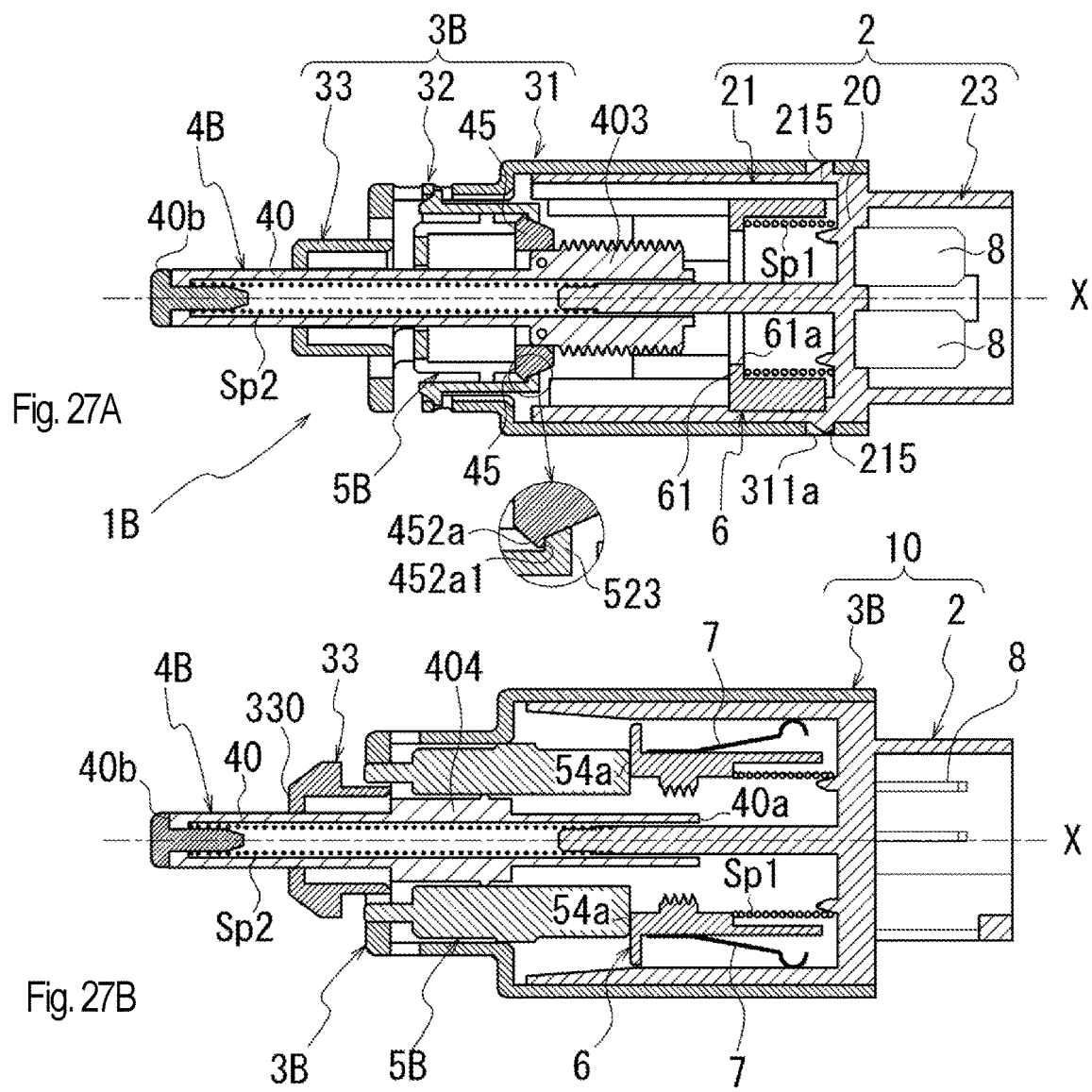
Fig. 27A
Fig. 27B

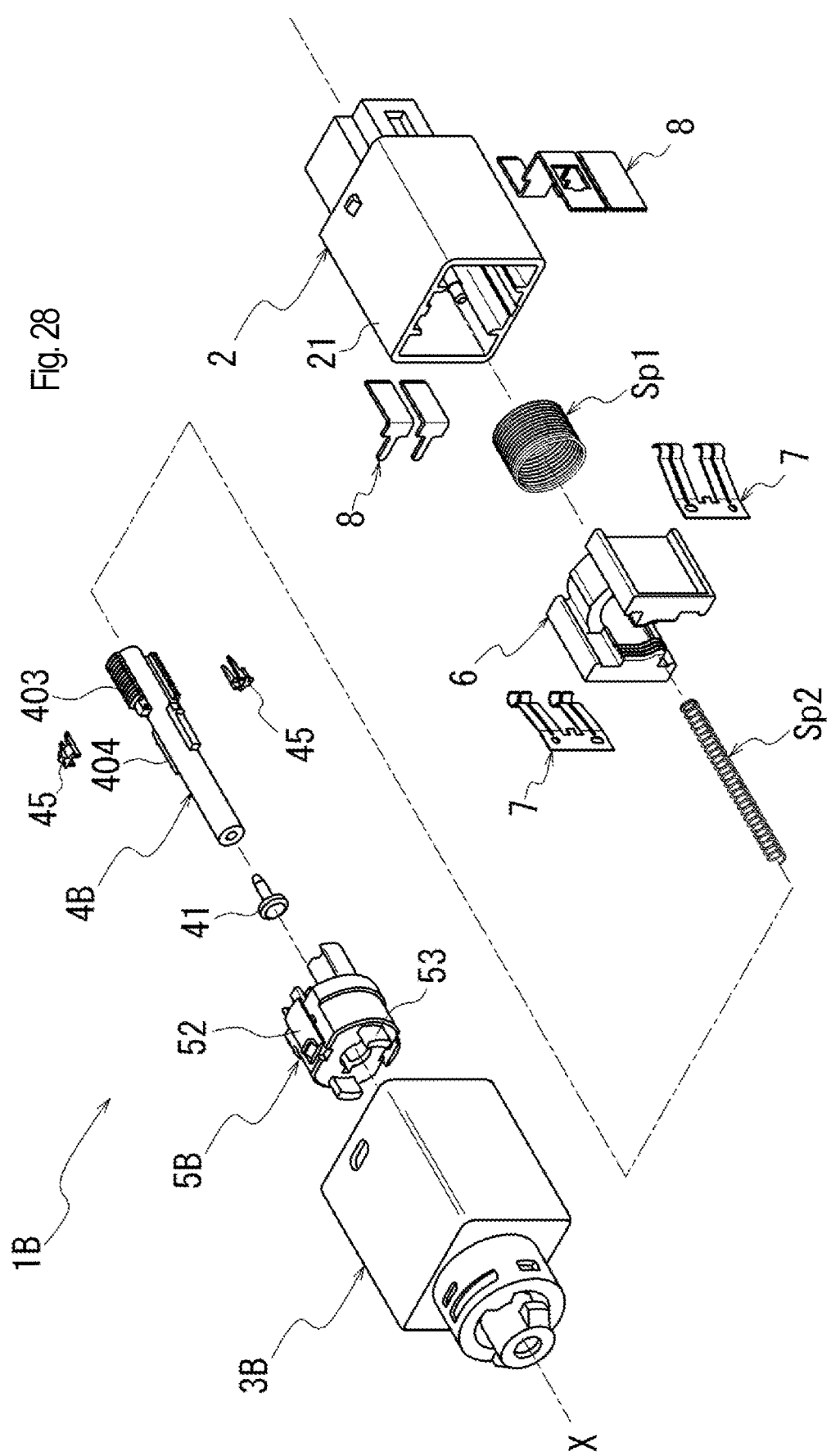

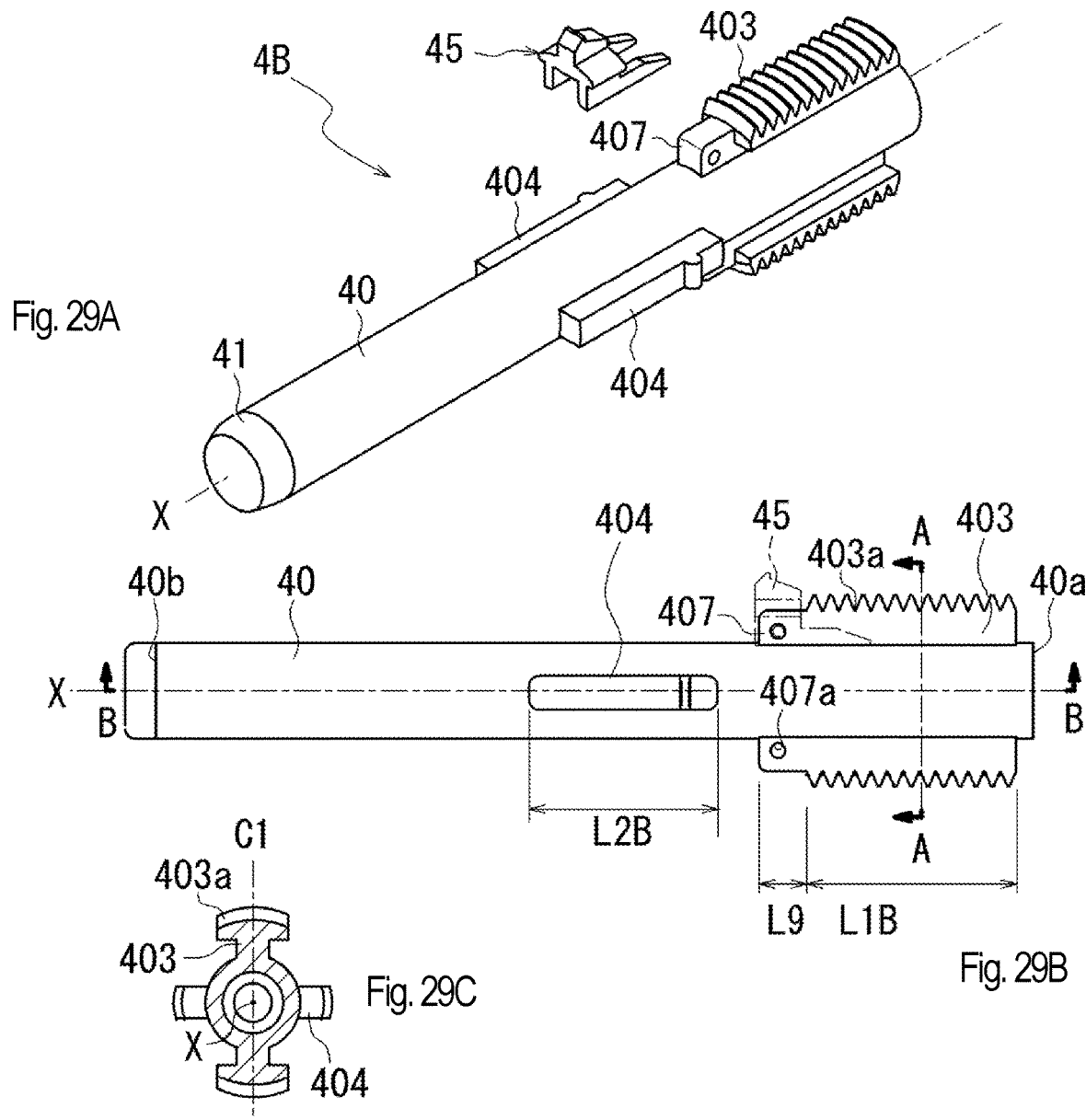
Fig. 29A
Fig. 29B
Fig. 29C
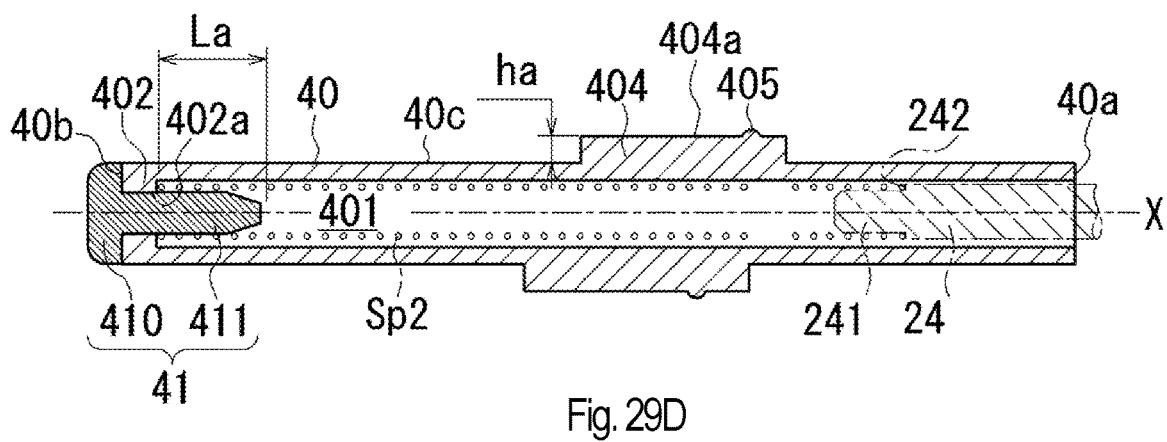
Fig. 29D

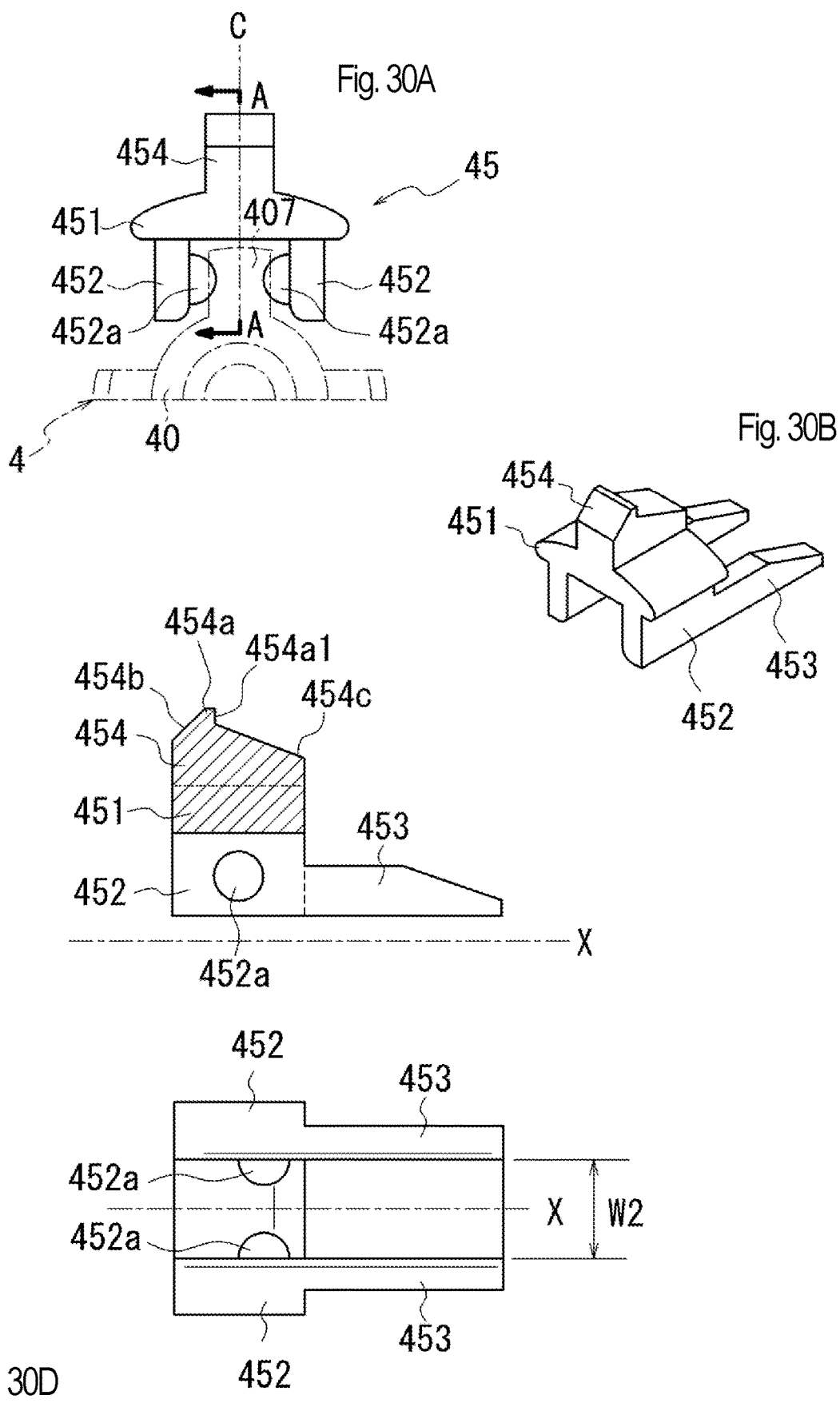

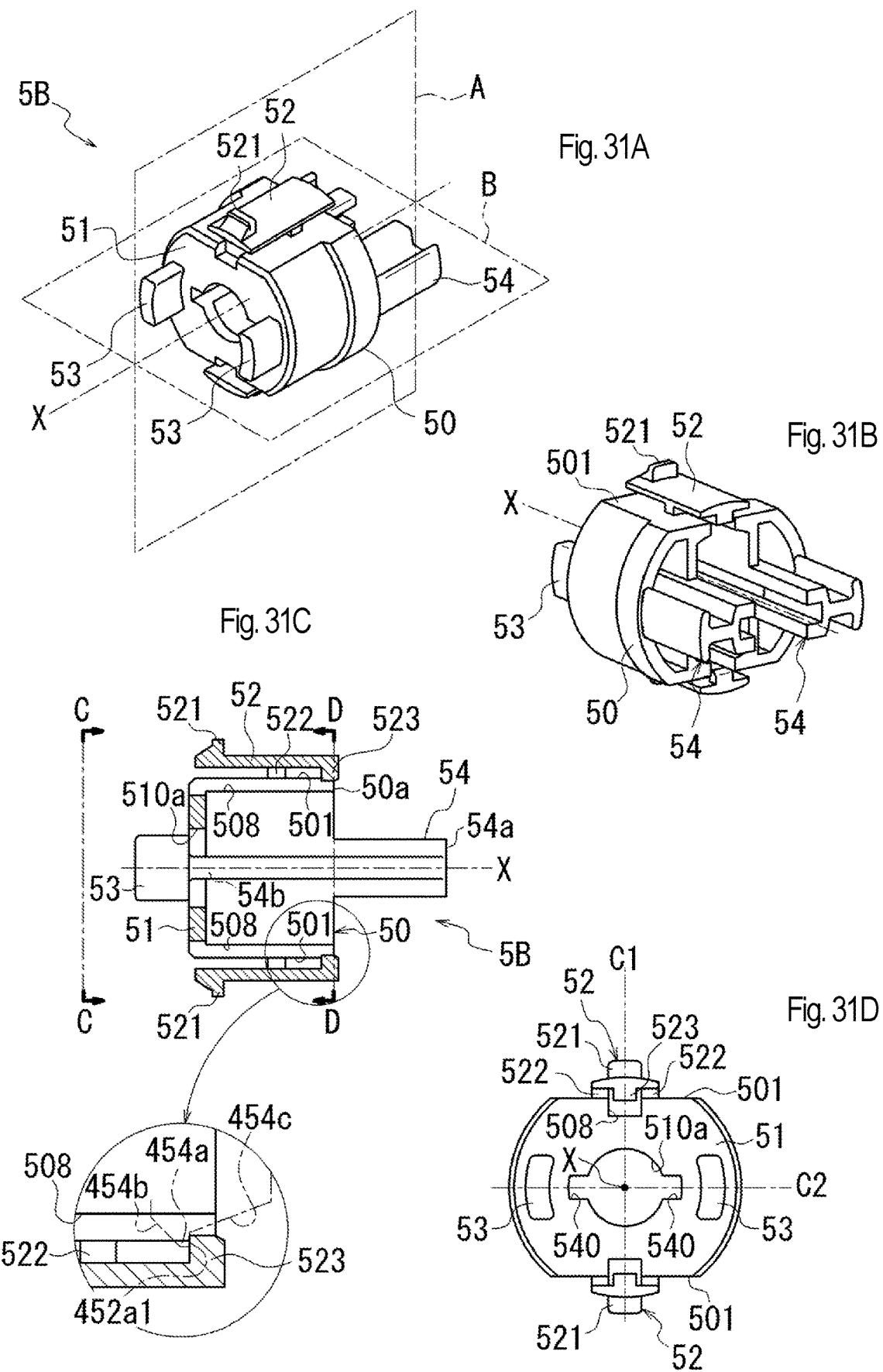

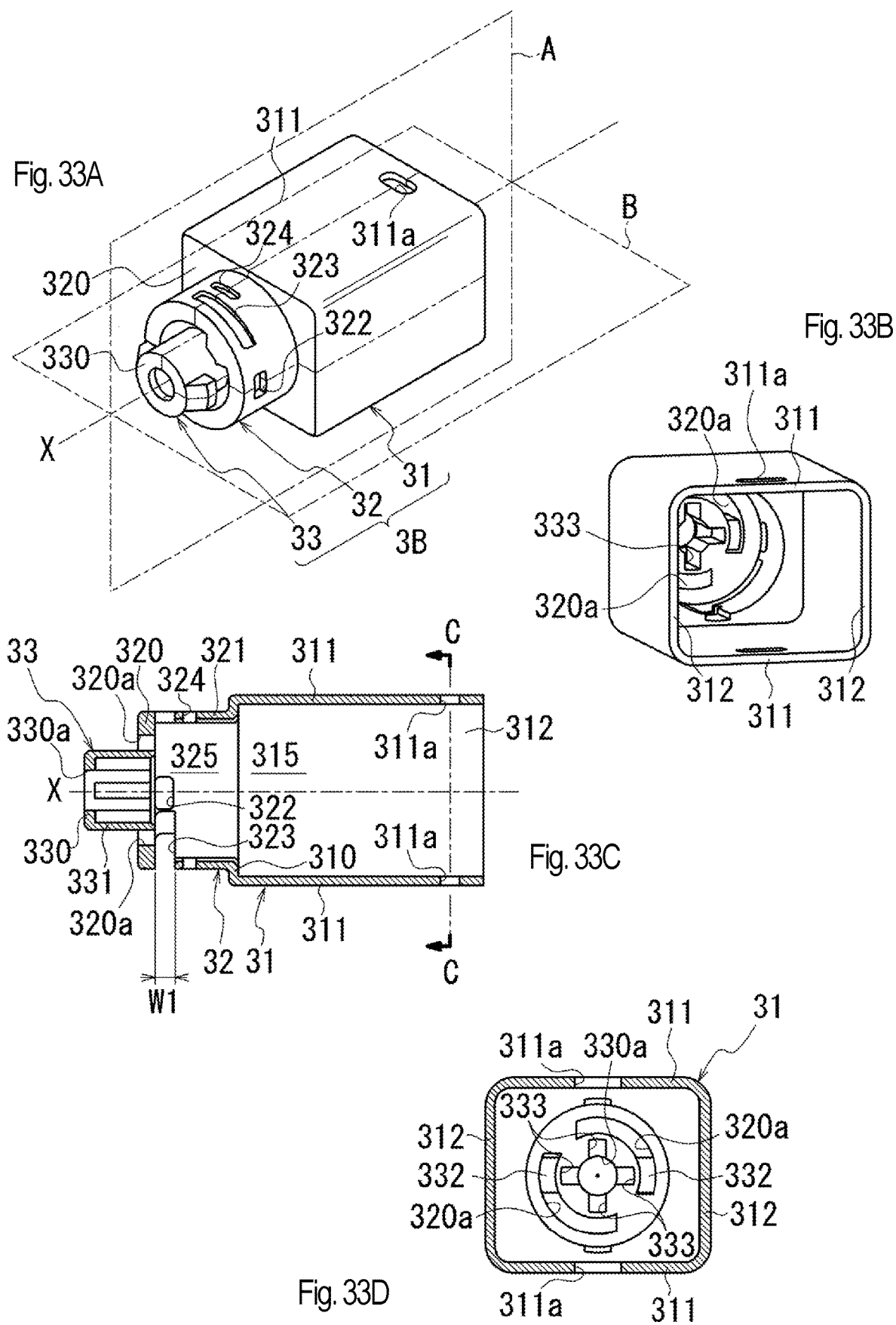

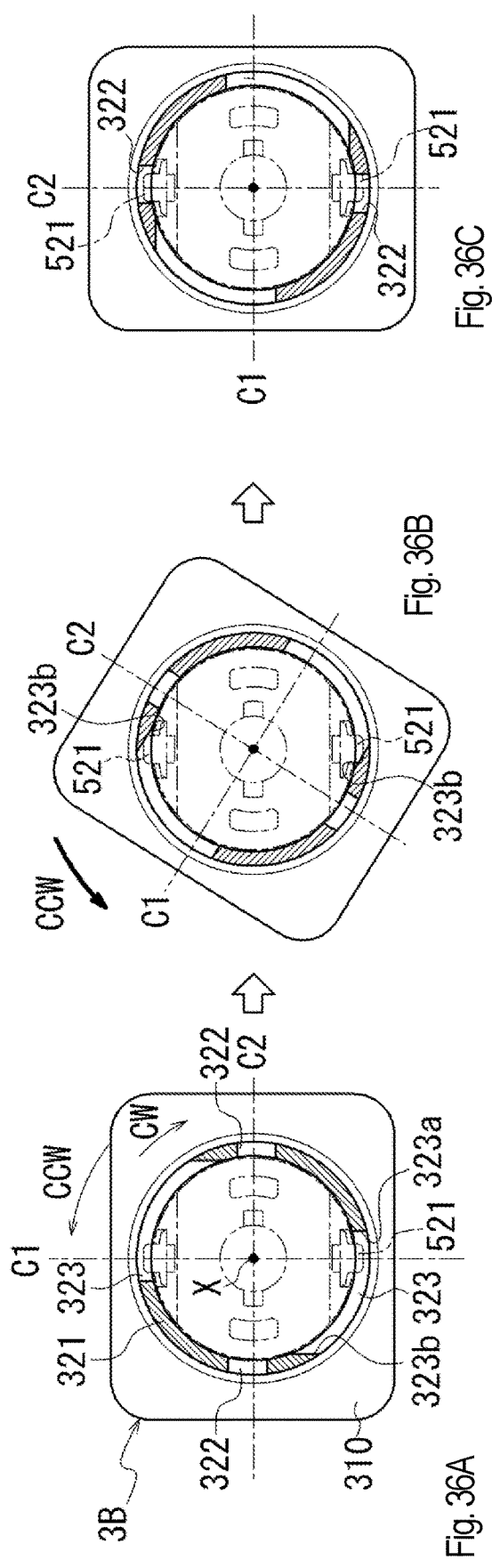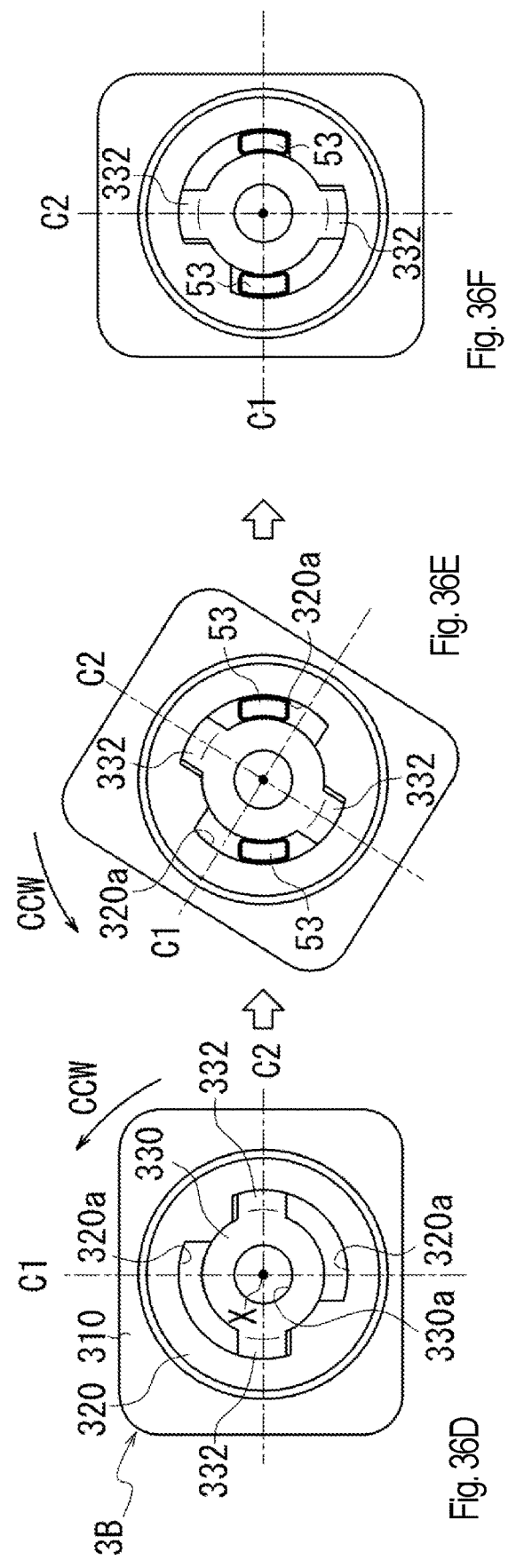

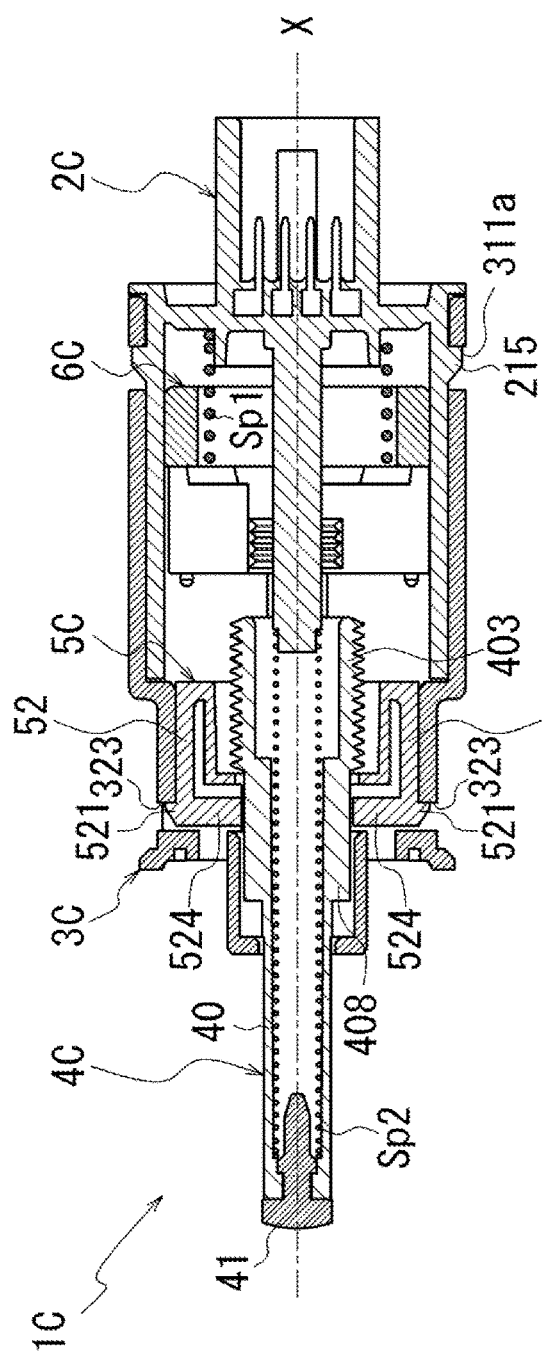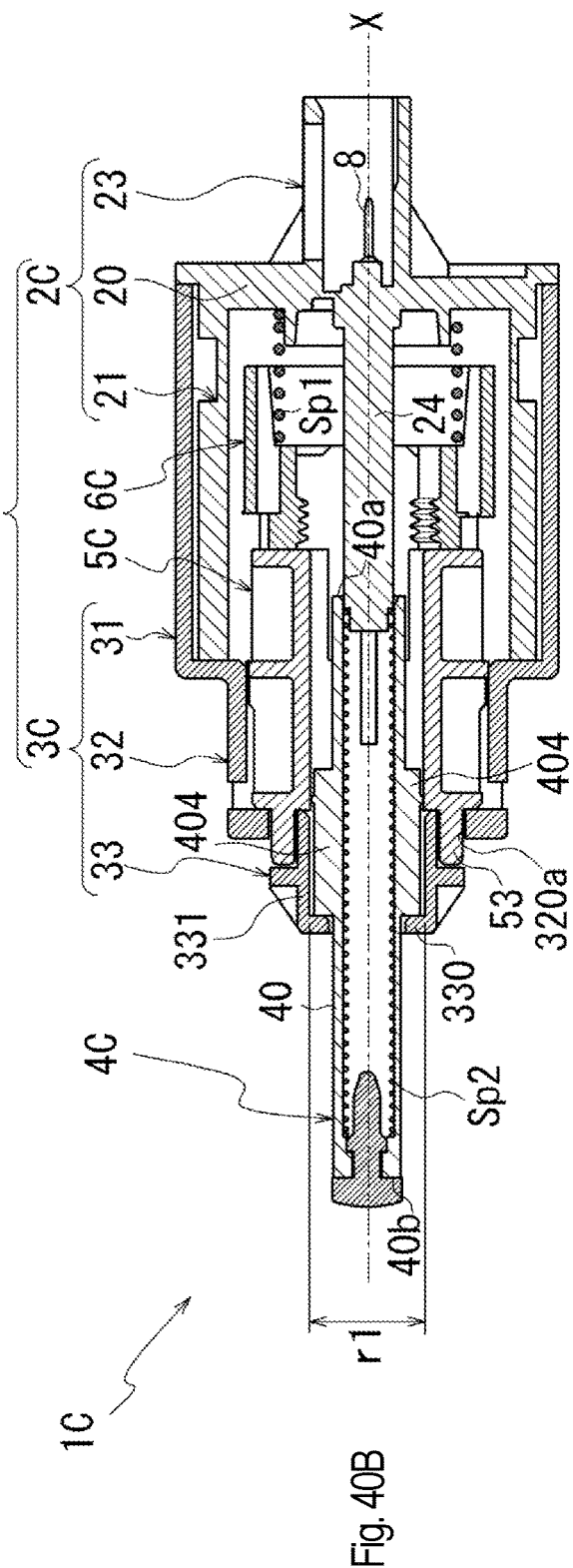

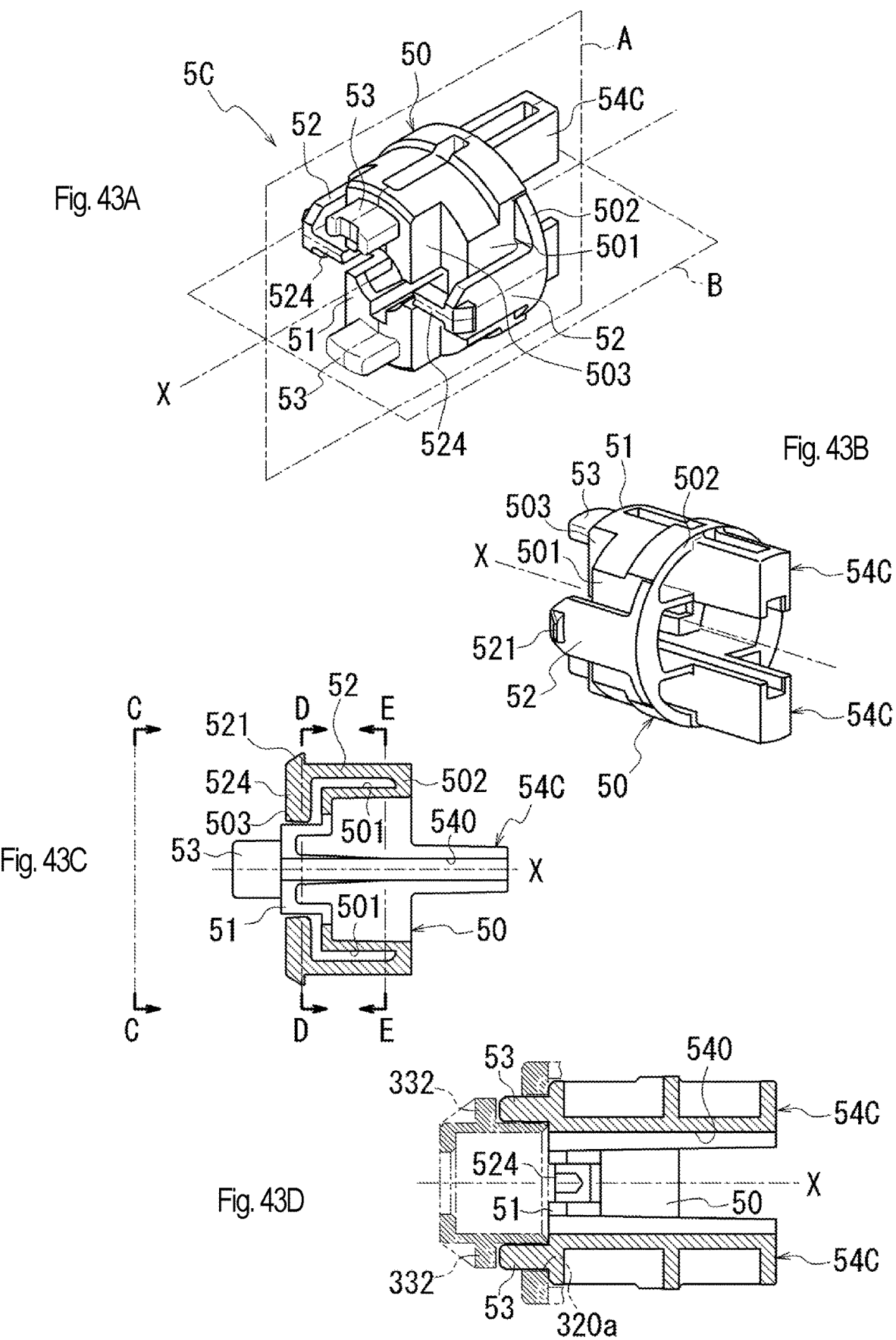

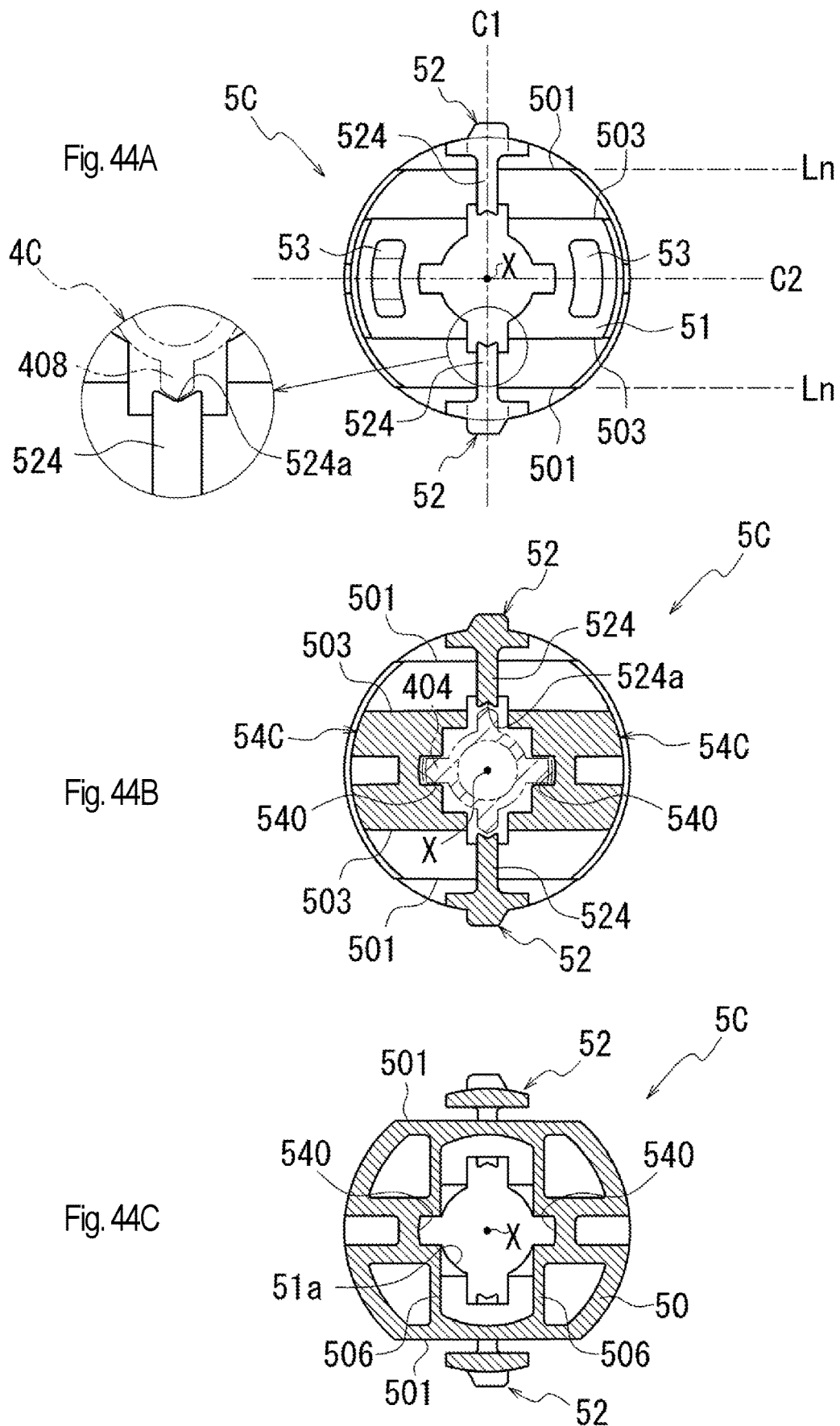

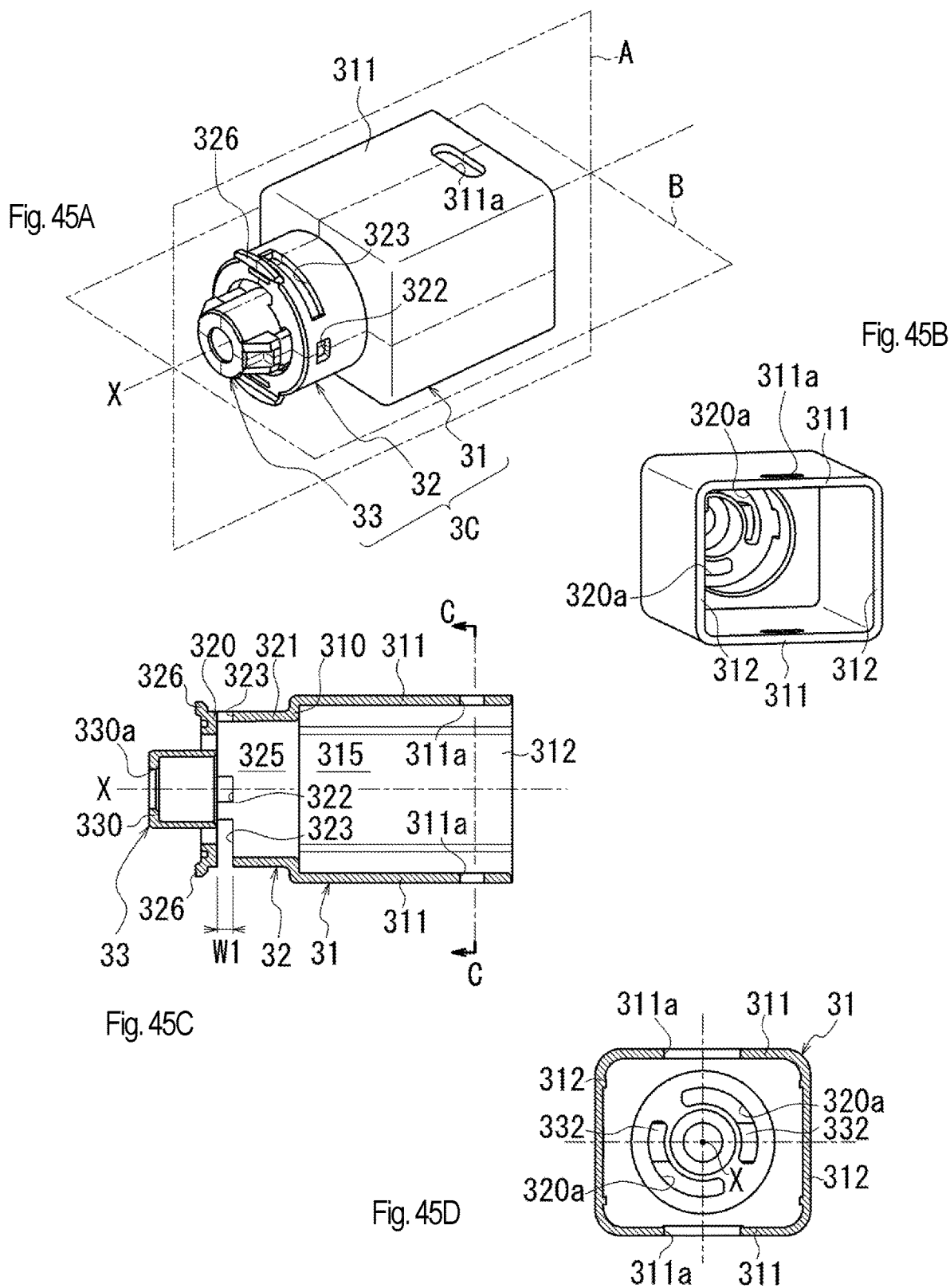

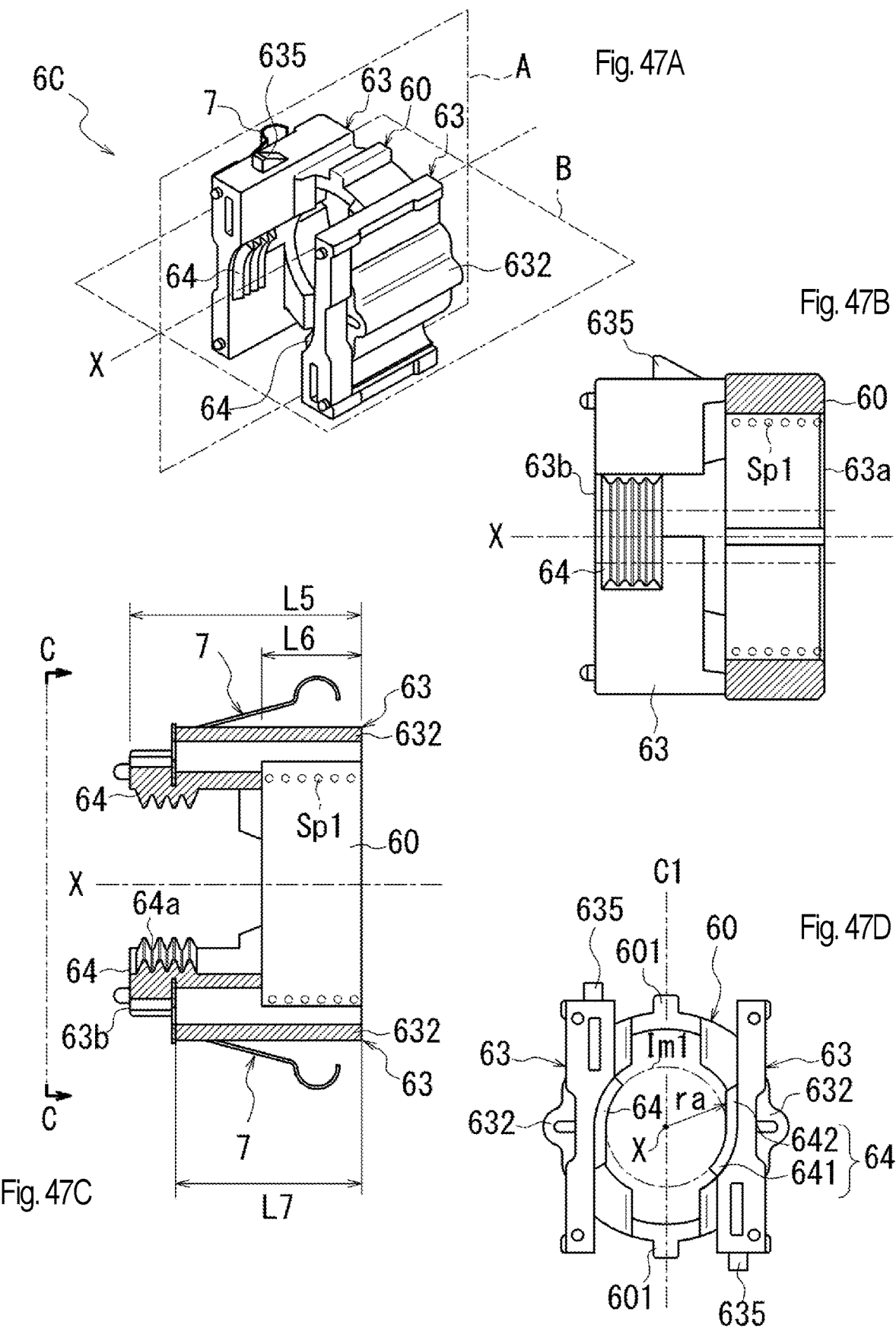

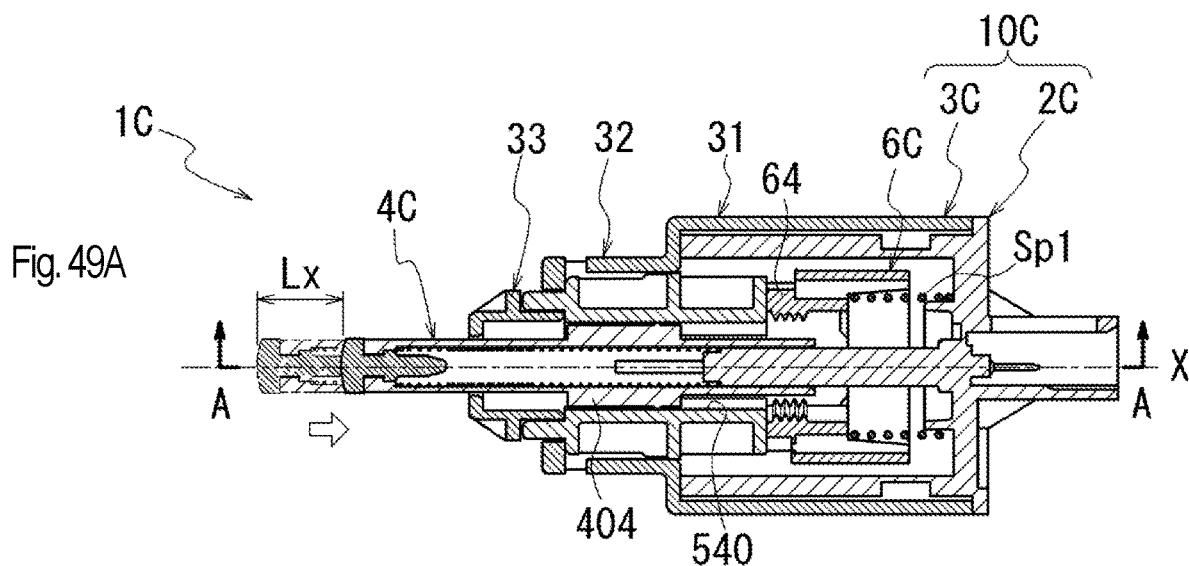
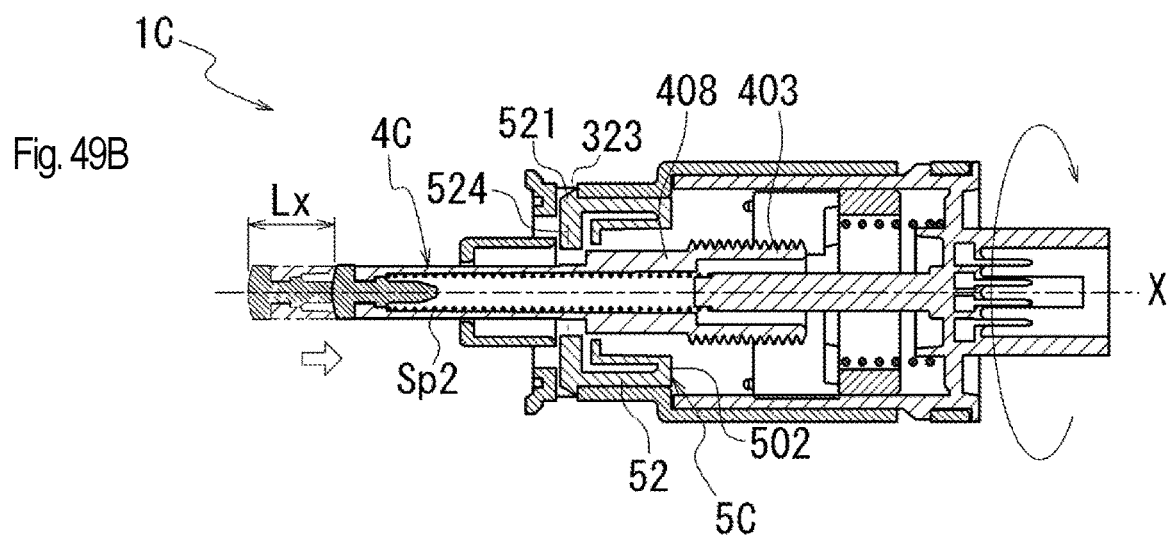
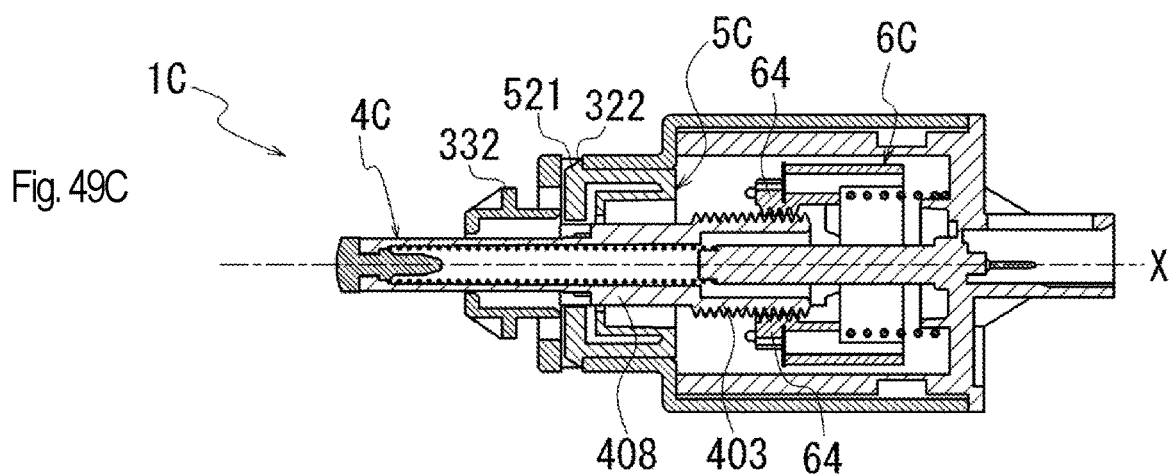

SWITCH DEVICE

CROSS-REFERENCE TO RELATED APPLICATION

This application claims priority under 35 USC 119 from Japanese Patent Application No. 2018-187653 filed on Oct. 2, 2018, the disclosure of which is incorporated by reference herein.

TECHNICAL FIELD

The present invention relates to a switch device to be used for detection of a depressing operation of a brake pedal.

BACKGROUND

Japanese Patent No. 4276835 discloses a switch device to be used for detection of a depression operation of a brake pedal.

This switch device includes a rod (pushing bar) moving forward/backward in association with an operation of brake pedal, and a main body case configured by assembling a first case and a second case.

The rod is provided to penetrate through the first case of the main body case in an assembling direction of the first case and the second case, and in this state, the rod is movably supported in an axis line direction along the assembling direction of the first case and the second case.

The rod and a movable board supporting a movable contact point are connected through a lock mechanism in the inside of the switch device. In the switch device, when the rod moves in the axis line direction in association with the operation of the brake pedal, the movable contact point moves in the axis line direction together with the rod to come in contact with a fixed contact point provided in the second case side. Thereby an ON-signal is outputted from the switch device.

For installing the switch device in a state of being capable of detecting the operation of the brake pedal, it is necessary to push the rod into the main body case by a predetermined length.

Therefore in a step of installing the switch device, the movable board in the main body case is necessary to be movable relative to the rod in the axis line direction. It is necessary that after the installation completion of the switch device, the movable board and the rod are connected to be movable together in the axis line direction.

The lock mechanism is an another component from the movable board, and is provided to connect the rod and the movable board supporting the movable contact point to be incapable of rotating relative to each other.

The lock mechanism is configured with a pair of sawtooth lock elements. The lock elements are located on an outer periphery of the rod and on an inner periphery of the lock mechanism respectively.

In the switch device, by rotating the rod around the axis line after the rod is pushed into the main body case by the predetermined length, the lock element in the rod side is caused to be engaged to the lock element in the lock mechanism side. As a result, the movable board having the movable contact point and the rod are connected, and the rod becomes movable in the axis line direction together with the movable board in a state where the rod is positioned correctly in the axis line direction.

The switch device has many components for connection between the rod and the movable board, and further, at the time of pushing the rod into the main body case by the predetermined length, alignment in position between the lock element in the rod side and the lock element in the lock mechanism side is necessary.

Therefore the assembling work becomes complicated, leading to an increase on a manufacturing cost of the switch device.

Accordingly it is required to be capable of providing the switch device at a less cost.

SUMMARY

Accordingly, the present invention is made in view of the above-described problem, and an object of the present invention is to provide a switch device which can smoothly push a rod into a main body case and can be manufactured at a lower cost.

According to an aspect of the present invention, a switch device comprises:

a rod moving forward/backward in an axis line direction in association with an operation of a brake pedal;

a main body case in which one end side of the rod in a longitudinal direction is inserted and which supports the rod to be movable in the axis line direction;

a movable board provided in the main body case to be displaceable in the axis line direction; and a connecting mechanism configured to connect the rod and the movable board, the movable board being displaced in the axis line direction by the forward/backward movement of the rod in the axis line direction to cause a movable contact point provided in the movable board to be in contact with or to be separate from a fixed contact point, wherein a holder is provided in the main body case to support the rod to be incapable of rotating relatively and to be movable in the axis line direction, the connecting mechanism includes:

a protruding portion radially protruding from an outer periphery of the rod; and a wall portion provided in the movable board and surrounding the outer periphery of the rod, being configured such that, when the rod is rotated around the axis line after pushing the rod into the main body case by a predetermined length from an initial position, a tooth portion located on an outer periphery of the protruding portion is meshed with a tooth portion located on an inner periphery of the wall portion to connect the rod and the movable board, in the main body case, the holder rotates relative to the main body case within a predetermined angle range from a reference position around the axis line, and when the holder is located in the reference position, the protruding portion and the peripheral wall portion are located to be shifted in a phase in a circumferential direction around the axis line.

According to the aspect of the present invention, when the holder is located in the reference position, the protruding portion and the peripheral wall portion are located to be shifted in the phase in the circumferential direction around the axis line. By pushing the rod into the main body case from the initial position in this state, interference between the protruding portion and the peripheral wall portion can be appropriately prevented in the process of pushing the rod into the main body case by the predetermined length.

Thereby the pushing of the rod into the main body case can be smoothly performed.

In addition, since no another component is present in the connection part between the rod and the movable board, a reduction in manufacturing costs of the switch device is made possible more than in a case of connecting the rod and the movable board using the another component therebetween.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIG. 5A to FIG. 5D are drawings explaining a rod;

FIG. 6A to FIG. 6E are drawings explaining a lock holder;

FIG. 7A to FIG. 7C are drawings explaining the lock holder;

FIG. 12A to FIG. 12E are drawings explaining a cover;

FIG. 14A to FIG. 14F are drawings explaining the cover;

FIG. 15A and FIG. 15B are drawings explaining movement of the rod and rotation restriction of the rod at the time of attaching the switch device to a bracket;

FIG. 19A to FIG. 19D are drawings explaining a rod;

FIG. 22A to FIG. 22E are drawings explaining a cover;

FIG. 24A to FIG. 24F are drawings explaining the cover;

FIG. 26 is a perspective view illustrating a switch device according to a third embodiment of the present invention;

FIG. 27A and FIG. 27B are cross sections illustrating the switch device;

FIG. 28 is an exploded perspective view illustrating the switch device;

FIG. 29A to FIG. 29D are drawings explaining a rod;

FIG. 30A to FIG. 30D are drawings explaining a cam;

FIG. 31A to FIG. 31D are drawings explaining a lock holder;

FIG. 33A to FIG. 33D are drawings explaining a cover;

FIG. 36A to FIG. 36F are drawings explaining the cover;

FIG. 40A and FIG. 40B are cross sections illustrating the switch device;

FIG. 43A to FIG. 43D are drawings explaining a lock holder;

FIG. 44A to FIG. 44C are drawings explaining the lock holder;

FIG. 45A to FIG. 45D are drawings explaining a cover;

FIG. 47A to FIG. 47D are drawings explaining a pole board;

FIG. 49A to FIG. 49C are drawings explaining the installation process of the switch device.

DETAILED DESCRIPTION

Hereinafter, an explanation will made of switch devices according to embodiments in the present invention.

Figure 1A:
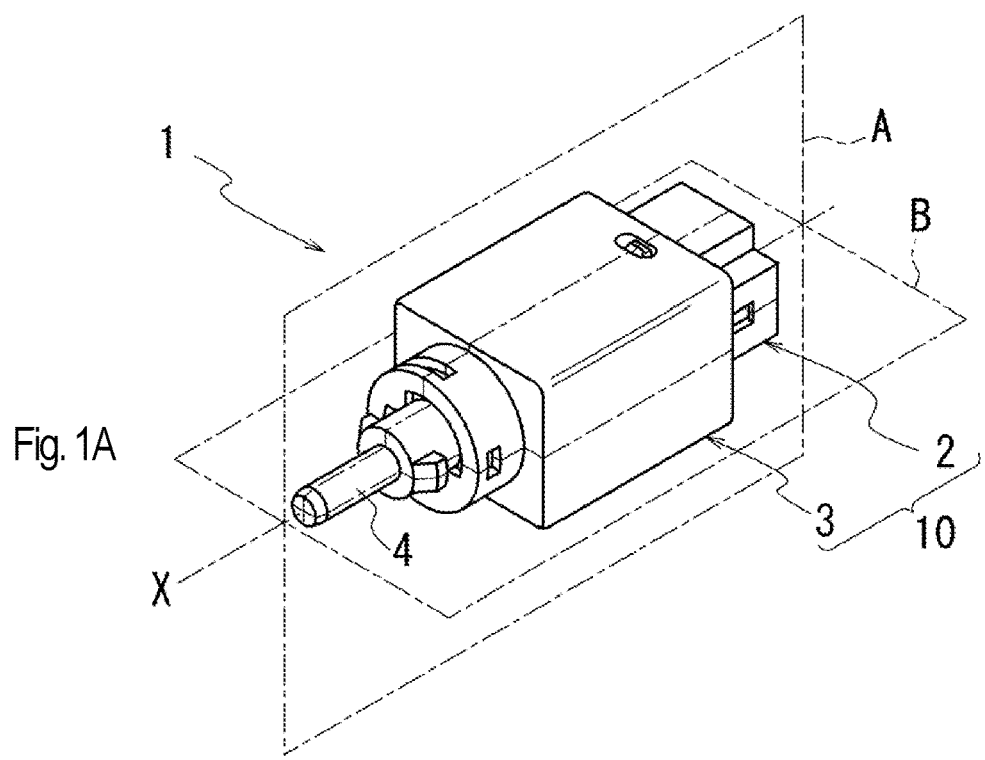
FIG. 1A is a perspective view illustrating a switch device according to an embodiment in the present invention.
Figure 1B:
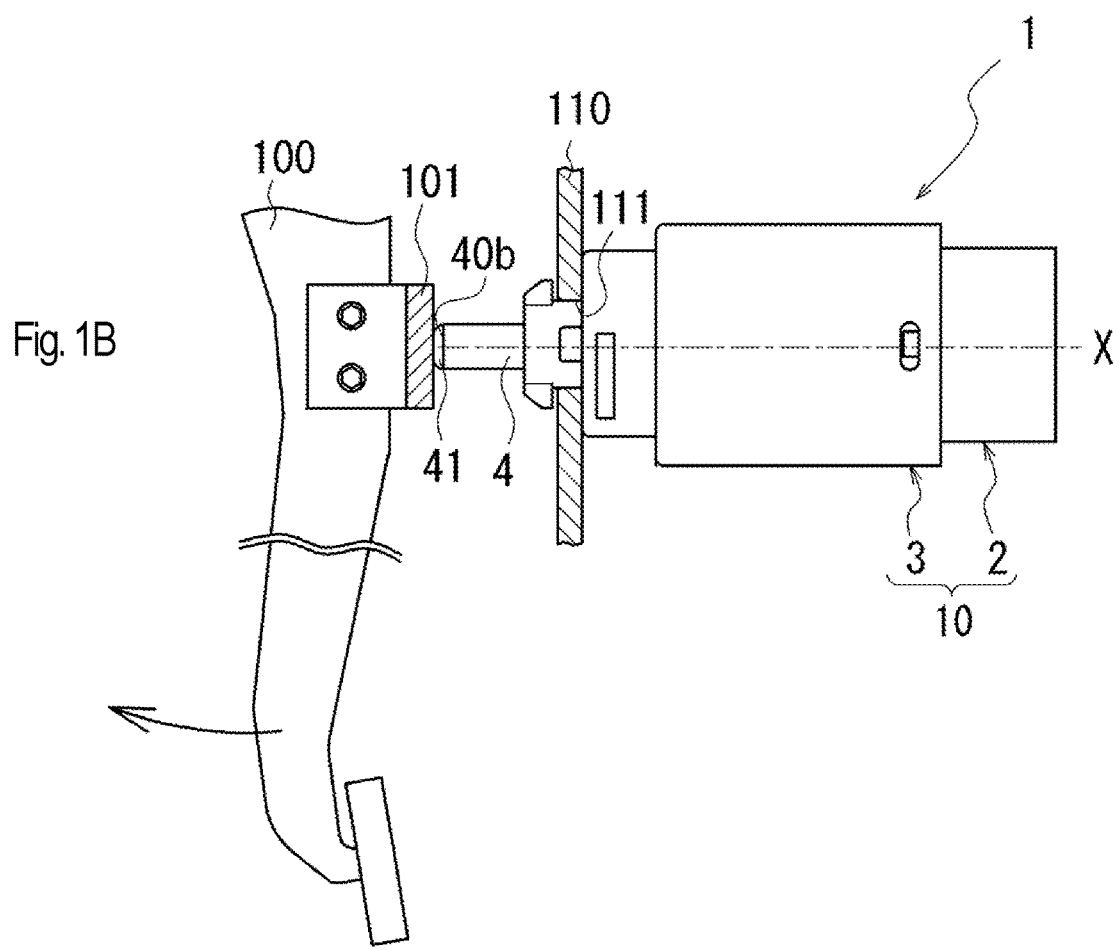
FIG. 1B is a schematic diagram explaining an installation state of the switch device.

FIG. 1A and FIG. 1B are drawings explaining a switch device 1, wherein FIG. 1A is a perspective view and FIG. 1B is a schematic diagram explaining an installation state of the switch device 1

Figure 2A:
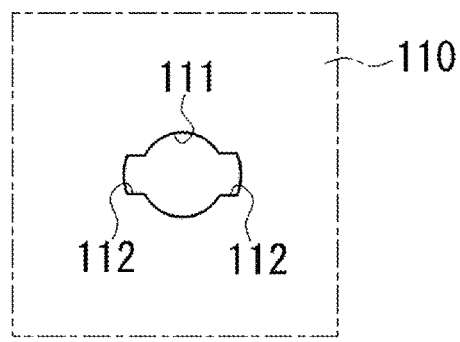
FIG. 2A to FIG. 2F are drawings explaining an installation process of the switch device.
Figure 2B:
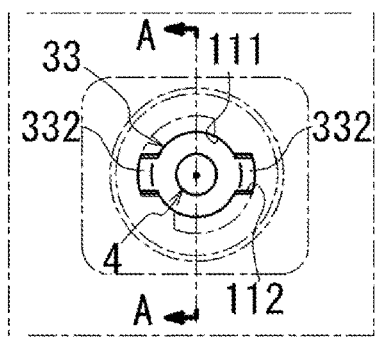
Figure 2C:
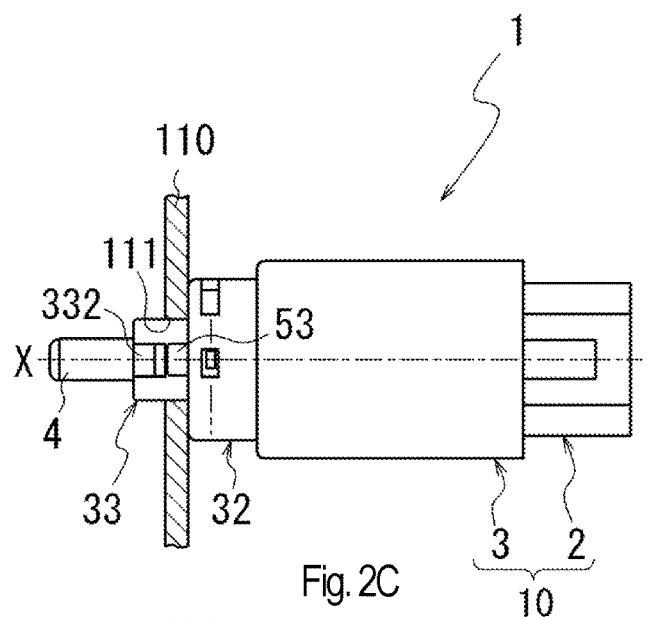
Figure 2D:
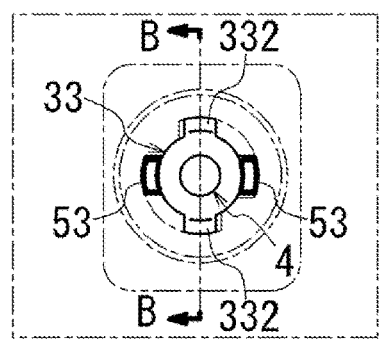
Figure 2E:
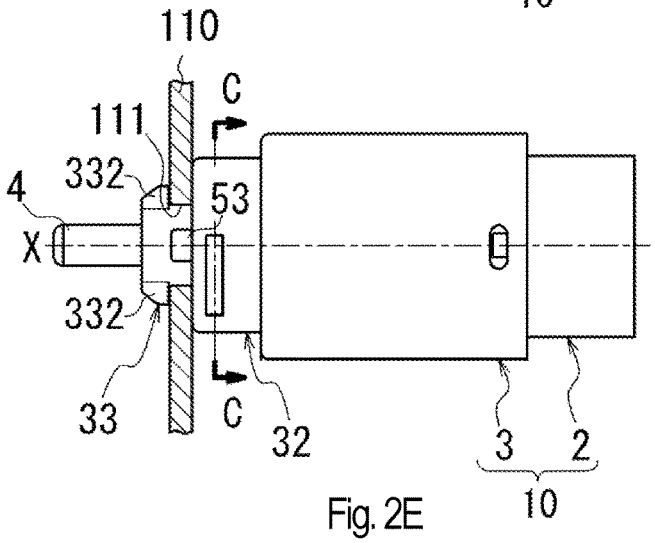
Figure 2F:
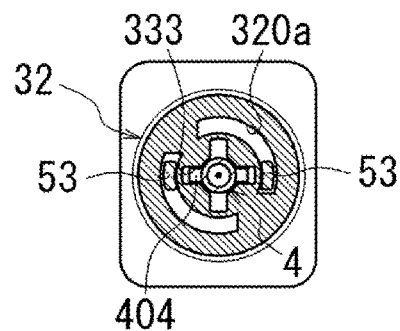

FIG. 2A to FIG. 2F are drawings explaining an installation process of the switch device 1, wherein FIG. 2A is a diagram explaining a bracket 110 on which the switch device 1 is attached. FIG. 2B is a diagram illustrating a state where a second restriction portion 33 in the switch device 1 is inserted in an attachment hole 111 of the bracket 110. FIG. 2C is a cross section taken along line A-A in FIG. 2B. FIG. 2D is a diagram illustrating a state where a main body case 10 in the switch device 1 is rotated around an axis line X from the state in FIG. 2B and FIG. 2C to fix the switch device 1 to the bracket 110. FIG. 2E is a cross section taken along line B-B in FIG. 2D. FIG. 2F is a cross section taken along line C-C in FIG. 2E.

Figure 3:
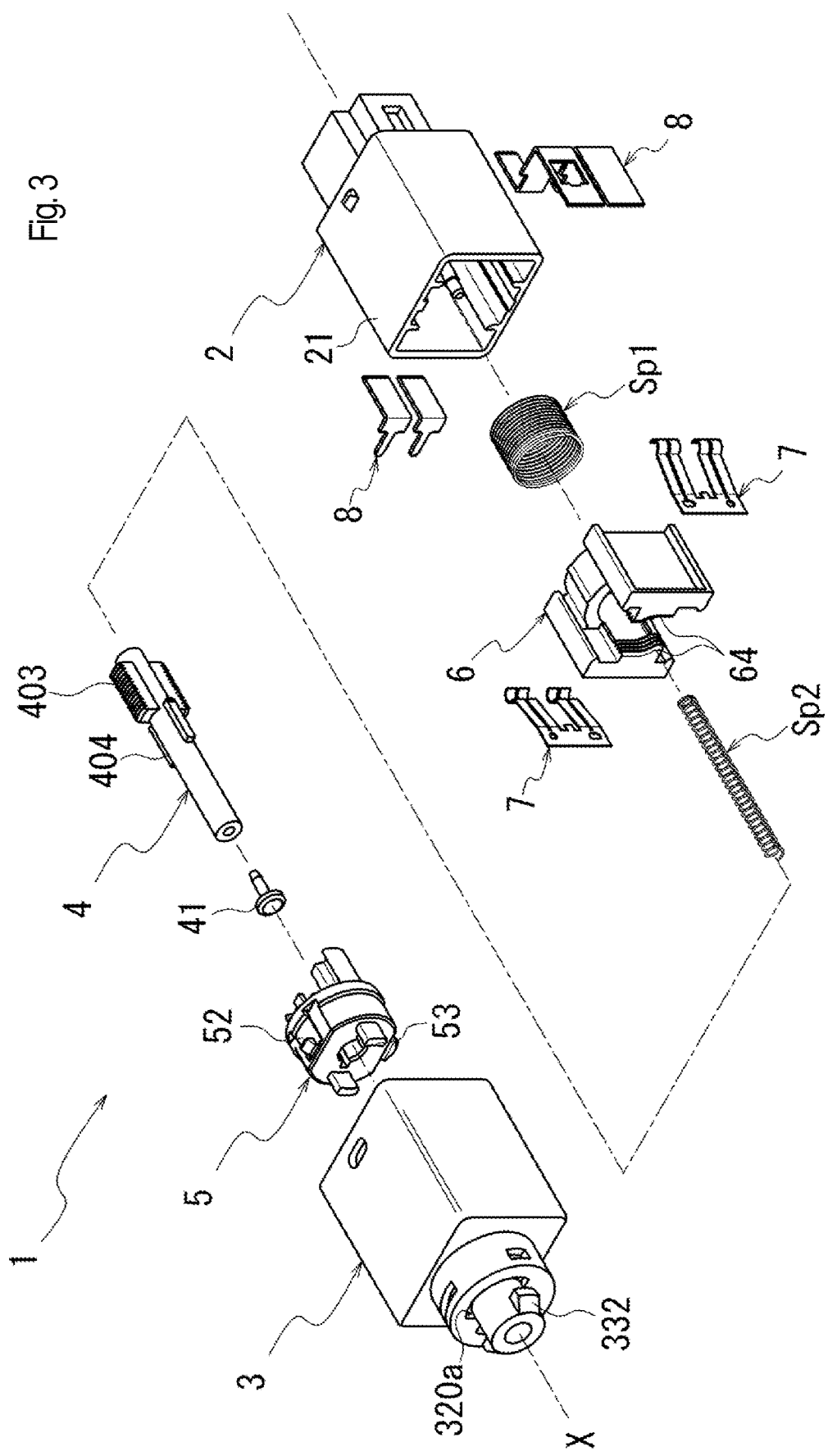
FIG. 3 is an exploded perspective view illustrating the switch device.

FIG. 3 is an exploded perspective view illustrating the switch device 1.

Figure 4A:
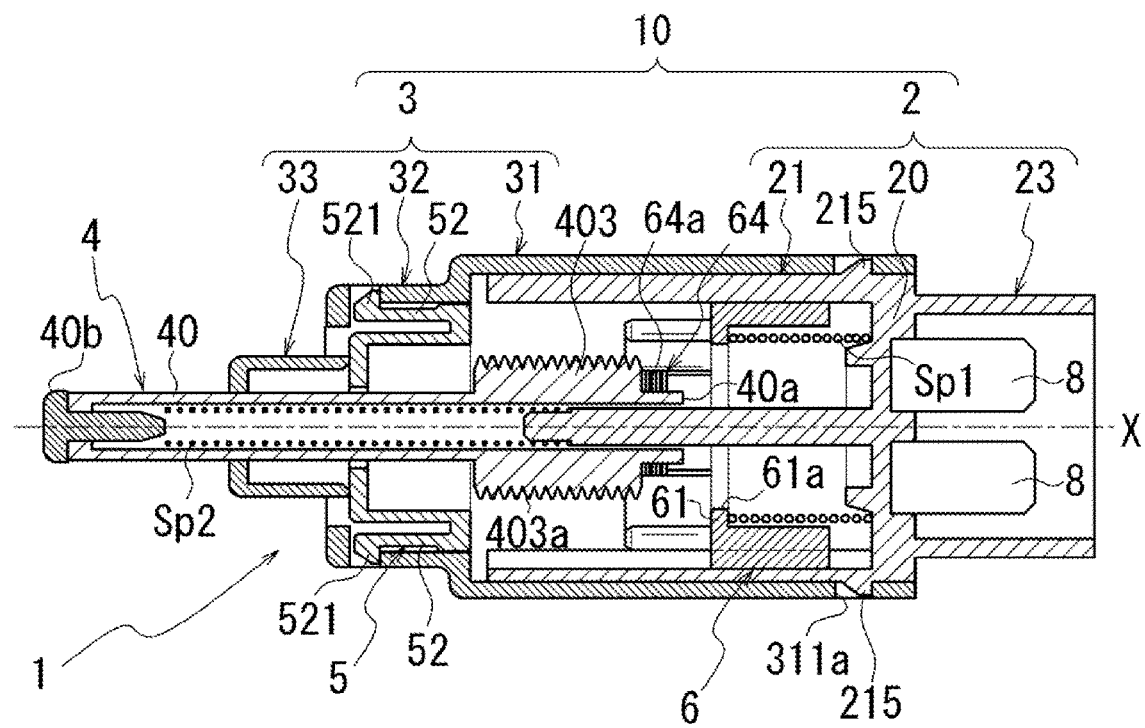
FIG. 4A and FIG. 4B are cross sections illustrating the switch device.
Figure 4B:
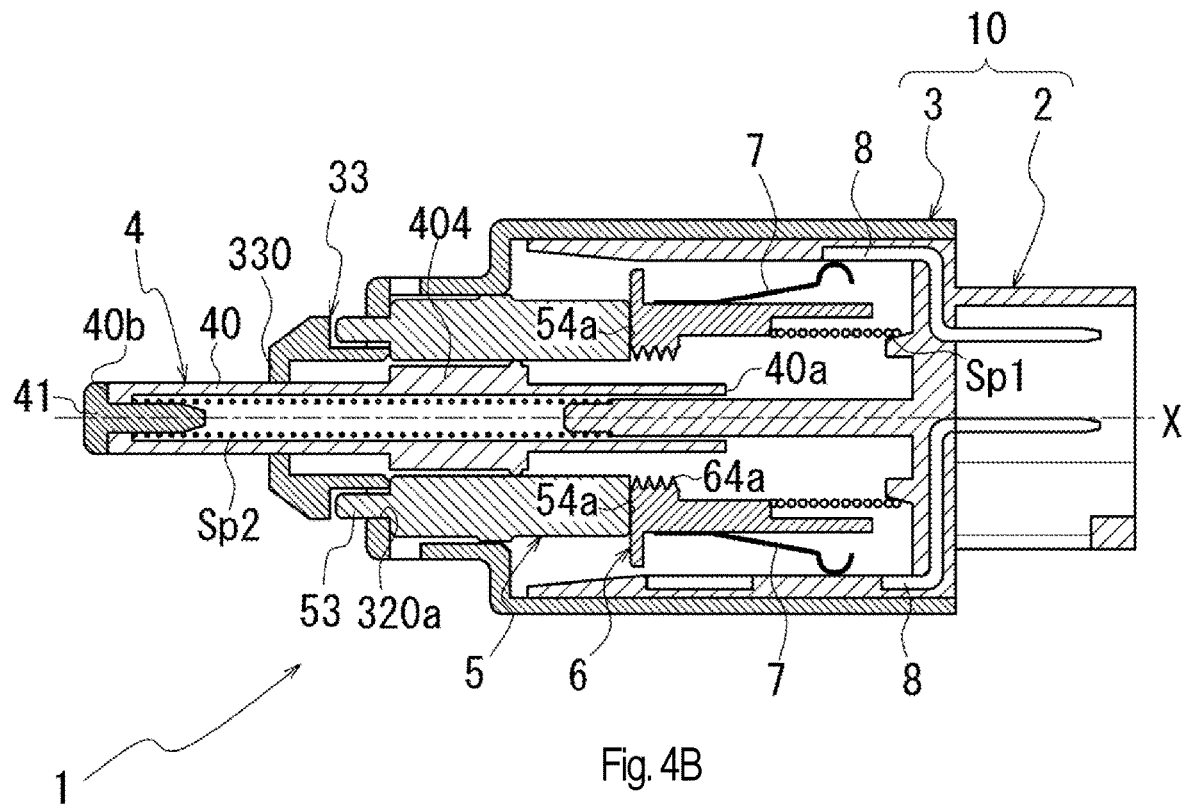

FIG. 4A and FIG. 4B are cross sections illustrating the switch devices 1. FIG. 4A is a cross section by cutting the switch device 1 on plane A in FIG. 1A. FIG. 4B is a cross section by cutting the switch device 1 on plane B in FIG. 1A.

As illustrated in FIGS. 1A, 1B and FIGS. 2A to 2F, the switch device 1 is provided with a main body case 10 in which a pole board 2 and a cover 3 are assembled, and a rod 4 moving forward/backward in an axis line X direction in association with an operation a brake pedal 100.

As illustrated in FIG. 3 and FIGS. 4A, 4B, a rod holder 5 to be inserted to surround an outer peripheral side of the rod 4 and a movable board 6 to be connected to the rod 4 are accommodated in the main body case 10.

The lock holder 5 movably supports the rod 4 in the axis line X direction in a state where a relative rotation of the lock holder 5 to the rod 4 is restricted.

The movable board 6 has a pair of movable contact points 7, 7 and moves forward/backward together with the rod 4 in the axis line X direction. In the switch device 1, when the movable board 6 moves in the axis line X direction, the pair of movable contact points 7, 7 supported by the movable board 6 move in the axis line X direction. Thereby the pair of movable contact points 7, 7 come in contact with or are separate from fixed contact points 8, 8 exposed to an inner periphery of an annular wall portion 21 in the pole board 2 in response to the forward/backward movement of the rod 4 to output an ON/OFF signal from the switch device 1.

FIG. 3 illustrates a state of extracting the fixed contact points 8, 8 embedded in the pole board 2 by molding, from the pole board 2.

Hereinafter, an explanation will made of respective components (the pole board 2, the cover 3, the rod 4, the lock holder 5 and the movable board 6) in the switch device 1. In the following explanation, a positional relation of the respective components in the switch device 1 will be explained on a basis of the axis line X along an assembling direction of the pole board 2 and the cover 3 and on a basis of the axis line X along a center axis of the rod 4.

[Rod 4]

FIG. 5A to FIG. 5D are drawings explaining the rod 4. FIG. 5A is a perspective view illustrating the rod 4, FIG. 5B is a side view illustrating the rod 4, FIG. 5C is a cross section taken along line A-A in FIG. 5B, and FIG. 5D is a cross section taken along line B-B in FIG. 5B.

As illustrated in FIG. 4B, the rod 4 has a cylindrical base portion 40.

The rod 4 is supported to be movable in the axis line X direction by the main body case 10 in a state where one end portion 40a-side of the base portion 40 in a longitudinal direction is positioned inside of the main body case 10 and the other end portion 40b-side is positioned outside of the main body case 10.

As illustrated in FIG. 5D, an accommodation hole 401 is formed inside of the base portion 40. The accommodation hole 401 opens to the one end portion 40a of the base portion 40. The accommodation hole 401 is linearly located along a center line (the axis line X) of the base portion 40 and extends close to the other end portion 40b of the base portion 40.

The accommodation hole 401 is closed at the end portion 40b-side of the base portion 40 by a wall portion 402. A communication hole 402a having a smaller diameter than the accommodation hole 401 is disposed in the center of the wall portion 402 to penetrate through the wall portion 402 in a thickness direction (the axis line X direction).

An abutting member 41 is attached to the end portion 40b of the base portion 40. The abutting member 41 includes a disk portion 410 having an outer diameter substantially aligned to the base portion 40, and a shaft portion 411 extending from the center of the disk portion 410.

The shaft portion 411 of the abutting member 41 is inserted in the communication hole 402a of the wall portion 402 in the axis line X direction. When the abutting member 41 is located in a position where the disk portion 410 abuts on the end portion 40b of the base portion 40, the shaft portion 411 protrudes into the accommodation hole 401 from the wall portion 402 by a predetermined length La.

A spring Sp2 is accommodated inside of the accommodation hole 401. One end side of the spring Sp2 is inserted on an outer peripheral side of the shaft portion 411 of the abutting member 41.

In this state, the one end of the spring Sp2 abuts on the wall portion 402 in the axis line X direction, and is positioned in the axis line X direction by the wall portion 402.

The other end side of the spring Sp2 is inserted on an outer peripheral side of a support bar 24 in the pole board 2-side inserted in the accommodation hole 401. The other end of the spring Sp2 is positioned in the axis line X direction by a step portion 242 of the support bar 24. In the switch device 1, the spring Sp2 is gripped between the wall portion 402 in the rod 4-side and the step portion 242 in the support bar 24-side in a state of being compressed in the axis line X direction.

Therefore as illustrated in FIG. 4B, in the main body case 10 the other end portion 40b-side of the rod 4 in the longitudinal direction is urged in a direction (the left direction in the figure) of protruding from the main body case 10 by an urging force acting from the spring Sp2.

Engaging portions 403 (refer to FIG. 4A) and engaging ribs 404 (refer to FIG. 4) are disposed on an outer periphery of the base portion 40 in an area positioned inside of the main body case 10.

As illustrated in FIG. 5B, in the base portion 40 the engaging portion 403 is disposed from a position away to the end portion 40b-side (the left side in FIG. 5B) from the end portion 40a. The engaging portion 403 extends to the end portion 40b-side along the center axis (the axis line X) of the base portion 40, and is formed in the center axis direction (the axis line X direction) of the base portion 40 to have a predetermined length L1.

As illustrated in FIG. 5C, the engaging portion 403 protrudes toward a radial outside of the axis line X from the outer periphery of the base portion 40 in a cross-sectional view perpendicular to the center axis (the axis line X) of the base portion 40.

The engaging portion 403 comprises two engaging portions which are disposed in a circumferential direction around the axis line X at intervals of 180 degrees, and the engaging portions 403, 403 are positioned on a diameter line C1 of the base portion 40.

An outer peripheral portion of the engaging portion 403 is formed in an arc shape in a cross-sectional view, and a plurality of screw grooves 403a are disposed on the outer peripheral portion of the engaging portion 403 at predetermined intervals in the axis line X direction.

In a cross-sectional view the engaging portion 403 includes a side surface 403b on one side and a side surface 403c on the other side across the diameter line C1 which are flat surfaces in parallel with each other. The side surfaces 403b, 403c are disposed in a positional relation of being symmetric across the diameter line C1.

In the switch device 1 the rod 4 and the main body case 10 are relatively rotated around the axis line X at the time of attaching the switch device 1 to the bracket 110 in the vehicle side (refer to FIGS. 2A to 2F).

On this occasion, the engaging portions 403, 403 of the rod 4 are engaged to engaging portions 64, 64 in the movable board 6-side (refer to FIG. 3) to be described later to connect the rod 4 and the movable board 6.

As illustrated in FIG. 5B, the engaging ribs 404, 404 in the rod 4 are formed to have a predetermined length L2 in the axis line X direction of the base portion 40. The length L2 of the engaging rib 404 is shorter than the length L1 of the engaging portion 403 (L1>L2).

In the base portion 40, the engaging rib 404 is disposed with a range of overlapping with the engaging portion 403 by a predetermined length ΔL as viewed in a radial direction of the axis line X.

In a cross-sectional view, the engaging ribs 404 protrude toward the radial outside of the axis line X from the outer periphery of the base portion 40. The engaging rib 404 comprises two engaging ribs which are disposed in the circumferential direction around the axis line X at intervals of 180 degrees.

The engaging rib 404 is disposed to be shifted by a phase of 90 degrees in the circumferential direction around the axis line X to the engaging portion 403 (refer to FIG. 5C).

As viewed in the axis line X direction, the engaging portions 403 and the engaging ribs 404 are alternately disposed at intervals of 90 degrees from each other in the circumferential direction around the axis line X.

In a cross-sectional view the engaging rib 403 includes a side surface 404b on one side and a side surface 404c on the other side in the diameter line C1 direction which are flat surfaces in parallel with each other.

An outer periphery 404a of the engaging rib 404 is a flat surface in parallel with the axis line X. In the engaging rib 404, a projection 405 is disposed on the outer periphery of the engaging rib 404 in the engaging portion 403-side.

The projection 405 protrudes toward the radial outside of the axis line X. The outer periphery 404a of the engaging rib 404 is formed with a predetermined height ha from an outer periphery 40c of the base portion 40 except for a part of the projection 405.

As illustrated in FIG. 4B, in the rod 4 the lock holder 5 is inserted to surround the outer surface side of the base portion 40 in an area of the base portion 40 positioned within the main body case 10. The lock holder 5 inserted to surround the outer surface side of the rod 4 is restricted in a relative rotation to the rod 4 in the circumferential direction around the axis line X. In this state, the rod 4 and the lock holder 5 are configured to be movable relatively in the axis line X direction.

[Lock Holder 5]

FIGS. 6A to 6E and FIGS. 7A to 7C are drawings explaining the lock holder 5.

FIG. 6A and FIG. 6B are perspective views illustrating the lock holder 5. FIG. 6C is a cross section illustrating the lock holder 5 by cutting the lock holder 5 on plane A in FIG. 6A. FIG. 6D is a drawing illustrating the lock holder 5 in a direction of arrows C-C in FIG. 6C. FIG. 6E is a cross section taken along line D-D in FIG. 6C.

FIG. 7A is a cross section illustrating the lock holder 5 by cutting the lock holder 5 on plane B in FIG. 6A. FIG. 7B is a cross section taken along line E-E in FIG. 6C. FIG. 7C is a drawing explaining an arrangement of the rod 4 between guide rails 54, 54 of the lock holder 5. In FIG. 7C, the rod 4 is illustrated in a virtual line for descriptive purposes.

As illustrated in FIG. 6C, the lock holder 5 includes a cylindrical base portion 50, and a wall portion 51 closing one end of the base portion 50.

As viewed in the axis line X direction, the base portion 50 is provided with width across flat portions 501, 501 in parallel with each other.

The width across flat portions 501, 501 are flat surfaces by cutting and removing part of the base portion 50 in the outer peripheral side along virtual lines Ln, Ln illustrated in FIG. 6D.

Herein, the virtual lines Ln, Ln are virtual lines positioned to be symmetric across a diameter line C2, which are perpendicular to the diameter line C1 and in parallel with each other.

In the base portion 50 the width across flat portions 501, 501 are formed extending to the vicinity of an end portion 50a at the opposite side of the wall portion 51 (the right side in FIG. 6C).

Engaging pieces 52, 52 located in a direction along the axis line X are disposed outside of the width across flat portions 501, 501.

Base ends of the engaging pieces 52, 52 in the longitudinal direction are connected to areas (connecting portions 502) of the base portions 50, 50 in the outside over the width across flat portions 501, 501 in the axis line X direction.

The engaging pieces 52, 52 each have a length L4 shorter than a length L3 of the base portion 50 in the axis line X direction (L3>L4).

Locking claws 521, 521 are disposed on outer peripheries of the engaging pieces 52, 52 in the tip end sides. The locking claw 521 protrudes outward from the outer periphery of the engaging piece 52, and an outer peripheral edge 521a of the locking claw 521 is positioned outside over an outer peripheral edge 502a of the base portion 50.

The engaging piece 52 is cantilever-supported by the base portion 50 (the connecting portion 502), and a tip end side of the engaging piece 52 in which the locking claw 52 1 is disposed is configured to be flexibly displaceable in the radial direction of the axis line X.

As illustrated in FIG. 6D, a through hole 510a is formed in the central part of the wall portion 51 for insert of the base portion 40 of the rod 4.

Key grooves 540, 540 are disposed on a peripheral edge part of the through hole 510a. The two key grooves 540, 540 are disposed in the circumferential direction around the axis line X at intervals of 180 degrees. The key grooves 540, 540 are formed to be recessed in a direction away from each other on the diameter line C2.

The key grooves 540, 540 extend to the guide rails 54, 54 to be described later (refer to FIG. 6E).

As illustrated in FIG. 6D, the wall portion 51 is provided with engaging projections 53, 53 outside of the key grooves 540, 540 as viewed in the axis line X direction. The two engaging projections 53, 53 are disposed in the circumferential direction around the axis line X at intervals of 180 degrees. The engaging projections 53, 53 are positioned outside of the key grooves 540, 540 on the diameter line C2.

As illustrated in FIG. 7A, the engaging projections 53, 53 protrude in a direction away from the wall portion 51 by a predetermined protruding height h2.

The predetermined protruding height h2 is set to a height to the extent that the engaging projections 53, 53 penetrate through an arc-shaped groove 320a of the cover 3 to be described later in the axis line X direction and tip ends of the engaging projections 53, 53 do not make contact with engaging portions 332 of the cover 3.

As illustrated in FIGS. 6C and 6E, the base portion 50 is provided with the guide rails 54, 54 in a direction along the axis line X for guiding the movement of the rod 4 in the axis line X direction.

One end 54a of the guide rail 54 is positioned outside of the base portion 50, and the other end 54b is connected to a surface of the wall portion 51 in the base portion 50-side.

The guide rails 54, 54 extend from the wall portion 51 through the inside of the base portion 50 to the outside of the base portion 50.

As illustrated in FIG. 7B, reinforcement ribs 505, 506 are disposed in the inside of the base portion 50 to support the guide rails 54, 54.

The reinforcement ribs 505, 505 are disposed along the diameter line C2, and connect the guide rails 54, 54 and the base portion 50.

The reinforcement ribs 506, 506 are disposed in a positional relation of being symmetrical across the diameter line C1, and connect the guide rails 54, 54 and areas of the base portion 50 where the width across flat portions 501, 501 are disposed.

As viewed in the axis line X direction, the guide rails 54, 54 are disposed in a positional relation of being symmetrical across the axis line X, and the key grooves 540, 540 open to portions of the guide rails 54, 54 opposing to each other.

The key grooves 540, 540 extend to the aforementioned wall portion 51, and as viewed in the axis line X direction, the through hole 510a formed in the wall portion 51 is positioned between the guide rails 54, 54 (refer to FIG. 7B).

As described before, the lock holder 5 is disposed to be inserted to surround the outer surface side of the rod 4, and the base portion 40 of the rod 4 is configured to penetrate through the through hole 510a of the lock holder 5 (refer to FIG. 7C).

In this state, the engaging ribs 404, 404 of the rod 4 are located in the key grooves 540, 540 of the guide rails 54, 54, and meanwhile, the engaging portions 403, 403 of the rod 4 are located between the pair of the reinforcement ribs 506, 506.

In the switch device 1, when the rod 4 and the lock holder 5 displace relative to each other in the axis line X direction, the engagement between the engaging ribs 404, 404 in the rod 4-side and the key grooves 540, 540 is held.

Therefore since the relative movement in the axis line X direction between the rod 4 and the lock holder 5 is guided by the guide rails 54, 54 located in a direction along the axis line X, the relative movement between the rod 4 and the lock holder 5 can be smoothly performed.

In the lock holder 5, the reinforcement ribs 506, 506 (refer to FIG. 7C) are disposed to avoid interference with the engaging portion 403 in the rod 4-side. Therefore the relative movement between the rod 4 and the lock holder 5 is not blocked due to the interference of the reinforcement ribs 506, 506 with the engaging portion 403.

As illustrated in FIG. 4B, the one ends 54a, 54a of the guide rails 54, 54 of the lock holder 5 abut on the movable board 6 in the axis line X direction in the main body case 10.

[Movable Board 6]

FIGS. 8A to 8D and FIGS. 9A, 9B are drawings explaining the movable board 6.

Figure 8A:
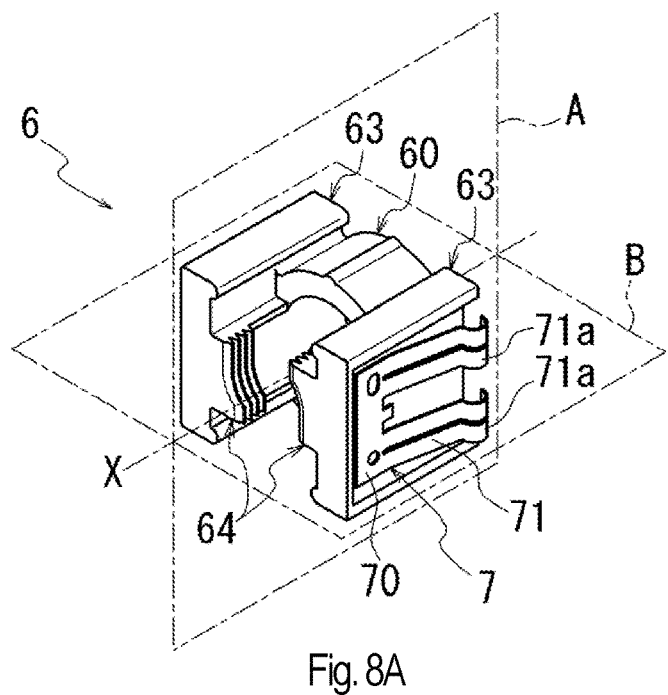
FIG. 8A to FIG. 8D are drawings explaining a moving block.
Figure 8B:
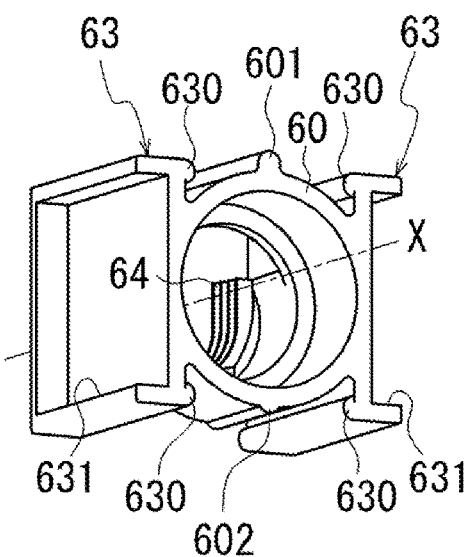
Figure 8C:
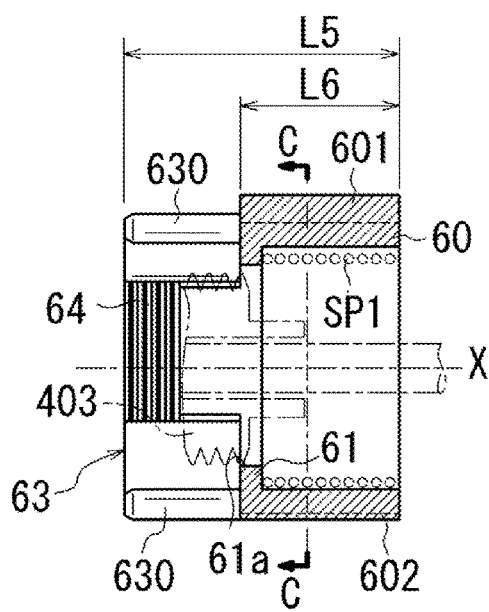
Figure 8D:
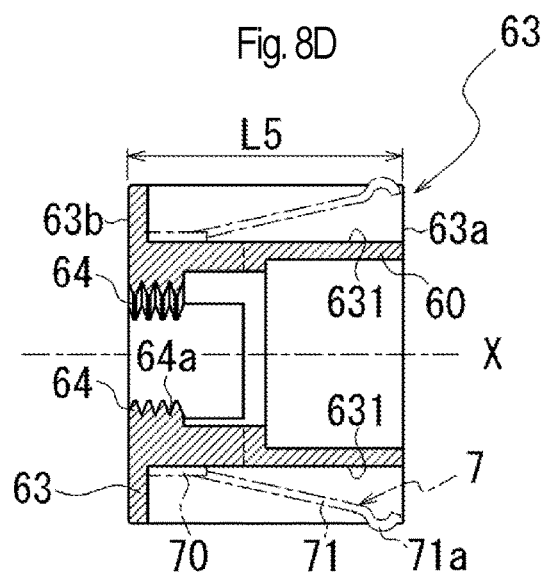

FIGS. 8A, 8B are perspective views illustrating the movable board 6. FIG. 8C is a cross section by cutting the movable board 6 on plane A in FIG. 8A. FIG. 8D is a cross section by cutting the movable board 6 on plane B in FIG. 8A.

Figure 9A:
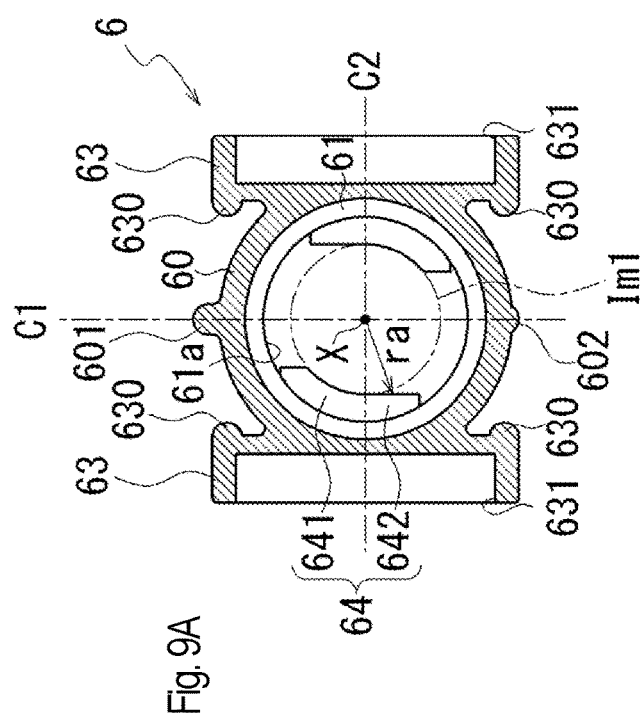
FIG. 9A and FIG. 9B are drawings explaining the moving block.
Figure 9B:
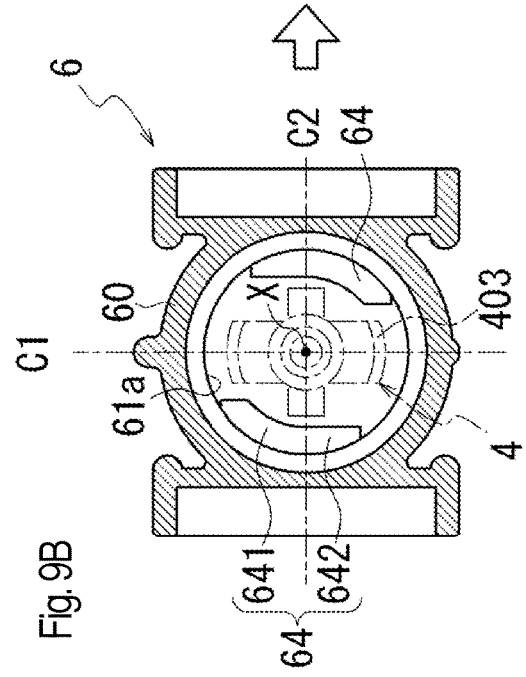

FIG. 9A is a cross section by cutting the movable board 6 along line C-C in FIG. 8C. FIG. 9B is a diagram explaining an engaging process between the engaging portion 403 of the rod 4 and the engaging portion 64 of the movable board 6.

As illustrated in FIG. 8A, the movable board 6 includes an annular base portion 60, a pair of contact point support portions 63, 63, and the pair of the engaging portions 64, 64 disposed in portions of the pair of the contact point support portions 63, 63 opposing from each other.

As illustrated in 8C, the annular base portion 60 has a length L6 in the axis line X direction shorter than a length L5 of the contact point support portions 63, 63 in the axis line X direction. The annular base portion 60 is positioned in one end 63a-side of the contact point support portion 63 in the axis line X direction.

As illustrated in FIG. 9A, the contact point support portions 63, 63 are disposed in a positional relation of being symmetrical across the axis line X, and the annular base portion 60 connects the contact point support portions 63, 63 each other between the contact point support portions 63, 63.

As illustrated in FIG. 8C, in the annular base portion 60 a wall portion 61 is disposed in an end portion of the contact point support portion 63 in the other end 63b-side (the left side in the figure). An opening 61a is formed in the central part of the wall portion 61, and the opening 61a is formed to be sized such that the engaging portion 403 of the rod 4 can pass therethrough.

As illustrated in FIG. 8D, accommodation portions 631, 631 of the movable contact points 7, 7 open on outer peripheries of the contact point support portions 63, 63 at the opposite side of the axis line X as viewed in the axis line X direction. The accommodation portions 631, 631 are disposed using the thickness of the contact point support portions 63, 63.

As illustrated in FIG. 8D, in the accommodation 631 a fixed piece 70 of the movable contact point 7 is fixed on an end portion on one side in the axis line X direction. The fixed piece 70 is a rectangular part located in a direction along a width direction of the contact point support portion 63, and is provided with a contact piece 71 extending in a direction away from the fixed piece 70 (refer to FIG. 8A). The contact piece 71 comprises a plurality of contact pieces which are located to be spaced in the width direction of the fixed piece 70. Each of the contact pieces 71 is cantilever-supported by the fixed piece 70, and a tip end 71a-side provided with a curved portion is located in a position of protruding outside from the accommodation portion 631. In this state, the tip end 71a-side of the contact piece 71 can enter or get out of the accommodation portion 631.

In the contact point support portions 63, 63, areas in the other end 63b-side in the axis line X direction face to each other across the axis line X. The engaging portions 64, 64 are disposed on the opposing surfaces of each other of the opposing areas (refer to FIG. 8D).

The engaging portion 64 is a part engaged to the engaging portion 403 in the rod 4-side at the time of connecting the rod 4 and the movable board 6.

The engaging portion 64 protrudes to the axis line X side from the contact point support portion 63, and screw grooves 64a are disposed on a surface of the engaging portion 64 in the axis line X side at predetermined intervals in the axis line X direction.

As illustrated in FIG. 9A, as viewed in the axis line X direction the engaging portion 64 includes a first engaging portion 641 having an inner periphery along a virtual circle ImI concentric with the opening 61a, and a second engaging portion 642 having an inner periphery along the diameter line C1.

The second engaging portion 642 extends linearly in a tangential direction of the virtual circle ImI, and a separate distance ra of the second engaging portion 642 from the axis line X is longer as separate from the first engaging portion 641.

In the movable board 6, the engaging portions 64, 64 each are disposed on one side and on the other side across the axis line X. As viewed in the axis line X direction, the engaging portion 64 on the one side and the engaging portion 64 on the other side are disposed in a positional relation to be rotated in the circumferential direction around the axis line X by 180 degrees.

In FIG. 9A, the first engaging portion 641 and the second engaging portion 642 line up in this order in each of the engaging portion 64 on the one side and the engaging portion 64 on the other side in the counterclockwise direction around the axis line X.

As illustrated in FIG. 4A, in the main body case 10 of the switch device 1, the engaging portions 64, 64 of the movable board 6 are connected to the engaging portions 403,403 in the rod 4-side.

In the present embodiment, for attaching the switch device 1 to the bracket 110, after the rod 4 is pushed into the main body case 10 from the initial position by a predetermined length, when the main body case 10 is rotated around the axis line X, the engaging portion 64 is engaged to the engaging portion 403.

As illustrated in FIG. 9B, in a state where the rod 4 is pushed into the main body case 10 from the initial position by the predetermined length, the engaging portions 403, 403 in the rod 4-side are positioned between the engaging portions 64, 64 opposing across the axis line X.

When the main body case 10 is rotated from this state in the counterclockwise direction, the movable board 6 is also rotated together with the main body case 10 in the counterclockwise direction.

Then, the engaging portions 403, 403 in the rod 4-side are gradually engaged to the second engaging portion 642 of the engaging portion 64 in the movable board 6-side with the rotation of the main body case 10. Finally, the engaging portions 403, 403 in the rod 4-side are engaged to the first engaging portions 641, 641 in the movable board 6-side, whereby the rod 4 and the movable board 6 are connected. As a result, the rod 4 and the movable board 6 are connected to be movable together in the axis line X direction.

In the wall portion 61 of the movable board 6, as illustrated in FIG. 4A, one end of a spring Sp1 supported by the pole board 2 abuts on an area, which surrounds the central opening 61a, of the wall portion 61 of the movable board 6 in the axis line X direction.

In this state, the movable board 6 is urged to the lock holder 5-side (the left side in the figure) by an urging force of the spring Sp1. When the brake pedal 100 is depressed, the other end portion 40b-side of the rod 4 protrudes to the outside of the main body case 10 in accordance with an operation amount of the brake pedal 100.

[Pole Board 2]

FIGS. 10A to 10C and FIGS. 11A, 11B are drawings explaining the pole board 2.

Figure 10A:
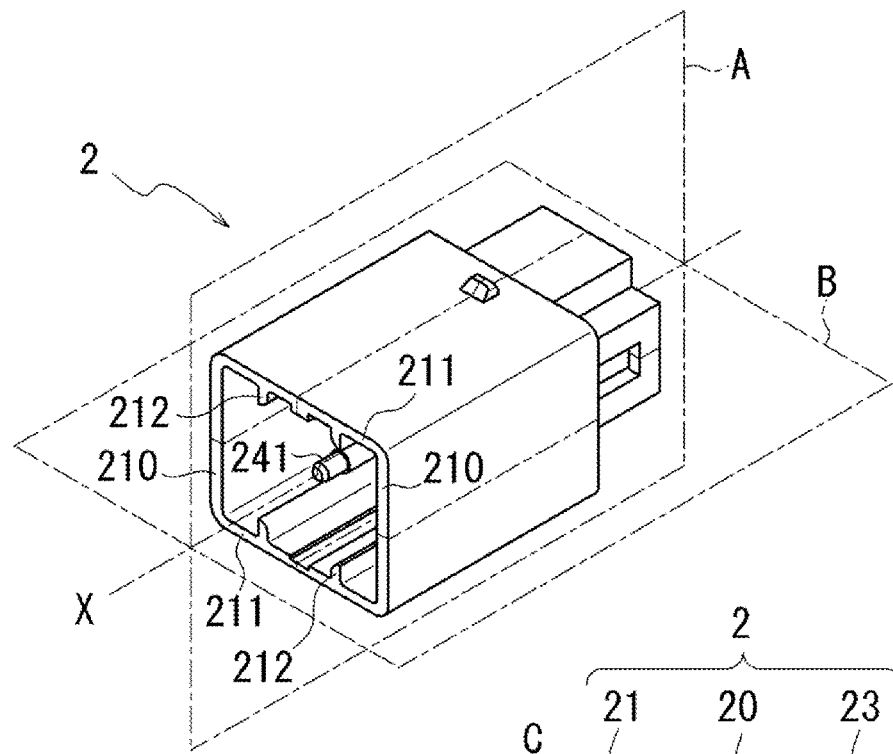
FIG. 10A to FIG. 10C are drawings explaining a pole board.
Figure 10B:
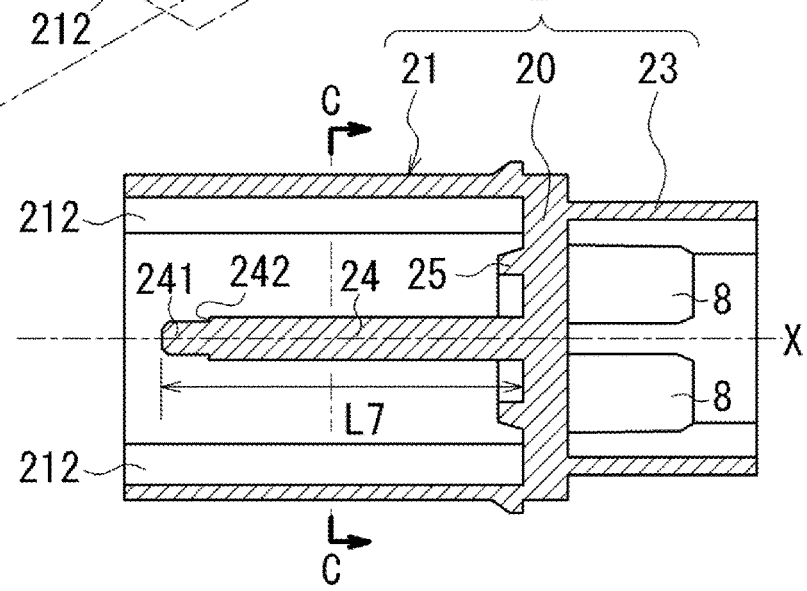
Figure 10C:
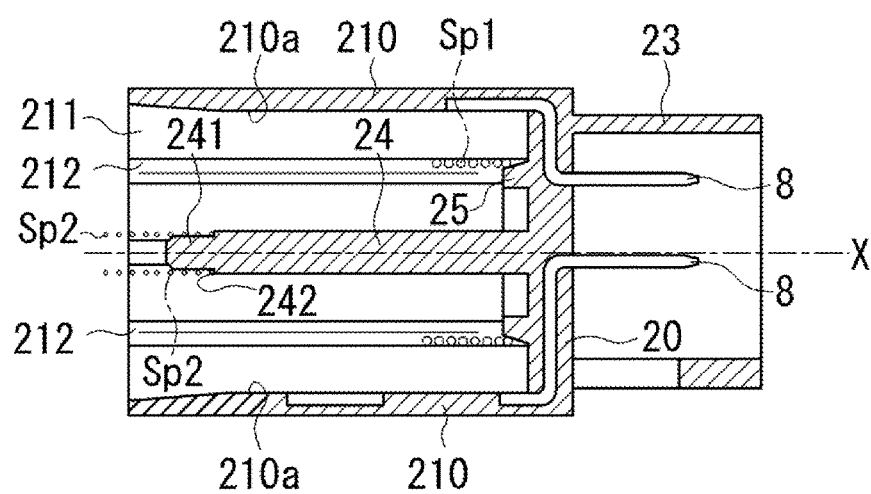
Figure 11A:
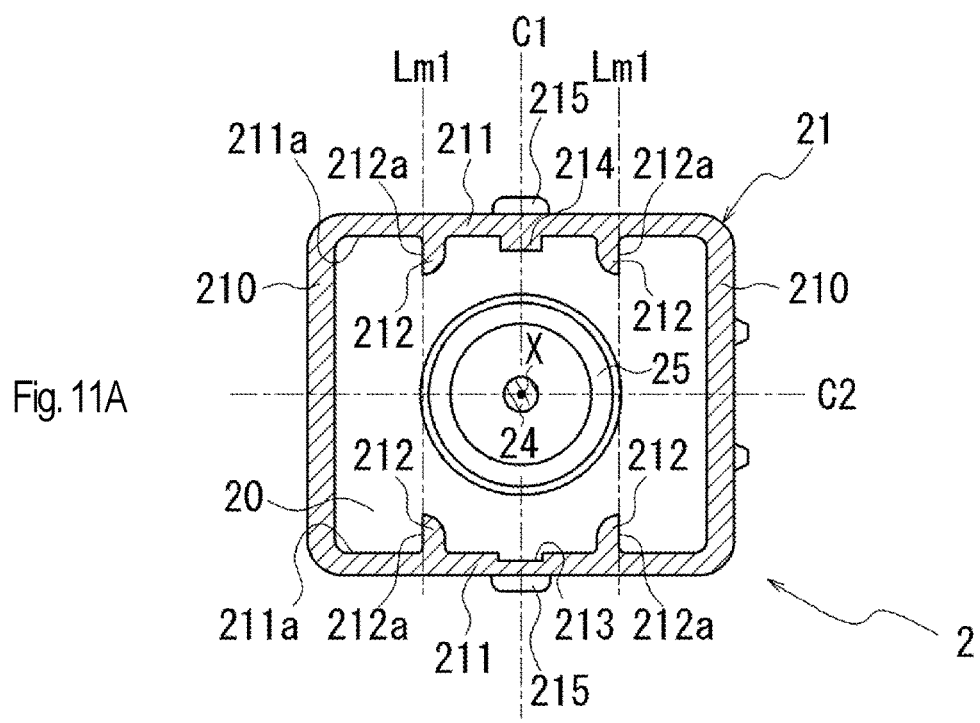
FIG. 11A and FIG. 11B are drawings explaining the pole board.
Figure 11B:
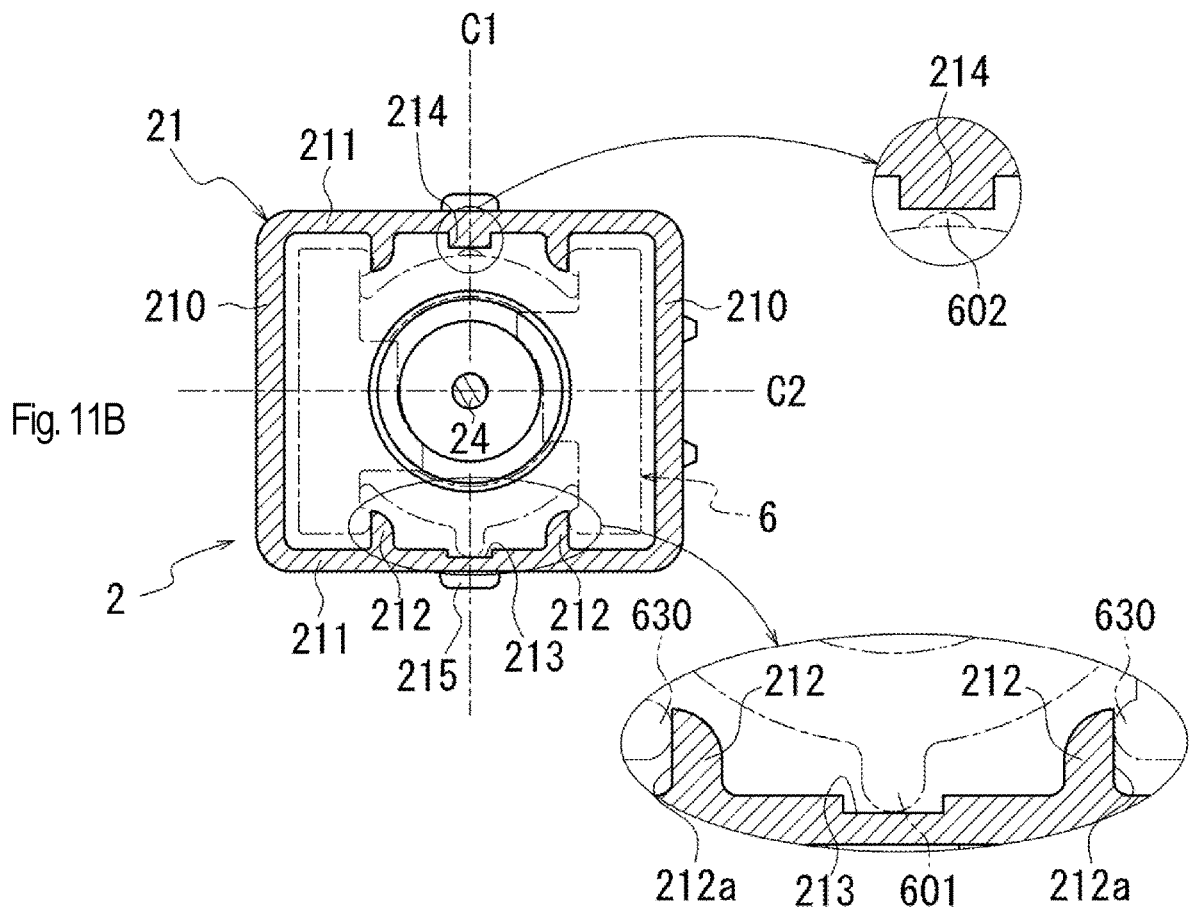

FIG. 10A is a perspective view illustrating the pole board 2, FIG. 10B is a cross section by cutting the pole board 2 on plane A in FIG. 10A, and FIG. 10C is a cross section by cutting the pole board 2 on plane B in FIG. 10A. FIG. 11A is a cross section by cutting the pole board 2 along line C-C in FIG. 10B. FIG. 11B is a drawing explaining an arrangement of the movable board 6 located in the annular wall portion 21.

The pole board 2, as illustrated in FIG. 10B, includes a plate-shape base portion 20, and the annular wall portion 21a surrounding an outer peripheral edge of the plate-shaped base portion 20 over an entire periphery.

A part of the fixed contact points 8, 8 is embedded in the base portion 20 and the annular wall portion 21, and an area, which protrudes from the base portion 20, of the fixed contact point 8 is surrounded by a wall portion 23 formed integrally with the base portion 20.

In the switch device 1, the area, which protrudes from the base portion 20, of the fixed contact point 8, and the wall portion 23 surrounding this area are connection portions (connector portions) to external connection terminals.

The respective constitutional elements (the base portion 20, the annular wall portion 21, the wall portion 23, the fixed contact points 8, 8) of the pole board 2 are formed integrally by the molding of resin materials.

As illustrated in FIG. 11A, the base portion 20 is, as viewed in the axis line X direction, is formed in a substantially rectangular shape and is located in a direction perpendicular to the axis line X direction.

The support bar 24 of the rod 4 is disposed on the center of the base portion 20. The support bar 24 is a columnar member located in a direction along the axis line X, and is formed integrally with the base portion 20.

The support bar 24, as illustrated in FIG. 10C, linearly extends in a direction away from the base portion 20 on the axis line X, and a small diameter portion 241 an outer diameter of which is smaller than the support bar 24 is disposed in a tip end portion of the support bar 24.

One end side of the spring Sp2 is inserted to surround an outer surface side of the small diameter portion 241 in the axis line X direction. The one end of the spring Sp2 abuts on the step portion 242 as a boundary between the small diameter portion 241 and the support bar 24 in the axis line X direction. In this state, the one end of the spring Sp2 is positioned in the axis line X direction by the step portion 242 formed in the support bar 24.

The length L7 of the support bar 24 in the axis line X direction is set to a length to the extent that a tip end of the small diameter portion 241 does not protrude to the outside from the annular wall portion 21 (refer to FIG. 10B).

A support portion 25 of the spring Sp1 is disposed on a surface, on which the support bar 24 is disposed, of the base portion 20. The support portion 25 as viewed in the axis line X direction is formed in an annular shape surrounding the support bar 24 by a predetermined interval, and one end of the spring Sp1 is inserted to surround an outer periphery of the support portion 25 to be positioned in the axis line X direction (refer to FIG. 10C).

As illustrated in FIG. 11A, the annular wall portion 21 as viewed in the axis line X direction includes a pair of first wall portions 210, 210, and a pair of second wall portions 211, 211 connecting end portions of the pair of the first wall portions 210, 210 to each other.

The annular wall portion 21 as viewed in the axis line X direction is formed in a substantially rectangular shape by the pair of the first wall portions 210, 210, and the pair of the second wall portions 211, 211.

The fixed contact points 8, 8 are exposed on opposing surfaces 210a, 210a of each other in the pair of the first wall portions 210, 210 (refer to FIG. 10C).

As illustrated in FIGS. 11A, 11B, a projection portion 214 or a recessed portion 213 is disposed in the longitudinal center of each of inner peripheral surfaces 211a, 211a of the second wall portions 211, 211.

Projections 602, 601 of the movable board 6 abut on the projection portion 214 and the recessed portion 213 in a state of assembling the switch device 1 (refer to FIG. 11B).

The projection portion 214 and the recessed portion 213 are positioned on the diameter line C1, and guide walls 212, 212 are disposed on both sides across the projection portion 214 and the recessed portion 213 (the diameter line C1) in the second wall portions 211, 211.

Surfaces, which are at the opposite side of the diameter line C1, of the guide walls 212, 212 are flat surfaces 212a, 212a in parallel with the diameter line C1. The guide walls 212, 212 are disposed over an entire length of the second wall portions 211, 211 in the axis line X direction (refer to FIG. 10C).

Projections 630, 630 of the movable board 6 are configured to abut on the flat surfaces 212a, 212a in a state where the switch device 1 is assembled (refer to FIG. 11B).

Therefore when the movable board 6 moves in the axis line X direction, the projections 630, 630 in the movable board 6-side slide on the flat surfaces 212a, 212a, and the projections 602, 601 in the movable board 6-side slide on the projection portion 214 and the recessed portion 213, whereby the movement of the movable board 6 in the axis line X direction is guided.

The engaging claws 215, 215 are disposed on the outer periphery of the first wall portions 210, 210.

As illustrated in FIGS. 4A, 4B, the lock holder 5 is located inside of the first restriction portion 32 of the cover 3 in the main body case 10 in which the cover 3 is assembled to the pole board 2.

[Cover 3]

FIGS. 12A to 12E to FIGS. 14A to 14F are drawings explaining the cover 3.

FIGS. 12A, 12B are perspective views illustrating the cover 3. FIG. 12C is a cross section by cutting the cover 3 on plane A in FIG. 12A. FIG. 12D is a cross section taken in a direction of arrows C-C in FIG. 12C. FIG. 12E is a cross section by cutting the cover 3 on plane B in FIG. 12A.

Figure 13E:
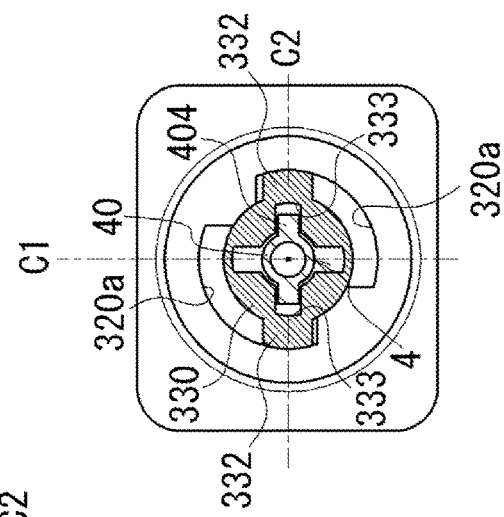
FIG. 13A to FIG. 13E are drawings explaining the cover.
Figure 13B:
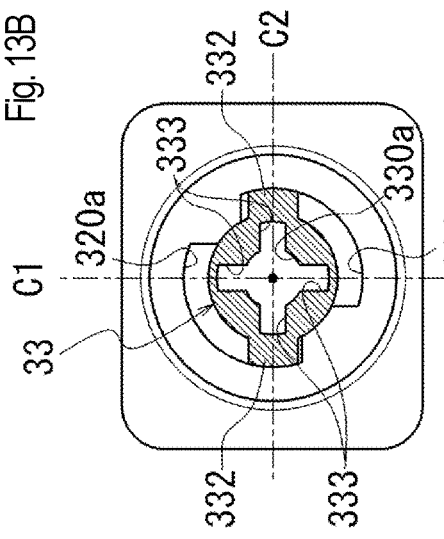
Figure 13D:
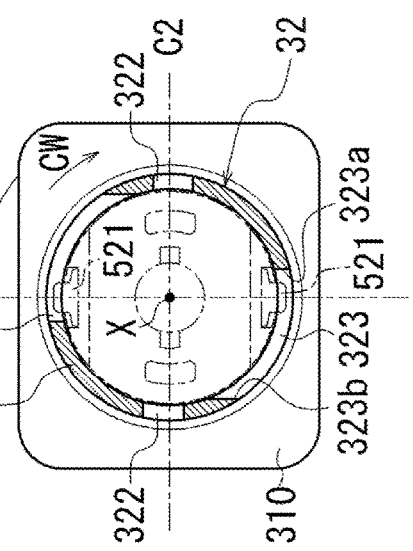
Figure 13A:
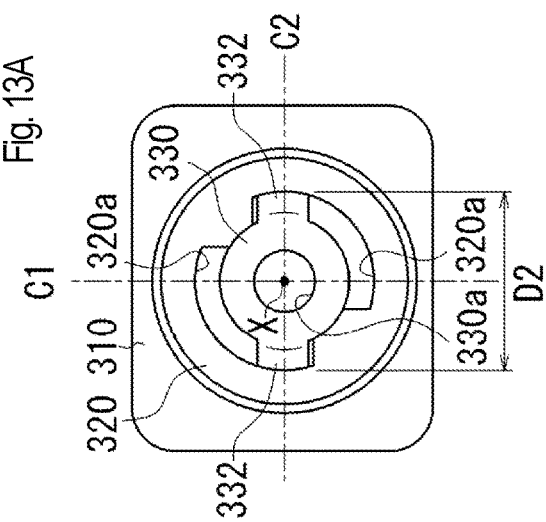
Figure 13C:
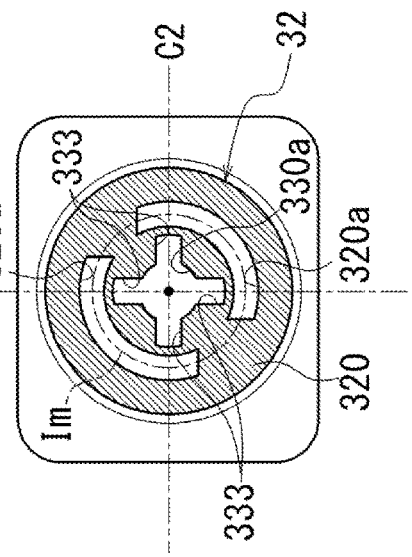

FIG. 13A is a drawing illustrating the cover 3 as viewed in a direction of arrows D-D in FIG. 12E. FIG. 13B is a cross section taken in a direction of arrows E-E in FIG. 12E. FIG. 13C is a cross section taken in a direction of arrows F-F in FIG. 12E. FIG. 13D is a cross section taken in a direction of arrows G-G in FIG. 12E.

FIGS. 14A to 14F are drawings explaining rotation of the cover 3 (the main body case 10) in the process of attaching the switch device 1 to the bracket 110 (refer to FIGS. 2C, 2E).

In FIGS. 14A to 14F, the explanation is made of a displacement of positions of locking claws 521, 521 of the engaging pieces 52, 52 in the lock holder 5-side and a displacement in a position of the engaging projection 53 in the lock holder 5-side in the process where the cover 3 (the main body case 10) rotates.

As illustrated in FIG. 4A, the cover 3 includes an outer peripheral wall 31 inserted to surround an outer peripheral side of the annular wall portion 21 of the pole portion 2, a first restriction portion 32 defining a rotational range of the lock holder 5 in the cover 3, and the second restriction portion 33 restricting a relative rotation between the rod 4 and the cover 3 until the rod 4 reaches a position of being engageable to the movable board 6.

As illustrated in FIGS. 12B, 12C, the outer peripheral wall 31 includes first wall portions 311, 311 having engaging holes 311a, 311a in the center in the width direction, and second wall portions 312, 312 connecting end portions of each other of the first wall portions 311, 311. As viewed in the axis line X direction, the outer peripheral wall 31 has a rectangular shape, and is formed in a shape of being inserted to surround an outer peripheral side of the annular wall portion 21 in the pole board 2-side substantially without a clearance.

The engaging holes 311a, 311a of the first wall portions 311, 311 are located to positions corresponding to the engaging claws 215, 215 (refer to FIG. 4A) disposed on the annular wall portion 21 in the pole board 2-side. At the time of assembling the cover 3 and the pole board 2 in the axis line X direction, the engaging claws 215, 215 in the pole board 2-side are engaged to the engaging holes 311a, 311a in the cover 3-side, whereby the cover 3 is restricted from falling down from the pole board 2.

As illustrated in FIG. 12C, one end of the outer peripheral wall 31 in the axis line X direction is closed by a wall portion 310 perpendicular to the axis line X, and the first restriction portion 32 is disposed in the central part of the wall portion 310.

The first restriction portion 32 includes a tubular peripheral wall portion 321, and a wall portion 320 closing one end of the peripheral wall portion 321. An area, which overlaps with the peripheral wall portion 321, of the wall portion 310 opens, and a columnar space 325 inside of the peripheral wall portion 321 and a rectangular space 315 inside of the annular wall portion 21 are communicated with each other.

As illustrated in FIG. 13D, the peripheral wall portion 321 is provided with positioning grooves 322 and guide grooves 323.

The positioning grooves 322 and the guide grooves 323 are provided to penetrate through the peripheral wall portion 321 in the thickness direction.

The positioning grooves 322 are positioned on the diameter line C2, which passes through the axis line X, of the peripheral wall portion 321, and are located to be shifted by a phase of 180 degrees from each other in the circumferential direction around the axis line X.

The guide groove 323 is formed by cutting the peripheral wall portion 321 over a predetermined range in a direction closer to the positioning groove 322 (a clockwise direction CW in FIG. 13D) from a position overlapping with the diameter line C1.

One end portion 323a of the guide groove 323 in the circumferential direction around the axis line X and the other end portion 323b are positioned on one end side and on the other end side across the diameter line C1, and are disposed in parallel with each other.

FIG. 13D and FIG. 14A show a positional relation between the locking claw 521 of the lock holder 5 and the guide groove 323 in a state prior to attaching the switch device 1 to the bracket 110 in the vehicle side (refer to FIGS. 2C, 2D).

As illustrated in FIG. 14A, the rotation of the rod 4 and the lock holder 5 is restricted and the main body case 10 is rotated around the axis line X (in a counterclockwise direction CCW in the figure) from a state in FIG. 14A at the time of attaching the switch device 1 to the bracket 110.

Then, the end portion 323b in the guide groove 323-side comes in contact with the locking claw 521 in the circumferential direction around the axis line X. As described before, since the locking claw 521 is flexibly displaceable to the axis line X side (the inner diameter side), when the locking claw 521 is pushed out by an inclined surface of the end portion 323b to be displaced to the inner diameter side, the rotation of the main body case 10 around the axis line X continues (refer to FIG. 14B).

When the locking claw 521 runs over the end portion 323b, the locking claw 521 is engaged to the positioning groove 322 neighbored to the guide groove 323 to restrict the relative rotation between the main body case 10, and the rod 4 and the lock holder 5.

In the present embodiment, the positioning groove 322 and the guide groove 323 each are formed with the same width W1 in the axis line X direction (refer to FIG. 12C).

As illustrated in FIG. 12C, in the peripheral wall portion 321 of the first restriction portion 32, one end of the peripheral wall portion 322 in the axis line X direction is closed by the wall portion 320 perpendicular to the axis line X, and the columnar second restriction portion 33 is disposed in the central part of the wall portion 320.

As illustrated in FIGS. 13A, 13C, the wall portion 320 is provided with the arc-shaped grooves 320a, 320a along the outer surface of the second restriction portion 33.

The arc-shaped grooves 320a are disposed along the circumferential direction around the axis line X on the virtual circle Im at the center of the axis line X. As viewed in the axis line X direction, the arc-shaped grooves 320a, 320a are located in a positional relation by being shifted to each other by a phase of 180 degrees across the axis line X.

The engaging projections 53, 53 of the lock holder 5 as described before are configured to be inserted in the arc-shaped grooves 320a, 320a in the axis line X direction (refer to FIG. 7A).

Herein, the attachment of the switch device 1 to the bracket 110 in the vehicle side (refer to FIG. 1B) is performed in a state of pushing the rod 4 on the bracket 110 in the brake pedal 100-side.

In this state, since the rotation of the rod 4 (the lock holder 5) around the axis line X is restricted, the main body case 10 is rotated around the axis line X.

The arc-shaped grooves 320a, 320a enable the relative rotation around the axis line X of the lock holder 5 and the main body case 10, and are provided to define a rotational range thereof.

Therefore an angle range of the arc-shaped groove 320a in the circumferential direction around the axis line X is set to be capable of securing a rotational range necessary for the main body case 10 at the time of attaching the switch device 1 to the bracket 110.

As illustrated in FIG. 13B, a through hole 330a of the rod 4 is provided in the central part of the second restriction portion 33. The through hole 330a penetrates through a restriction wall 330 of the second restriction portion 33 in the axis line X direction, and communicates an exterior of the second restriction portion 33 with the space 325 in the inside of the first restriction portion 32 (refer to FIG. 12C).

As illustrated in FIG. 13B, the second restriction portion 33 is, as viewed in the axis line X direction, provided with a plurality of restriction grooves 333 opening to the through hole 330a.

The restriction groove 333 is formed to be recessed to a radial outside of the axis line X, and comprises four restriction grooves at intervals of 90 degrees in the circumferential direction around the axis line X, and as illustrated in FIG. 12C, each of the restriction grooves 333 opens to the space 325 in the inside of the second restriction portion 33 in the axis line X direction.

As illustrated in FIGS. 13B, 13C, the engaging ribs 404, 404 of the rod 4 are engageable to the two restriction grooves 333, 333 positioned on the common diameter lines C1, C2 among the restriction grooves 333.

FIG. 13E shows a state where the engaging ribs 404, 404 of the rod 4 are engaged to the two restriction grooves 333, 333 positioned on the diameter lines C2, and in this state, the relative rotation between the rod 4 and the lock holder 5 around the axis line X is restricted.

As illustrated in FIG. 15B, in the second restriction 33, the restriction wall 330 surrounding the through hole 330a is provided on the opposite side (the left side in the figure) of the pole board 2 in the restriction groove 333.

As illustrated in FIG. 15A, the engaging rib 404 of the rod 4 pushed by an urging force of the spring Sp2 abuts on the restriction wall 330 in the axis line X direction.

The restriction wall 330 and the engaging rib 404 act as stoppers restricting the falling-down of the rod 4 from the main body case 10.

As illustrated in FIG. 12E, the engaging portions 332, 332 are provided on an outer periphery of the second restriction portion 33 in the restriction wall 330-side to protrude to a radial outside.

As illustrated in FIGS. 13A, 13B, the engaging portions 332, 332 are disposed in a positional relation to be symmetric across the diameter line C1. The engaging portions 332, 332 are positioned on the same diameter line C2, and are disposed in the circumferential direction around the axis line X at intervals of 180 degrees.

As illustrated in FIG. 12E, an outer diameter D2 of an area, in which the engaging portions 332, 332 are disposed, of the second restriction portion 33 is larger than an outer diameter D1 of an area, in which the engaging portions 332, 332 are not disposed, of the second restriction portion 33.

As illustrated in FIGS. 13A, 13B, the outer diameter D2 of the engaging portions 332, 332 is set to a diameter extending to an outer periphery of the arc-shaped groove 320a in the first restriction portion 32-side as described before as viewed in the axis line X direction.

In the switch device 1, the engaging portions 332, 332 of the first restriction portion 32 are locked in a peripheral edge of the attachment hole 111 of the bracket 110 to grip the bracket 110 between the engaging portions 332, 332 and the first restriction portion 32 (refer to FIG. 2B).

Hereinafter, an explanation will be made of the assembly of the switch device 1 to the bracket 110.

As illustrated in FIG. 2A, the bracket 110 is provided with the attachment hole 111 having an inner diameter aligning to an outer diameter of the second restriction portion 33 in the main body case 10, and recessed grooves 112, 112 through which the engaging portions 332, 332 can pass.

Firstly, in the switch device 1, the positional relation between the rod 4 and the main body case 10 is made such that the engaging projection 53 of the lock holder 5 is hidden in the backside of the engaging portions 332, 332 as viewed in the axis line X direction (refer to FIGS. 2B, 2C).

In this state, the second restriction portion 33 in the switch device 1 is inserted in the attachment hole 111 of the bracket 110 to position the first restriction portion 32 to one side of the bracket 110 in the thickness direction and position the engaging portions 332, 332 to the other side of the bracket 110 in the thickness direction.

In this state, an abutting member of the rod 4 is caused to abut on the bracket 101 of the brake pedal 100 (refer to FIG. 1B) to insert the rod 4 into the main body case 10 by an urging force acting from the brake pedal 100-side.

Then, the rod 4 is pushed into the main body case 10 from a reference position (refer to FIG. 15A) where the engaging rib 404 abuts on the restriction wall 330 of the second restriction portion 33 in the main body case 10.

As described before, in a state where the engaging rib 404 of the rod 4 is positioned in the restriction groove 333 of the second restriction portion 33, the relative rotation around the axis line X between the rod 4 and the main body case 10 is restricted (refer to FIG. 13E).

Therefore, as illustrated in FIGS. 15A, 15B, while the rod 4 is pushed into the main body case 10 by a predetermined length Lx and the engaging rib 404 reaches the outside of the restriction groove 333, the state where the relative rotation around the axis line X between the rod 4 and the main body case 10 is restricted continues. Thereby the rod 4 can be prevented from being positioned in an erroneous position in the axis line direction until the rod 4 is pushed into the main body case 10 by the predetermined length Lx.

As illustrated in FIG. 15B, when the rod 4 is inserted in the main body case 10 until the engaging rib 404 reaches the outside of the restriction groove 333, the relative rotation around the axis line X between the rod 4 and the main body case 10 is allowed.

In this state, for completing the assembly of the switch device 1 to the bracket 110, the main body case 10 is rotated around the axis line X.

Then, the main body case 10 rotates around the axis line X (the counterclockwise direction CCW in the figure) from the state in FIG. 14A to make the end portion 323b in the guide groove 323-side come in contact with the locking claw 521 in the circumferential direction around the axis line X (refer to FIG. 14B).

As described before, since the locking claw 521 is flexibly displaceable to the axis line X side (the inner diameter side), the locking claw 521 is pushed by the inclined surface of the end portion 323b to be displaced to the inner diameter side, whereby the rotation of the main body case 10 around the axis line X continues (refer to FIG. 14B).

When the locking claw 521 runs over the end portion 323b, the locking claw 521 is engaged to the positioning groove 322 neighbored to the guide groove 323 to restrict the relative rotation between the main body case 10, and the rod 4 and the lock holder 5 (refer to FIG. 14C).

In the process where the main body case 10 rotates from the state in FIG. 14A to the state in FIG. 14C, the engaging portions 332, 332 in the main body case 10-side are displaced from the position of hiding the engaging projection 53 of the lock holder 5, and finally, reach a position where the engaging portions 332 and the engaging projections 53 are alternately disposed at intervals of 90 degrees around the axis line X (refer to FIG. 14D through FIG. 14E to FIG. 14F, and FIGS. 2D, 2E).

As illustrated in FIGS. 2D, 2E, the engaging portions 332, 332 in the main body case 10-side are located in the angle position out of the recessed groove 112 of the bracket 110, and the engaging portions 332, 332 of the second restriction portion 33 are locked in a peripheral edge of the attachment hole 111 of the bracket 110. In this state, the bracket 110 is gripped between the engaging portions 332, 332 and the first restriction portion 32 (refer to FIG. 2E) to complete the attachment of the switch device 1 to the bracket 110.

On this occasion, the movable board 6 in the rotating main body case 10 rotates together with the main body case 10 (refer to FIG. 9B).

Thereby the engaging portions 64, 64 in the movable board 6-side rotating together with the main body case 10 are engaged to the engaging portions 403, 403 of the rod 4 to connect the rod 4 and the movable board 6.

In this way, in the switch device 1, the rotation of the main body case 10 for attaching the switch device 1 to the bracket 110 is restricted until the rod 4 is pushed into the main body case 10 by the predetermined length Lx. Thereby the rod 4 can be prevented from being positioned in the erroneous position in the axis line direction until the rod 4 is pushed into the main body case 10 by the predetermined length Lx.

Thereby the rod 4 and the movable board 6 can be connected after the rod 4 is certainly inserted in the main body case 10 by the predetermined amount Lx. The rod is movable together with the movable board in the axis line direction in a state where the rod is correctly positioned in the axis line direction.

The switch device 1 according to the present embodiment has the following configuration.

(1) The switch device 1 comprises:

the rod 4 moving forward/backward in the axis line direction in association with the operation of the brake pedal 100;

the main body case 10 in which one end 40a-side of the rod 4 in the longitudinal direction is inserted and which supports the rod 4 to be movable in the axis line X direction;

the movable board 6 provided in the main body case 10 to be displaceable in the axis line X direction; and the connecting mechanism configured to connect the rod 4 and the movable board 6.

In the switch device 1, the movable board 6 is displaced in the axis line X direction by the forward/backward movement of the rod 4 in the axis line X direction to cause the movable contact point 7 provided in the movable board 6 to be in contact with or to be separate from the fixed contact point 8.

In the switch device 1, the lock holder 5 (the holder) is provided in the main body case to support the rod to be incapable of rotating relatively and to be movable in the axis line X direction.

The connecting mechanism includes:

the protruding portion 403 (the protruding portion) radially protruding from the outer periphery of the rod 4; and the engaging portion 64 (the wall portion) provided in the movable board 6 and surrounding the outer periphery of the rod 4 by an interval smaller than the protruding height of the engaging portion 403.

The connecting mechanism is configured such that, when the rod 4 and the main body case 10 is relatively rotated around the axis line X after pushing the rod 4 into the main body case 10 from the initial position by the predetermined length Lx, the screw groove 403a located on the outer periphery of the engaging portion 403 is meshed with the screw groove 64a located on the inner periphery of the engaging portion 64 to connect the rod 4 and the movable board 6.

In the main body case 10, the lock holder 5 rotates relative to the main body case 10 within the predetermined angle range from the reference position around the axis line X.

When the lock holder 5 is located in the reference position, the engaging portion 403 (the screw groove 403a) and the engaging portion 64 (the screw groove 64a) are located to be shifted in a phase in the circumferential direction around the axis line X.

When the lock holder 5 is located in the reference position, the engaging portion 403 and the engaging portion 64 are located to be shifted in a phase in the circumferential direction around the axis line X. In the process of pushing the rod 4 into the main body case 10 by the predetermined length by pushing the rod 4 into the main body case 10 from the initial position in this state, the interference between the engaging portion 403 and the engaging portion 64 can be suitably prevented.

Thereby the pushing of the rod 4 into the main body case 10 can be smoothly performed.

In addition, since no another component is present in the connection part between the rod 4 and the movable board 6, a reduction in manufacturing costs of the switch device 1 is made possible more than in a case of connecting the rod and the movable board using the another component therebetween.

The switch device 1 has the following configuration.

(2) The switch device 1 has the fixing mechanism configured to fix the positional relation between the main body case 10 and the lock holder 5 at the time of rotating the lock holder 5 from the reference position by the predetermined angle range around the axis line X.

Since the rod 4 is supported by the lock holder 5 to be incapable of rotating relative thereto, when a positional relation between the main body case 10 and the lock holder 5 is fixed, a positional relation between the rod 4 and the main body case 10 is also fixed.

Thereby after the engaging portion 403 (the screw groove 403a) in the rod 4-side is meshed with the engaging portion 64 (the screw groove 64a) in the movable board 6-side, the connection between the engaging portion 403 and the engaging portion 64 can be prevented from being released.

The switch device 1 has the following configuration.

(3) The fixing mechanism includes:

the engaging piece 52 which is cantilever-supported on the outer periphery of the lock holder 5 and a tip end side of which is flexibly displaceable radially, the tip end side being provided with the locking claw 521 (the engaging claw) on the outer periphery, and the engaging grooves (the positioning groove 322, the guide groove 323) which are provided on the peripheral wall portion 321, which surrounds the outer periphery of the lock holder 5, in the main body case 10 and to which the locking claw 521 is engaged.

The engaging groove includes:

the guide groove 323 (the first engaging groove) allowing the relative rotation around the axis line X between the main body case 10 and the lock holder 5, and the positioning groove 322 (the second engaging groove) blocking the relative rotation around the axis line X between the main body case 10 and the lock holder 5.

The guide groove 323 and the positioning groove 322 are neighbored to each other to be spaced in the circumferential direction around the axis line X.

With this configuration, when the main body case 10, and the rod 4 and the lock holder 5 are rotated relatively around the axis line X by the predetermined angle, the engaging piece 52 causing the locking claw 521 to be engaged to the guide groove 323 is flexibly displaced to the inner diameter side, and the locking claw 521 runs over the area between the guide groove 323 and the positioning groove 322 to be engaged to the positioning groove 322.

Thereby the positional relation between the main body case 10, and the rod 4 and the lock holder 5 is fixed.

The switch device 1 has the following configuration.

(4) The switch device 1 has the rotation restriction mechanism configured to restrict the relative rotation around the axis line X between the rod 4 and the main body case 10 until the rod 4 is pushed into the main body case 10 by the predetermined length Lx from the initial position.

With this configuration, it can be prevented that the relative rotation around the axis line X between the rod 4 and the main body case 10 is made to cause the locking claw 521 to be engaged to the positioning groove 322 until the rod 4 is pushed into the main body case 10 by the predetermined length Lx (refer to FIG. 15B) from the initial position (refer to FIG. 15A).

Thereby the rod 4 is pushed into the main body case 10 by the predetermined length Lx from the initial position and the restriction to the relative rotation between the rod 4 and the main body case 10 is released, and thereafter, the positional relation between the main body case 10, and the rod 4 and the lock holder 5 can be fixed.

The switch device 1 has the following configuration.

(5) The rotation restriction mechanism includes:

The engaging rib 404 (the rib) protruding to the radial outside from the outer periphery of the rod 4, and the restriction groove 333 (the key groove) which is provided in the main body case 10 and to which the engaging rib 404 is engaged.

The restriction groove 333 is formed by the predetermined length in the axis line X direction, and restricts the relative rotation between the rod 4 and the main body case 10 while the engaging rib 404 is positioned in the restriction groove 333.

With this configuration, the relative rotation between the rod 4 and the main body case 10 is restricted until the rod 4 is pushed into the main body case 10 by the predetermined length Lx from the initial position.

Thereby the position of the rod 4 is adjusted, and after that, the rod 4 and the main body case 10 are rotated relative to each other, making it possible to fix the switch device 1.

Second Embodiment

Figure 16:
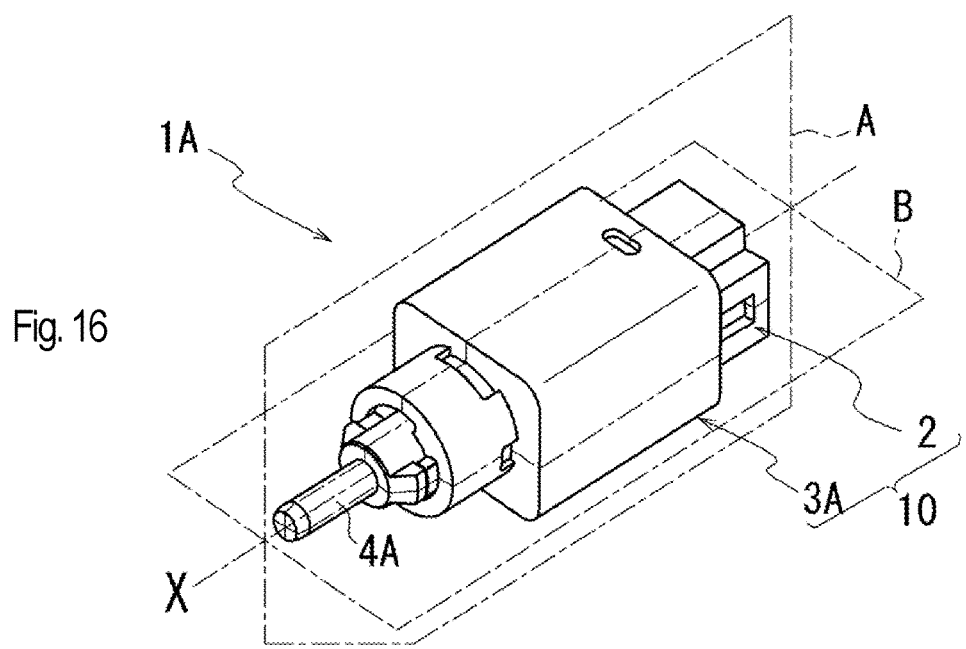
FIG. 16 is a perspective view illustrating a switch device according to a second embodiment of the present invention.

FIG. 16 is a perspective view illustrating a switch device 1A according to a second embodiment.

Figure 17A:
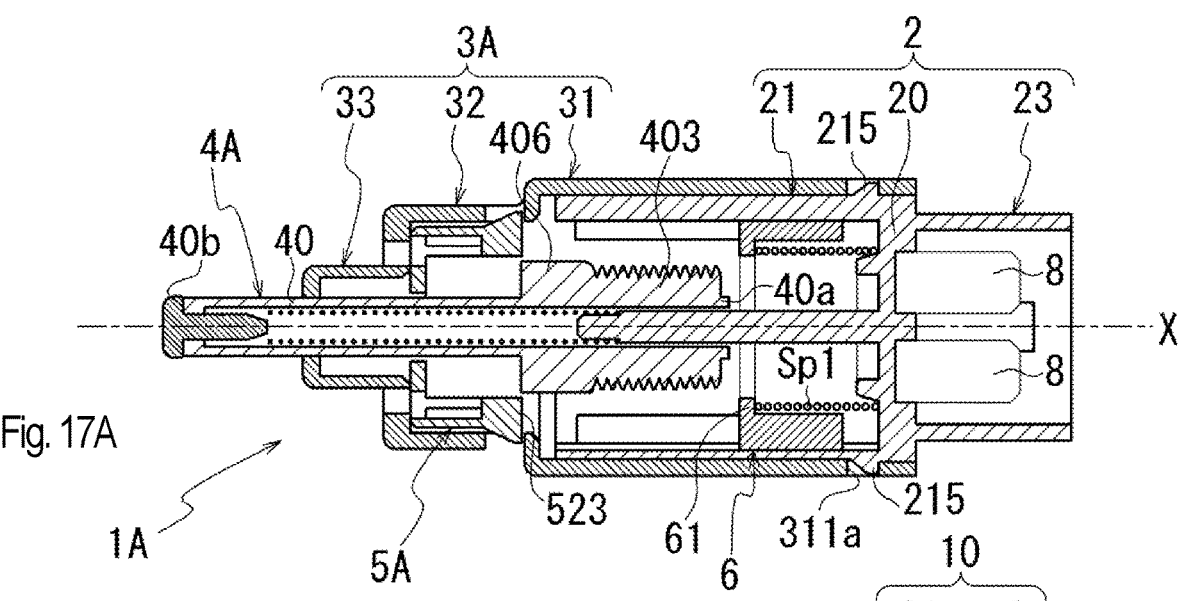
FIG. 17A and FIG. 17B are cross sections illustrating the switch device.
Figure 17B:
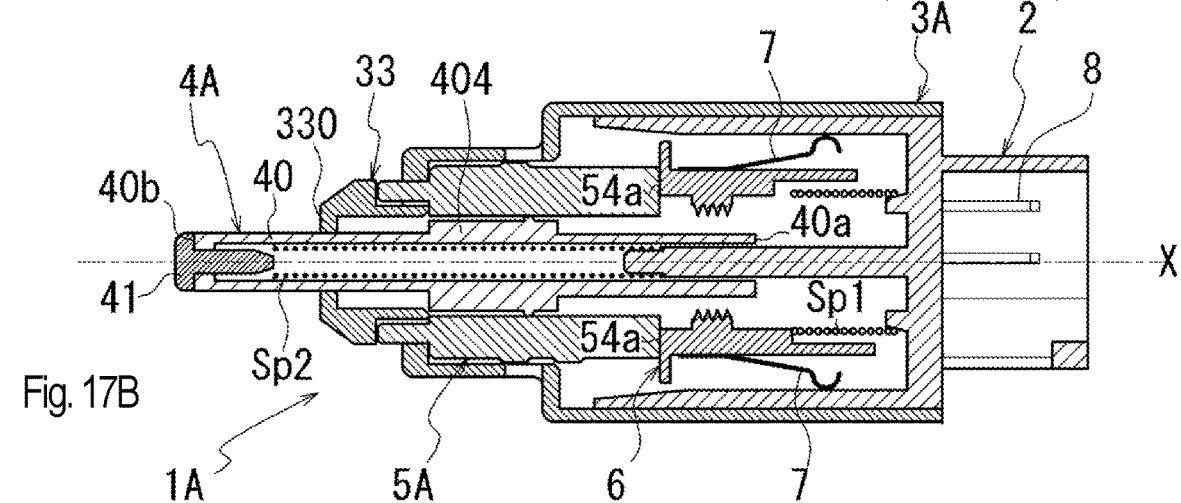

FIGS. 17A, 17B are cross sections illustrating the switch device 1A. FIG. 17A is a cross section by cutting the switch device 1A on plane A in FIG. 16. FIG. 17B is a cross section by cutting the switch device 1A on plane B in FIG. 16.

Figure 18:
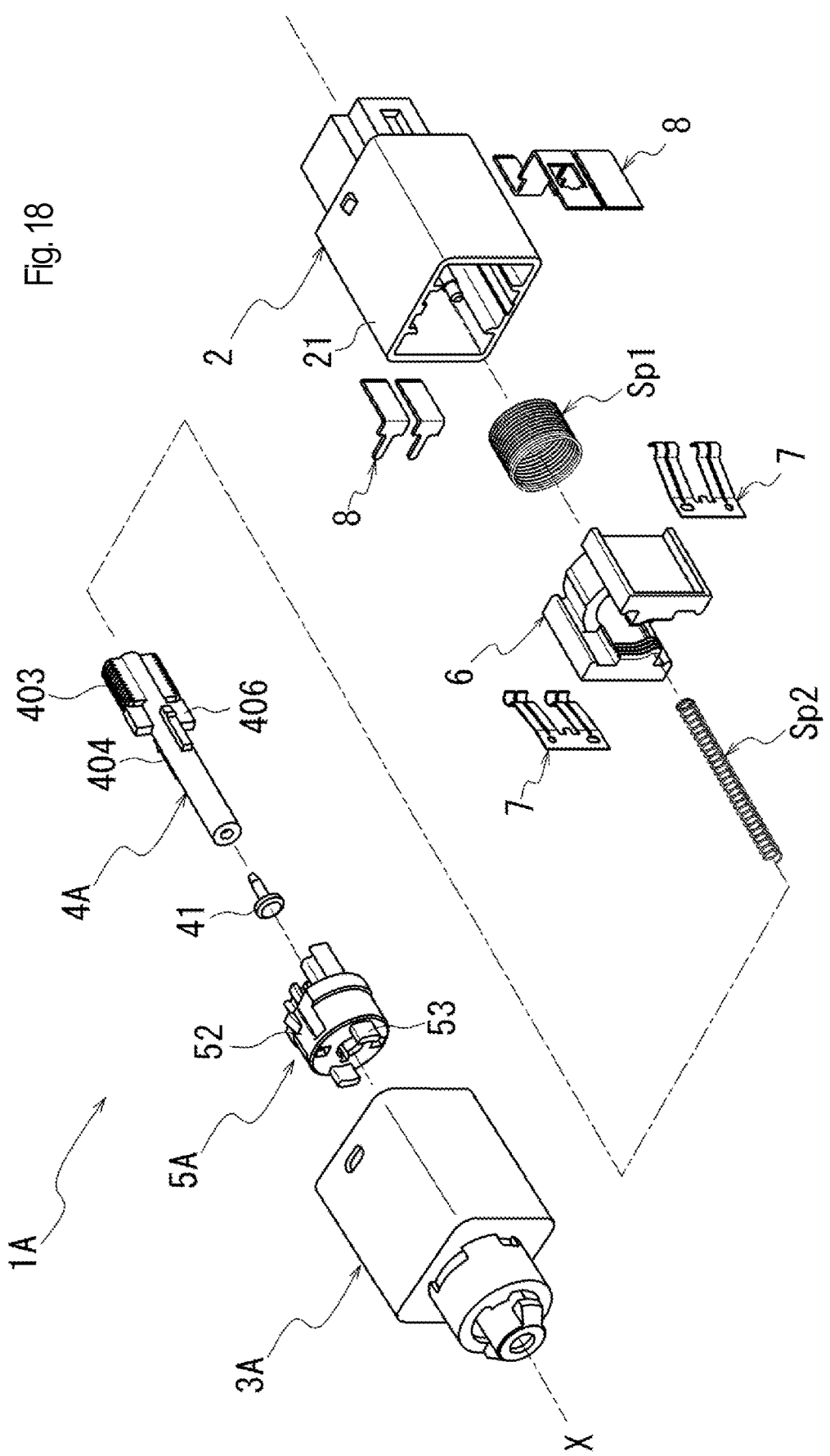
FIG. 18 is an exploded perspective view illustrating the switch device.

FIG. 18 is an exploded perspective view illustrating the switch device 1A.

The switch device 1A differs in a shape of each of a cover 3A, a rod 4A, and a lock holder 5A from the switch device 1 as described before.

[Rod 4A]

FIG. 19A to FIG. 19D are drawings explaining the rod 4A.

FIG. 19A is a perspective view illustrating the rod 4A, FIG. 19B is a side view illustrating the rod 4A, FIG. 19C is a cross section taken along line A-A in FIG. 19B, and FIG. 19D is a cross section taken along line B-B in FIG. 19B.

The rod 4A differs in a point where a displacement restriction rib 406 is provided between the engaging portion 403 and the engaging rib 404 from the rod 4.

The cylindrical base portion 40 of the rod 4A is provided with the engaging portions 403 (refer to FIG. 17A), the engaging ribs 404 (refer to FIG. 17B) and the engaging ribs 406 (refer to FIG. 17A) on an outer periphery in the area, which is positioned inside of the main body case 10, of the base portion 40.

As illustrated in FIG. 19B, in the base portion 40 the engaging portion 403 is disposed from the one end portion 40a of the base portion 40 to a position away to the other end portion 40b-side (the left side in FIG. 19B). The engaging portion 403 extends to the end portion 40b-side along the center axis (the axis line X) of the base portion 40, and is formed in the center axis direction (the axis line X direction) of the base portion 40 to have a predetermined length L1A.

As illustrated in FIG. 19C, the engaging portion 403 protrudes toward the radial outside of the axis line X from the outer periphery of the base portion 40 in a cross-sectional view perpendicular to the center axis (the axis line X) of the base portion 40.

The engaging portion 403 comprises two engaging portions which are disposed in the circumferential direction around the axis line X at intervals of 180 degrees, and the engaging portions 403, 403 are positioned on the diameter line C1 of the base portion 40.

An outer peripheral portion of the engaging portion 403 is formed in an arc shape in a cross-sectional view, and the plurality of screw grooves 403a are disposed on the outer peripheral portion of the engaging portion 403 by predetermined intervals in the axis line X direction.

In a cross-sectional view the engaging portion 403 includes the side surface 403b on one side and the side surface 403c on the other side across the diameter line C1 which are flat surfaces in parallel with each other. The side surfaces 403b, 403c are disposed in a positional relation of being symmetric across the diameter line C1.

As illustrated in FIG. 19B, in the rod 4A the engaging ribs 404, 404 are formed to have a predetermined length L2A in the axis line X direction of the base portion 40.

The displacement restriction rib 406 is formed between the engaging rib 404 and the engaging portion 403 to have a predetermined length L8 in the axis line X direction.

The displacement restriction rib 406 is disposed with a range of overlapping with the engaging portion 403 by a predetermined length ΔL' and with a range of overlapping with the engaging rib 404 by a predetermined length ΔL".

As illustrated in FIG. 19C, the displacement restriction ribs 406, 406 are disposed on the same diameter line C1 as the engaging portions 403, 403. An outer periphery 406a of the displacement restriction rib 406 is positioned slightly closer to the outside than an outer periphery of the engaging portion 403.

In a cross-sectional view, the engaging ribs 404 protrude toward the radial outside of the axis line X from the outer periphery of the base portion 40. The engaging rib 404 comprises two engaging ribs which are disposed in the circumferential direction around the axis line X at intervals of 180 degrees.

The engaging rib 404 is disposed to be shifted by a phase of 90 degrees in the circumferential direction around the axis line X to the engaging portion 403 and the displacement restriction rib 406.

As viewed in the axis line X direction, the engaging portion 403 and the displacement restriction rib 406, and the engaging rib 404 are alternately disposed at intervals of 90 degrees in the circumferential direction around the axis line X.

[Lock Holder 5A]

FIGS. 20A to 20D and FIGS. 21A, 21B are drawings explaining the lock holder 5A.

Figure 20A:
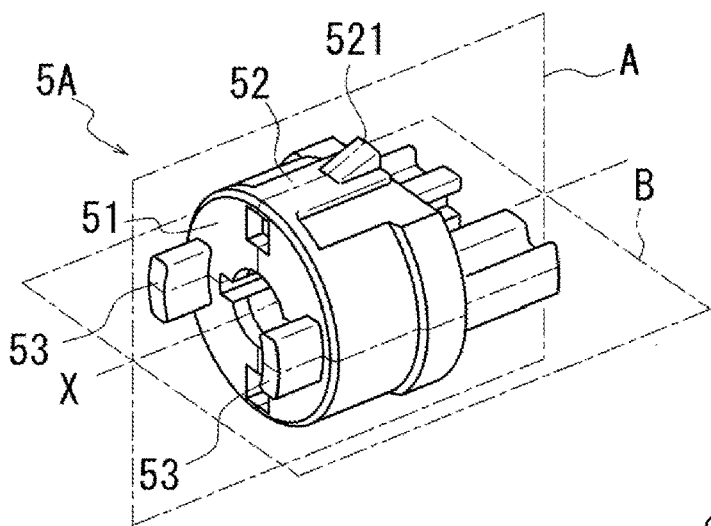
FIG. 20A to FIG. 20D are drawings explaining a lock holder.
Figure 20B:
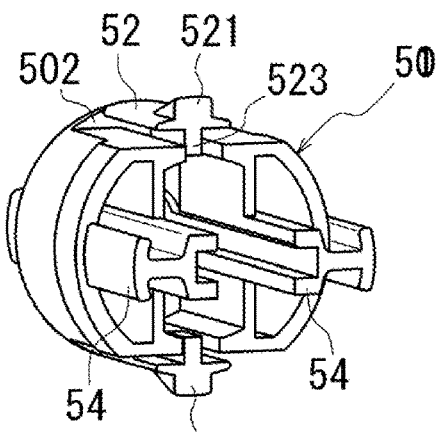
Figure 20C:
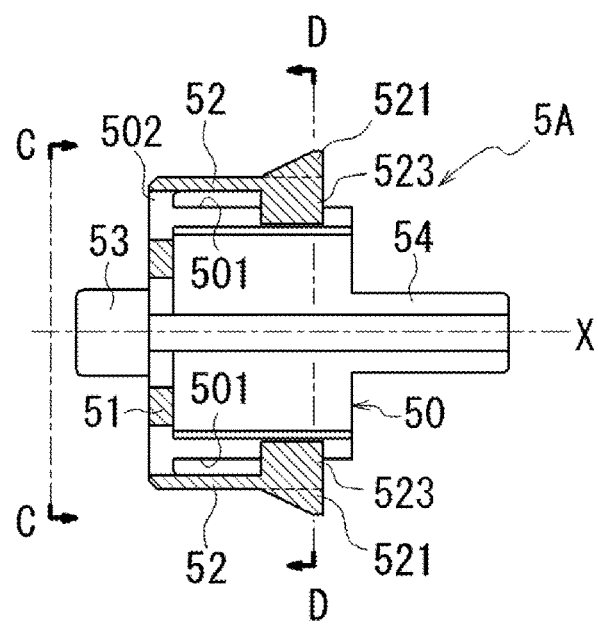
Figure 20D:
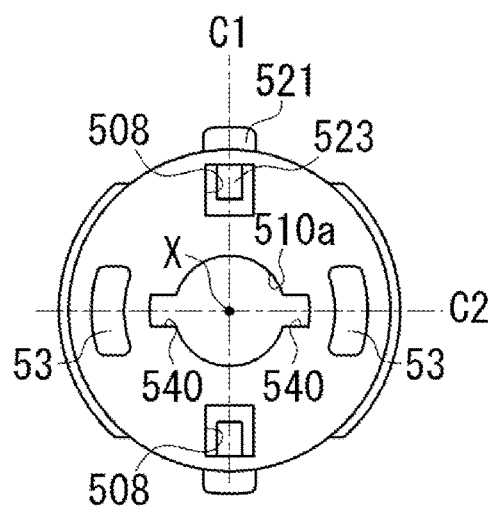
Figure 21A:
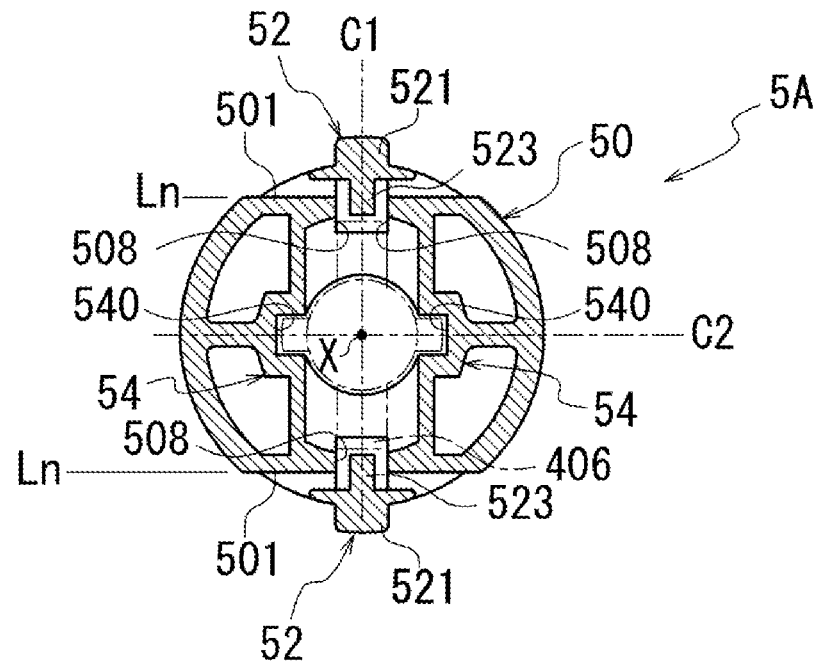
FIG. 21A and FIG. 21B are drawings explaining the lock holder.
Figure 21B:
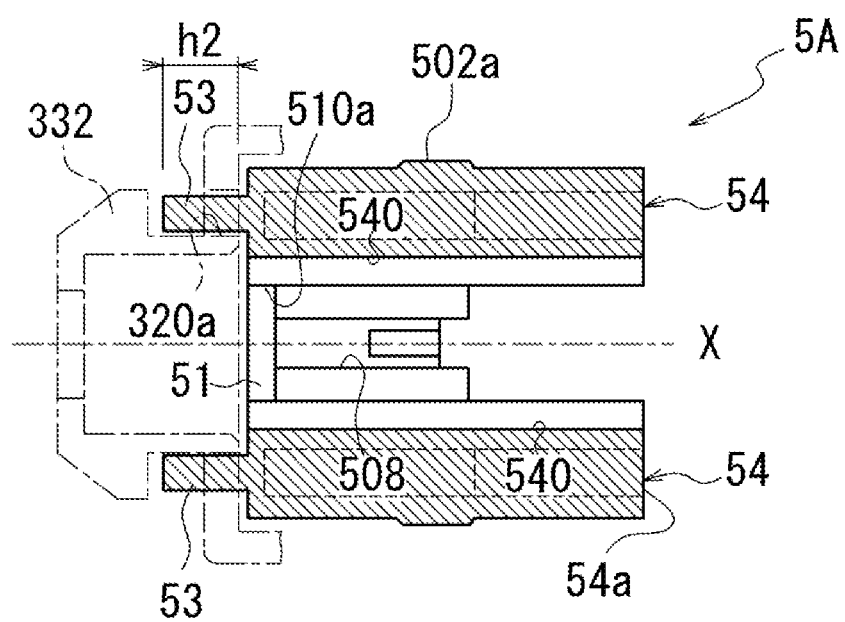

FIG. 20A and FIG. 20B are perspective views illustrating the lock holder 5A. FIG. 20C is a cross section illustrating the lock holder 5A by cutting the lock holder 5A on plane A in FIG. 20A. FIG. 20D is a drawing illustrating the lock holder 5A in a direction of arrows C-C in FIG. 20C. FIG. 21A is a cross section illustrating the lock holder 5A by cutting the lock holder 5A along line D-D in FIG. 20C. FIG. 21B is a cross section illustrating the lock holder 5A by cutting the lock holder 5A on plane B in FIG. 20A.

As illustrated in FIG. 20C, the lock holder 5A includes the cylindrical base portion 50, and the wall portion 51 closing one end of the base portion 50.

As viewed in the axis line X, the base portion 50 is provided with the width across flat portions 501, 501 in parallel with each other (refer to FIG. 21A).

The width across flat portions 501, 501 are flat surfaces by cutting and removing part of the base portion 50 in the outer peripheral side along the virtual lines Ln, Ln illustrated in FIG. 21A.

Herein, the virtual lines Ln, Ln are virtual lines positioned to be symmetric across the diameter line C2, which are perpendicular to the diameter line C1 and in parallel with each other.

The engaging pieces 52, 52 located in a direction along the axis line X are disposed outside of the width across flat portions 501, 501.

The width across flat portions 501, 501 are provided with notches 508, 508 on areas overlapping with the engaging pieces 52, 52 as viewed from the radial outside of the axis line X (refer to FIGS. 21A, 21B).

The notches 508, 508 are provided over an entire length of the base portion 50 in the axis line X direction (refer to FIG. 21B). The notches 508, 508 open also to the outer peripheral portion of the wall portion 51 as viewed in the axis line X direction (refer to FIG. 20D).

One ends of the engaging pieces 52, 52 in the wall portion 51-side are connected to areas (connecting portions 502) of the base portions 50, 50 in the outside over the width across flat portions 501, 501 in the axis line X direction.

The locking claws 521, 521 are disposed on the outer peripheries of the engaging pieces 52, 52 in the tip end sides. The locking claw 521 protrudes outward from the outer periphery of the engaging piece 52.

A tip end side of the engaging piece 52 in which the locking claw 521 is disposed is configured to be flexibly displaceable in the radial direction of the axis line X.

A projection 523 is provided on the inner periphery of the engaging piece 52 in the tip end side. The projection 523 protrudes in the axis line X direction (to the inner diameter side) from the inner periphery of the engaging piece 52, and is positioned within the notch 508 formed in the width across flat portion 501.

In the switch device 1A, the displacement restriction rib 406 in the rod 4A-side as mentioned before is positioned within the notch 508 in the width across flat portion 501.

Therefore the projection 523 of the engaging piece 52 in the lock holder 5A and the displacement restriction rib 406 are located to be close to each other in the radial direction of the axis line X (refer to FIG. 21A).

[Cover 3A]

FIGS. 22A to 22E to FIGS. 24A to 24F are drawings explaining the cover 3A.

FIGS. 22A, 22B are perspective views illustrating the cover 3A. FIG. 22C is a cross section by cutting the cover 3A on plane A in FIG. 22A. FIG. 22D is a cross section taken in a direction of arrows C-C in FIG. 22C. FIG. 22E is a cross section by cutting the cover 3A on plane B in FIG. 22A.

Figures 23A, 23B, 23E:
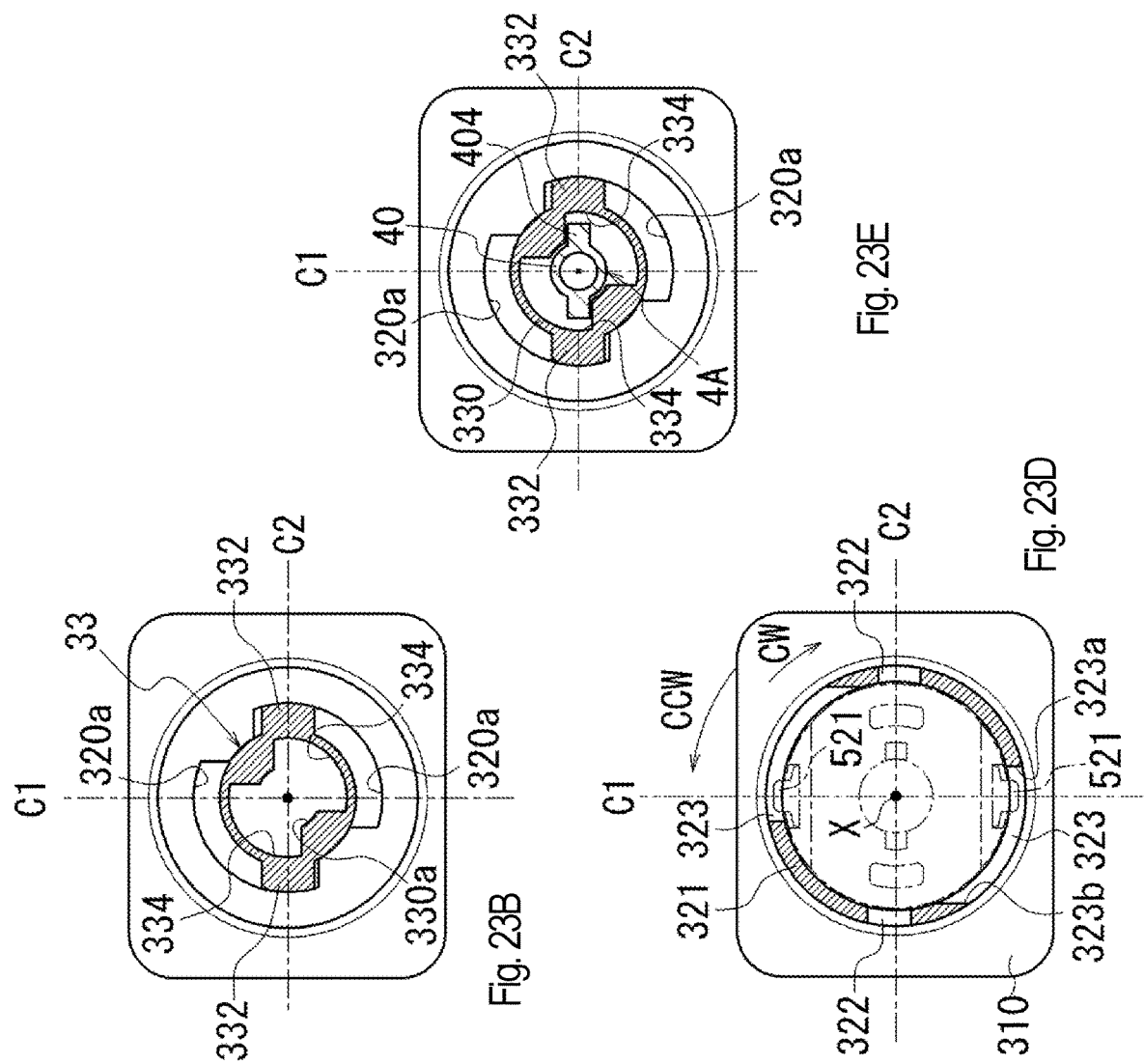
FIG. 23A to FIG. 23E are drawings explaining the cover.
Figure 23C:
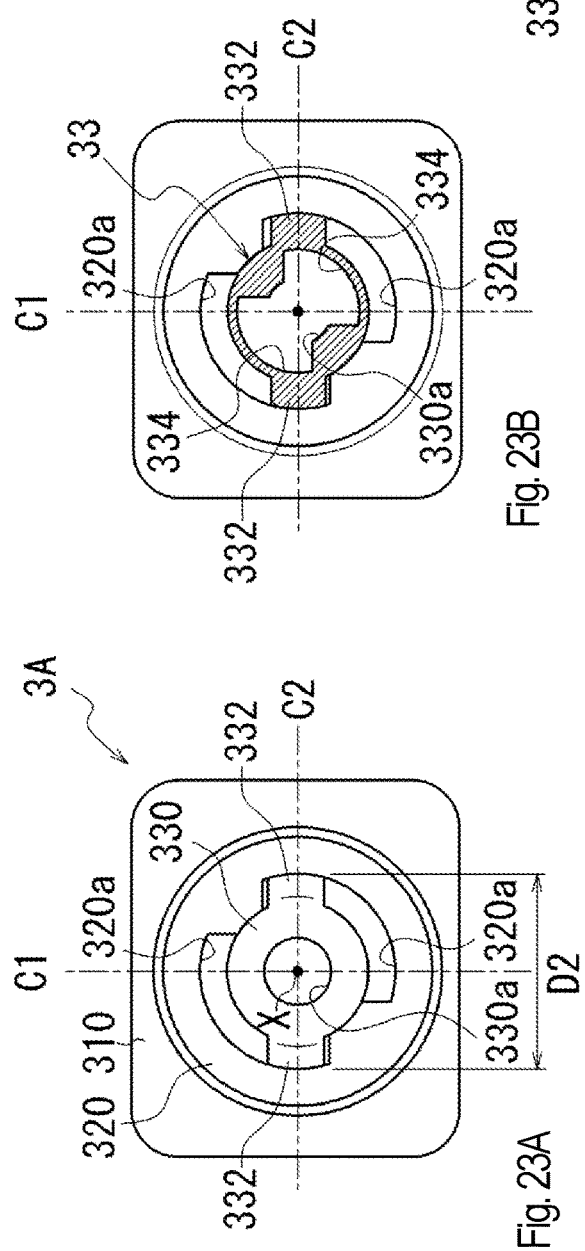
Figure 23D:
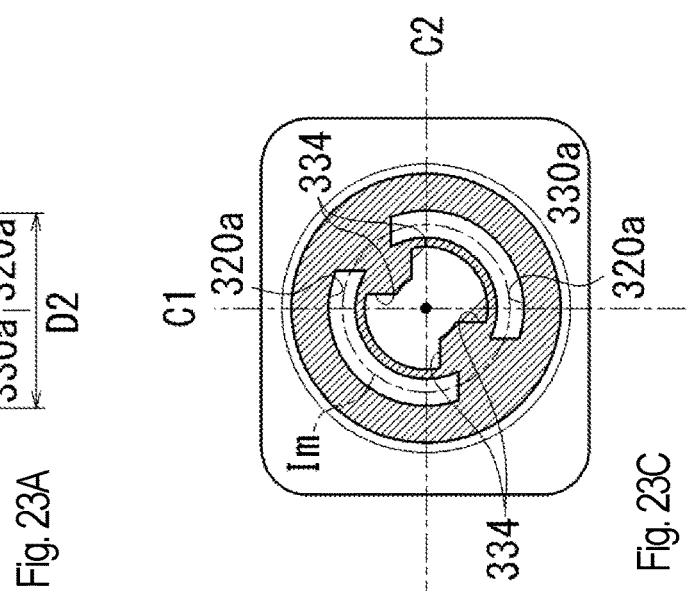

FIG. 23A is a drawing illustrating the cover 3A as viewed in a direction of arrows D-D in FIG. 22E. FIG. 23B is a cross section taken in a direction of arrows E-E in FIG. 22E. FIG. 23C is a cross section taken in a direction of arrows F-F in FIG. 22E. FIG. 23D is a cross section taken in a direction of arrows G-G in FIG. 22E. FIG. 23E is a cross section illustrating the rod 4A together with the cover 3A in FIG. 23B.

FIGS. 24A to 24F are drawings explaining rotation of the cover 3A (the main body case 10) in the process of attaching the switch device 1A to the bracket 110 (refer to FIGS. 2C, 2E).

In FIGS. 24A to 24F, the explanation is made of the displacement of the positions of the locking claws 521, 521 of the engaging pieces 52, 52 in the lock holder 5A-side and the displacement in the position of the engaging projection 53 in the lock holder 5A-side in the process where the cover 3A (the main body case 10) rotates.

As illustrated in FIG. 22A, the cover 3A includes the outer peripheral wall 31 inserted to surround the outer peripheral side of the annular wall portion 21 of the pole portion 2, the first restriction portion 32 restricting the rotational range of the lock holder 5A in the cover 3A, and the second restriction portion 33 restricting the relative rotation between the rod 4A and the cover 3A within the predetermined angle range until the rod 4A reaches the position of being engageable to the movable board 6.

The cover 3A differs in the arrangement of a groove (a restriction groove 334) in the second restriction portion 33 from the restriction groove 333 of the aforementioned cover 3.

As illustrated in FIG. 23B, the through hole 330a of the rod 4A is provided in the central part of the second restriction portion 33. A pair of the restriction grooves 334, 334 open to the through hole 330a in the radial direction of the axis line X.

As viewed in the axis line X direction, the restriction grooves 334, 334 are provided in a range bridging over the diameter line C1 and the diameter line C2 along the outer periphery of the through hole 330a, and are formed in a substantially fan shape as viewed in the axis line X.

As illustrated in FIG. 23E, engaging ribs 404, 404 of the rod 4A are inserted in the restriction grooves 334, 334. The rotation of the rod 4A around the axis line X is allowed in the restriction grooves 334, 334. The rod 4A and the cover 3A are rotatable relative to each other around the axis line X in a range of the fan-shaped restriction grooves 334, 334.

The arc-shaped grooves 320a (refer to FIG. 23A), the positioning groove 322 and the guide groove 323 (refer to FIG. 23D) provided in the peripheral wall portion 321 of the first restriction portion 32 in the cover 3A have the same configuration as those of the cover 3. Therefore the explanation is herein omitted.

FIG. 23D and FIG. 24A show the positional relation between the locking claw 521 of the lock holder 5A and the guide groove 323 in a state prior to attaching the switch device 1A to the bracket 110 in the vehicle side (refer to FIGS. 2C, 2D).

As illustrated in FIG. 24A, the rotation of the rod 4A and the lock holder 5A is restricted and the main body case 10 is rotated around the axis line X (in the counterclockwise direction CCW in the figure) from a state in FIG. 24A at the time of attaching the switch device 1A to the bracket 110.

Then, the end portion 323b in the guide groove 323-side comes in contact with the locking claw 521 in the circumferential direction around the axis line X. As described before, since the locking claw 521 is flexibly displaceable to the axis line X side (the inner diameter side), when the locking claw 521 is pushed out by the inclined surface of the end portion 323b to be displaced to the inner diameter side, the rotation of the main body case 10 around the axis line X continues (refer to FIG. 24B).

When the locking claw 521 runs over the end portion 323b, the locking claw 521 is engaged to the positioning groove 322 neighbored to the guide groove 323 to restrict the relative rotation between the main body case 10, and the rod 4A and the lock holder 5A.

Herein, the attachment of the switch device 1A to the bracket 110 (refer to FIG. 1B) in the vehicle side will be performed according to the following procedure.

(a) In a state where the rod 4A is pushed to abut on the bracket 110 in the brake pedal 100-side, the rod 4A is inserted in the main body case 10 by the predetermined length Lx.

(b) The rod 4A and the movable board 6 are connected by rotating the main body case 10 around the axis line X to relatively rotate the rod 4A and the lock holder 5A around the axis line X. Thereby the rod 4A is made movable in the axis line direction together with the movable board in a state of being correctly positioned in the axis line direction.

In a state before inserting the rod 4A into the main body case 10, the engaging ribs 404, 404 of the rod 4A are inserted in the fan-shaped restriction grooves 334, 334 (refer to FIG. 23E) in the second restriction portion 33 of the cover 3A.

As described before, the rotation of the rod 4A around the axis line X is allowed in the restriction grooves 334, 334, and the rod 4A and the cover 3A are rotatable relative to each other around the axis line X within a range of the fan-shaped restriction grooves 334, 334.

Figure 25A:
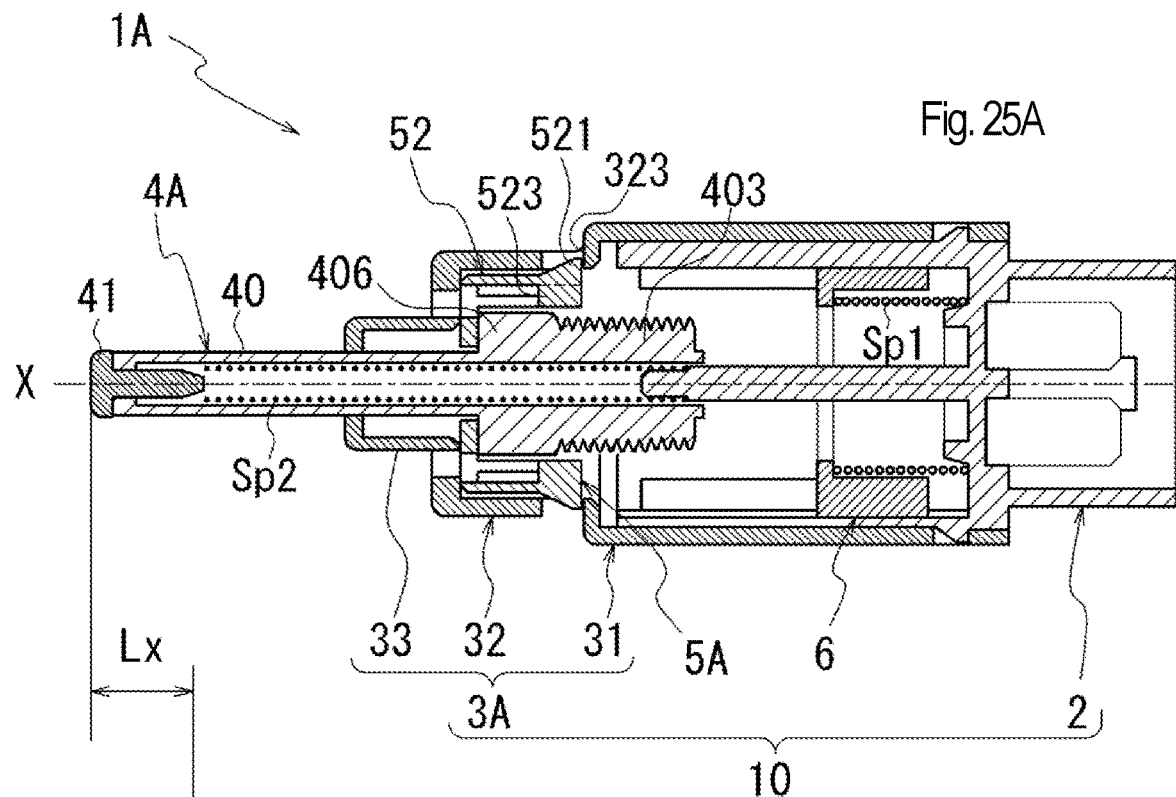
FIG. 25A and FIG. 25B are drawings explaining movement of the rod and rotation restriction of the rod at the time of attaching the switch device to a bracket.

Herein, in a state in FIG. 25A, the displacement restriction rib 406 of the rod 4A is positioned in an inner diameter side of the engaging piece 52 (the projection 523) of the lock holder 5A, and the displacement restriction rib 406 restricts the displacement to the inner diameter side of the engaging piece 52 of the lock holder 5A (refer to FIG. 25A).

Therefore, in the process of inserting the rod 4A in the main body case 10, even when the main body case 10, and the rod 4A and the lock holder 5A rotate relatively around the axis line X, the displacement restriction rib 406 blocks the movement to the inner diameter side of the locking claw 521 of the engaging piece 52 (refer to FIG. 24B).

Figure 25B:
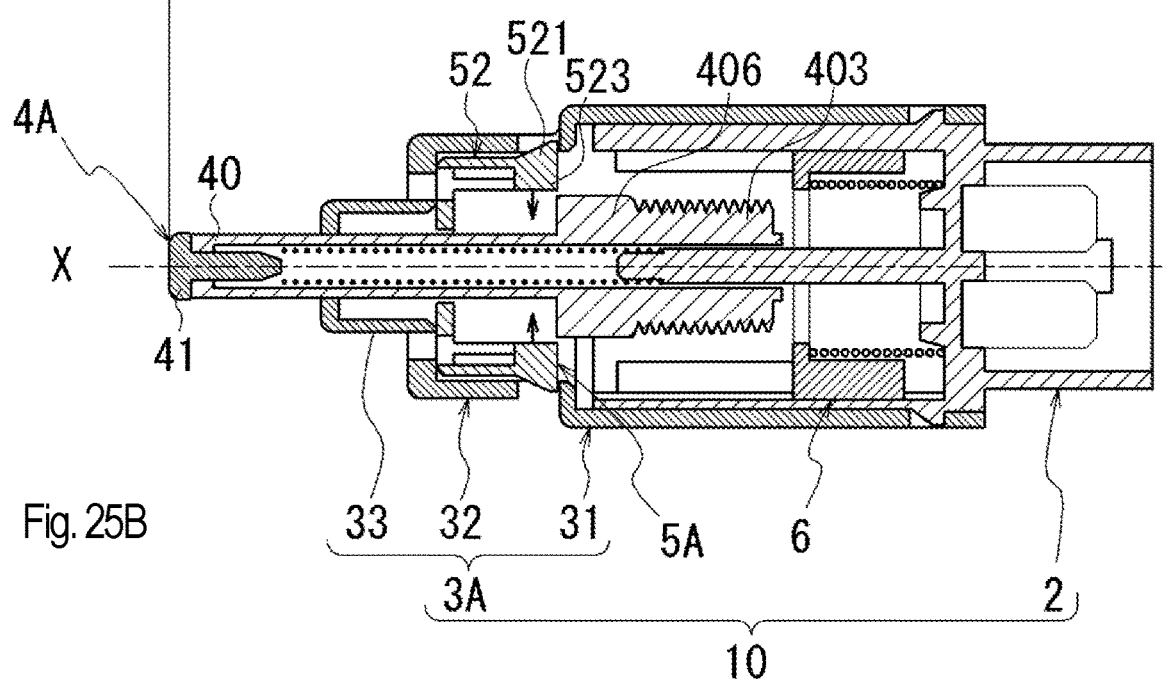

Thereby, the locking claw 521 of the engaging piece 52 cannot be engaged to the positioning groove 322 neighbored to the guide groove 323 in the process of inserting the rod 4A from an initial position illustrated in FIG. 25A to a predetermined position illustrated in FIG. 25B.

Accordingly, in the middle of attaching the switch device 1A to the bracket 110, the main body case 10, and the rod 4A and the lock holder 5A do not reach a position where the locking claw 521 of the engaging piece 52 is engaged to the positioning groove 322 to restrict the relative rotation.

When the relative rotation between the main body case 10, and the rod 4A and the lock holder 5A is restricted before the rod 4A is inserted in the main body case 10 by the predetermined length Lx, the rod 4A cannot be connected to the movable board 6 in an appropriate position. As a result, the attachment of the switch device 1A to the bracket 110 cannot be made, but such an event does not occur.

When the rod 4A is inserted in the main body case 10 by the predetermined length Lx to reach the predetermined position illustrated in FIG. 25B, the displacement restriction rib 406 of the rod 4A is located in a position out of a position right under the locking claw 521 of the engaging piece 52.

In this state, since the displacement of the locking claw 521 to the axis line X (the inner diameter side) is allowed, the relative rotation of the main body case 10, and the rod 4A and the lock holder 5A is not restricted.

As a result, the locking claw 521 in the lock holder 5A-side can run over the end portion 323b to be engaged to the positioning groove 322 neighbored to the guide groove 323, whereby the switch device 1A and the bracket 110 are held in a positional relation illustrated in FIGS. 2D, 2E.

Thereby the attachment of the switch device 1A to the bracket 110 is completed.

The switch device 1A according to the second embodiment has the following configuration.

(6) The switch device 1A comprises:
the rod 4A moving forward/backward in the axis line direction in association with the operation of the brake pedal 100;
the main body case 10 in which the one end 40a-side of the rod 4A in the longitudinal direction is inserted and which supports the rod 4A to be movable in the axis line X direction;
the movable board 6 provided in the main body case 10 to be displaceable in the axis line X direction; and the connecting mechanism configured to connect the rod 4A and the movable board 6.

In the switch device 1A, the movable board 6 is displaced in the axis line X direction by the forward/backward movement of the rod 4A in the axis line X direction to cause the movable contact point 7 provided in the movable board 6 to be in contact with or to be separate from the fixed contact point 8.

In the switch device 1A, the lock holder 5A (the holder) is provided in the main body case 10 to support the rod 4A to be incapable of rotating relatively and to be movable in the axis line X direction.

The connecting mechanism includes:

the engaging portion 403 (the protruding portion) radially protruding from the outer periphery of the rod 4A; and the engaging portion 64 (the wall portion) provided in the movable board 6 and surrounding the outer periphery of the rod 4A by the interval smaller than the protruding height of the engaging portion 403.

The connecting mechanism is configured such that, when the rod 4A and the main body case 10 are relatively rotated around the axis line X after pushing the rod 4A into the main body case 10 from the initial position by the predetermined length Lx, the screw groove 403a located on the outer periphery of the engaging portion 403 is meshed with the screw groove 64a located on the inner periphery of the engaging portion 64 to connect the rod 4A and the movable board 6.

In the main body case 10, the lock holder 5A rotates relative to the main body case 10 within the predetermined angle range from the reference position around the axis line X.

When the lock holder 5A is located in the reference position, the engaging portion 403 (the screw groove 403a) and the engaging portion 64 (the screw groove 64a) are located to be shifted in a phase in the circumferential direction around the axis line X.

With this configuration, when the lock holder 5A is located in the reference position, the engaging portion 403 and the engaging portion 64 are located to be shifted in a phase in the circumferential direction around the axis line X. By pushing the rod 4A into the main body case 10 from the initial position in this state, the interference between the engaging portion 403 and the engaging portion 64 can be suitably prevented in the process of pushing the rod 4A into the main body case 10 by the predetermined length.

Thereby the pushing of the rod 4A into the main body case 10 can be smoothly performed.

In addition, since no another component is present in the connection part between the rod 4A and the movable board 6, a reduction in manufacturing costs of the switch device 1A is made possible more than in a case of connecting the rod and the movable board using the another component therebetween.

The switch device 1A has the following configuration.

(7) The switch device 1A has the fixing mechanism configured to fix the positional relation between the main body case 10 and the lock holder 5A at the time of rotating the lock holder 5A in the predetermined angle range from the reference position around the axis line X.

The fixing mechanism includes:

the engaging piece 52 which is cantilever-supported on the outer periphery of the lock holder 5A and the tip end side of which is flexibly displaceable radially, the tip end side being provided with the locking claw 521 on the outer periphery; and the engaging grooves (the positioning groove 322, the guide groove 323) which are provided on the peripheral wall portion 321 surrounding the outer periphery of the lock holder 5A in the main body case 10 and to which the locking claw 521 is engaged.

The engaging groove includes:

the guide groove 323 (the first engaging groove) allowing the relative rotation between the main body case 10 and the lock holder 5A around the axis line X; and the positioning groove 322 (the second engaging groove) blocking the relative rotation between the main body case 10 and the lock holder 5A around the axis line X.

The guide groove 323 and the positioning groove 322 are neighbored to each other to be spaced in the circumferential direction around the axis line X.

The rod 4A is provided with the displacement restriction rib 406 (the rib) blocking a flexible deformation of the engaging piece 52 to the inner diameter side until the rod 4A is pushed into the main body case 10 by the predetermined length Lx (refer to FIG. 25B) from the initial position (refer to FIG. 25A).

With this configuration, even when the main body case 10, and the rod 4A and the lock holder 5A are rotated relatively around the axis line X in the process of inserting the rod 4A into the main body case 10, the displacement restriction rib 406 blocks the movement to the inner diameter side of the locking claw 521 of the engaging piece 52 (refer to FIG. 24B).

Therefore, the locking claw 521 of the engaging piece 52 cannot be engaged to the positioning groove 322 neighbored to the guide groove 323 until the rod 4A is pushed into the main body case 10 by the predetermined length Lx in the process of inserting the rod 4A from the initial position illustrated in FIG. 25A to the predetermined position illustrated in FIG. 25B.

Accordingly, when the locking claw 521 of the engaging piece 52 is engaged to the positioning groove 322 in the middle of attaching the switch device 1A to the bracket 110, the relative rotation between the main body case 10, and the rod 4A and the lock holder 5A is restricted after that. Then, the rod 4A cannot be connected to the movable board 6 in the appropriate position. As a result, the attachment of the switch device 1A to the bracket 110 cannot be made, but such an event does not occur.

The switch device 1A has the following configuration.

(8) The engaging piece 52 is provided with the projection 523 (the projection piece) protruding to the inner diameter side, on the inner periphery in the position where the locking claw 521 is provided.

The displacement restriction rib 406 is provided in the inner diameter side of the projection 523.

With this configuration, the locking claw 521 of the engaging piece 52 can be suitably prevented from being engaged to the positioning groove 322 until the rod 4A is inserted in the main body case 10 by the predetermined length Lx.

The switch device 1A has the following configuration.

(9) The switch device 1A includes:

the engaging rib 404 (the rib) protruding to the radial outside from the outer periphery of the rod 4A; and the restriction groove 334 (the key groove) which is provided in the cover 3A of the main body case 10 and to which the engaging rib 404 is engaged.

As viewed in the axis line X direction the restriction groove 334 is formed in an angle range below an angle range of the guide groove 323 (the first engaging groove) around the axis line X.

The restriction groove 334 is formed in the axis line X direction by the predetermined length, and restricts the relative rotation between the lock holder 5A and the main body case 10 within the angle range of the guide groove 323 (the first engaging groove) while the engaging rib 404 is positioned in the restriction groove 334.

With this configuration, the locking claw 521 of the engaging piece 52 can be suitably prevented from being engaged to the positioning groove 322 until the rod 4A is inserted in the main body case 10 by the predetermined length Lx.

Third Embodiment

FIG. 26 is a perspective view illustrating a switch device 1B according to a third embodiment.

FIGS. 27A, 27B are cross sections illustrating the switch device 1B according to the third embodiment. FIG. 27A is a cross section by cutting the switch device 1B on plane A in FIG. 26. FIG. 27B is a cross section by cutting the switch device 1B on plane B in FIG. 26.

FIG. 28 is an exploded perspective view illustrating the switch device 1B according to the third embodiment.

The switch device 1B differs in a shape of each of a cover 3B, a rod 4B, and a lock holder 5B from the switch device 1 as described before.

[Rod 4B]

FIG. 29A to FIG. 29D are drawings explaining the rod 4B.

FIG. 29A is a perspective view illustrating the rod 4B, FIG. 29B is a side view illustrating the rod 4B, FIG. 29C is a cross section taken along line A-A in FIG. 29B, and FIG. 29D is a cross section taken along line B-B in FIG. 29B.

The rod 4B differs in a point where a cam attachment portion 407 is provided between the engaging portion 403 and the engaging rib 404 from the rod 4.

The cylindrical base portion 40 of the rod 4B is provided with the engaging portions 403 (refer to FIG. 27A), the engaging ribs 404 (refer to FIG. 27B) and the cam attachment portion 407 (refer to FIG. 27A) on the outer periphery in the area, which is positioned inside of the main body case 10, of the base portion 40.

As illustrated in FIG. 29B, in the base portion 40 the engaging portion 403 is disposed from the one end portion 40a of the base portion 40 to a position away to the end portion 40b-side (the left side in FIG. 29B). The engaging portion 403 extends to the end portion 40b-side along the center axis (the axis line X) of the base portion 40, and is formed in the center axis direction (the axis line X direction) of the base portion 40 to have a predetermined length L1B.

As illustrated in FIG. 29C, the engaging portion 403 protrudes toward the radial outside of the axis line X from the outer periphery of the base portion 40 in a cross-sectional view perpendicular to the center axis (the axis line X) of the base portion 40.

The engaging portion 403 comprises two engaging portions which are disposed in the circumferential direction around the axis line X at intervals of 180 degrees, and the engaging portions 403, 403 are positioned on the diameter line C1 of the base portion 40.

The outer peripheral portion of the engaging portion 403 is formed in an arc shape in a cross-sectional view, and the plurality of screw grooves 403a are disposed on the outer peripheral portion of the engaging portion 403 at predetermined intervals in the axis line X direction.

The cam attachment portion 407 is provided together with the engaging portion 403 on the end portion of the engaging portion 403 in the engaging rib 404-side (the left side in FIG. 29B).

The cam attachment portion 407 is a plate-shaped member formed to have a predetermined length L9 in the axis line X direction, and is provided with engaging recessed portions 407a in both the sides in the width direction.

The cam attachment portion 407 also comprises two cam attachment portions which are disposed in the circumferential direction around the axis line X at intervals of 180 degrees, and the cam attachment portions 407, 407 are positioned on the diameter line C1 of the base portion 40. Cams 45 to be described later are configured to be attached on the cam attachment portions 407, 407.

As illustrated in FIG. 29B, the engaging rib 404 in the rod 4B is formed to have a predetermined length L2B in the axis line X direction of the base portion 40.

The engaging rib 404 is disposed to be spaced from the cam attachment portion 407.

In a cross-sectional view, the engaging ribs 404 protrude toward the radial outside of the axis line X from the outer periphery of the base portion 40. The engaging rib 404 comprises two engaging ribs which are disposed in the circumferential direction around the axis line X at intervals of 180 degrees.

The engaging rib 404 is disposed to be shifted by a phase of 90 degrees in the circumferential direction around the axis line X to the engaging portion 403 and the cam attachment portion 407.

As viewed in the axis line X direction, the engaging portion 403 and the cam attachment portion 407, and the engaging rib 404 are alternately disposed at intervals of 90 degrees in the circumferential direction around the axis line X.

[Cam 45]

FIGS. 30A to 30D are drawings explaining the cam 45.

FIG. 30A is a front view illustrating the cam 45, FIG. 30B is a perspective view illustrating the cam 45, FIG. 30C is a side view illustrating the cam 45, and FIG. 30D is a bottom view illustrating the cam 45. In FIG. 30A, the cam attachment portion 407 in the rod 4B-side to which the cam 45 is attached is illustrated in a virtual line.

The cam 45 includes wall portions 452, 452 located in parallel with each other to be spaced in the width direction, a connection portion 451 connecting upper ends each other of the wall portions 452, 452, and an engaging portion 454 disposed on a surface of the connection portion 451 at the opposite side of the wall portions 452, 452.

The engaging portion 454 is disposed in the central part of the connection portion 451 in the width direction (the left/right direction in FIG. 30A), and protrudes to the opposite side to the wall portion 452.

As illustrated in FIG. 30C, the engaging portion 454 has an engaging projection 454a in a position closer to one side in the axis line X direction (the left-right direction in FIG. 30C) in a side surface view.

Inclined surfaces 454b, 454c are disposed on one side and on the other side of the engaging projection 454a in the axis line X direction to be inclined in a direction where a height of each of the inclined surfaces 454b, 454c from the connection portion 451 is lower as separate from the engaging projection 454a.

An end surface 454a1 of the engaging projection 454a in the inclined surface 454b-side is a flat surface perpendicular to the axis line X.

The wall portions 452, 452 are disposed in a positional relation of being symmetric across the axis line X, and semi-spherical projections 452a, 452a are provided on surfaces of the wall portions 452, 452 opposing to each other. The cam 45 causes the projections 452a, 452a to be engaged to the engaging recessed portions 407a, 407a (refer to FIG. 29B) of the cam attachment portion 407 in the cam 45-side to be attached to the rod 4B.

The cam 45 moves together with the rod 4B in the axis line X direction, and when a load in the axis line X direction acts on the cam 45, the cam 45 is attached to the cam attachment portion 407 in such a manner as to fall down from the cam attachment portion 407 of the rod 4B.

Guides 453, 453 are provided on end portions of the wall portions 452, 452 in the inclined surfaces 454c-side from the wall portions 452, 452.

As illustrated in FIG. 30D, the guides 453, 453 extend linearly in a direction separate from the wall portions 452, 452. The guides 453, 453 are disposed in parallel with each other across the axis line X, and at an interval W2 to be capable of therein inserting the cam attachment portion 407 in a direction perpendicular to the axis line X.

[Lock Holder 5B]

FIGS. 31A to 31D and FIGS. 32A, 32B are drawings explaining the lock holder 5B.

Figure 32A:
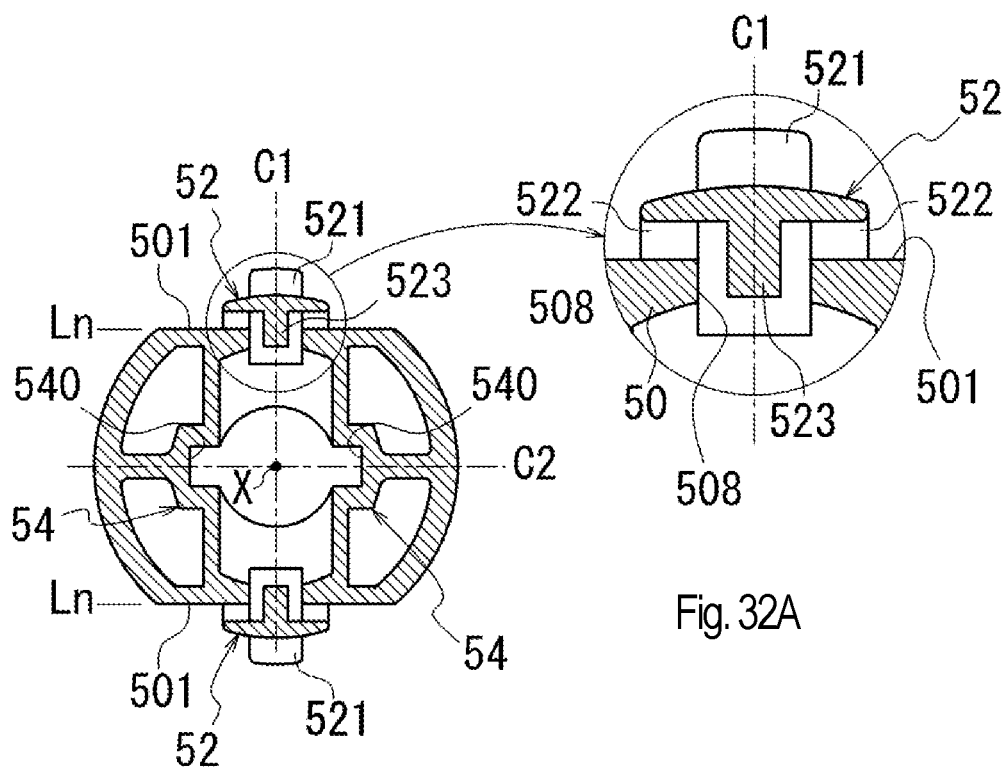
FIG. 32A and FIG. 32B are drawings explaining the lock holder.
Figure 32B:
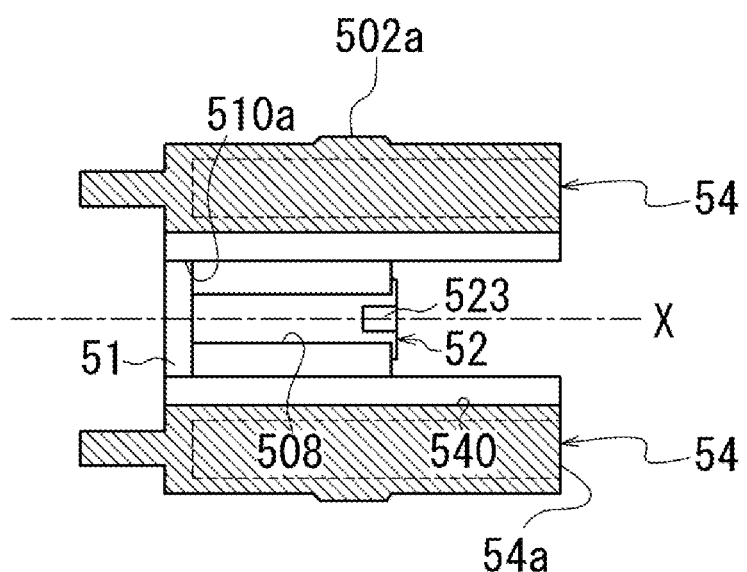

FIG. 31A and FIG. 31B are perspective views illustrating the lock holder 5B. FIG. 31C is a cross section illustrating the lock holder 5B by cutting the lock holder 5B on plane A in FIG. 31A. FIG. 31D is a drawing illustrating the lock holder 5B in a direction of arrows C-C in FIG. 31C. FIG. 32A is a cross section illustrating the lock holder 5B by cutting the lock holder 5B along line D-D in FIG. 31C. FIG. 32B is a cross section illustrating the lock holder 5B by cutting the lock holder 5B on plane B in FIG. 31A.

As illustrated in FIG. 31C, the lock holder 5B includes the cylindrical base portion 50, and the wall portion 51 closing one end of the base portion 50.

As viewed in the axis line X, the base portion 50 is provided with the width across flat portions 501, 501 in parallel with each other (refer to FIG. 32A).

The width across flat portions 501, 501 are flat surfaces by cutting and removing part of the base portion 50 in the outer peripheral side along the virtual lines Ln, Ln illustrated in FIG. 32A.

Herein, the virtual lines Ln, Ln are virtual lines positioned to be symmetric across the diameter line C2, which are perpendicular to the diameter line C1 and in parallel with each other.

The engaging pieces 52, 52 located in a direction along the axis line X are disposed outside of the width across flat portions 501, 501.

The width across flat portions 501, 501 are provided with the notches 508, 508 on areas overlapping with the engaging pieces 52, 52 as viewed from the radial outside of the axis line X (refer to FIG. 31C).

The notches 508, 508 are provided over an entire length of the base portion 50 in the axis line X direction (refer to FIG. 31C). The notches 508, 508 open also to the outer peripheral portion of the wall portion 51 as viewed in the axis line X direction (refer to FIG. 31D).

Midway positions of the engaging pieces 52, 52 in the longitudinal direction are supported through support portions 522, 522 by the width across flat portions 501, 501.

The locking claws 521, 521 are disposed on the outer peripheries of the engaging pieces 52, 52 in the one end sides (in the wall portion 51-side). The locking claw 521 protrudes outward from the outer periphery of the engaging piece 52.

A tip end side of the engaging piece 52 in which the locking claw 521 is disposed is configured to be flexibly displaceable in the radial direction of the axis line X.

The projection 523 is provided on the inner periphery of the engaging piece 52 in the other end side. The projection 523 protrudes in the axis line X direction from the inner periphery of the engaging piece 52, and is positioned within the notch 508 formed in the width across flat portion 501.

In the switch device 1B, the engaging projection 454a of the cam 45 as mentioned before is positioned within the notch 508 in the width across flat portions 501.

Therefore the projection 523 of the engaging piece 52 in the lock holder 5B and the engaging projection 454a of the cam 45 are engaged to each other in the axis line X (refer to FIG. 31C).

[Cover 3B]

FIGS. 33A to 33D to FIGS. 35A and 35B are drawings explaining the cover 3B.

FIGS. 33A, 33B are perspective views illustrating the cover 3B. FIG. 33C is a cross section by cutting the cover 3B on plane A in FIG. 33A. FIG. 33D is a cross section taken in a direction of arrows C-C in FIG. 33C.

Figure 34A:
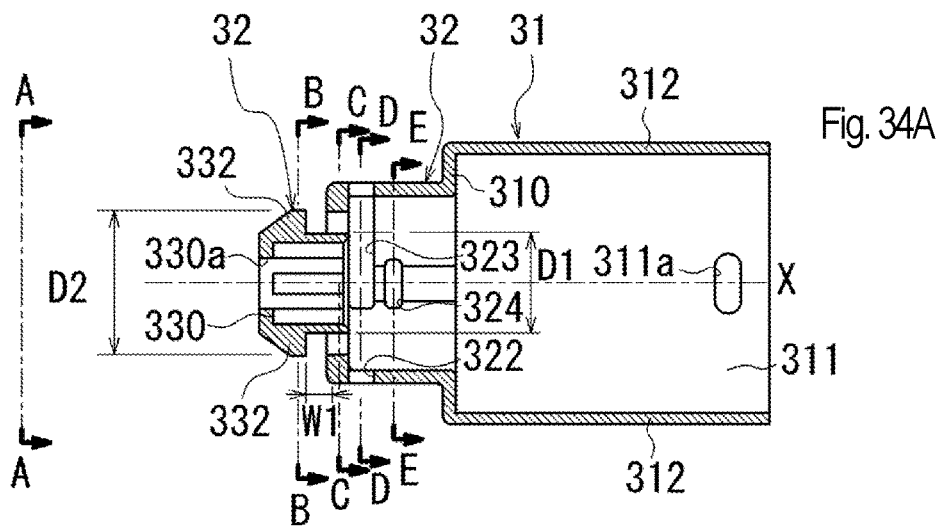
FIG. 34A to FIG. 34E are drawings explaining the cover.
Figure 34B:
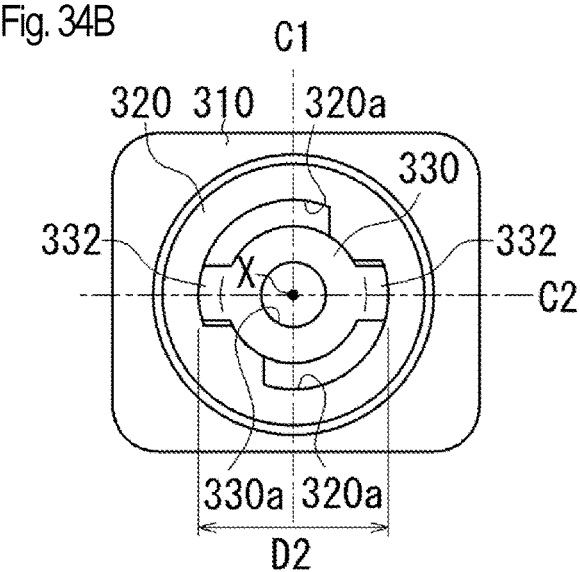
Figure 34C:
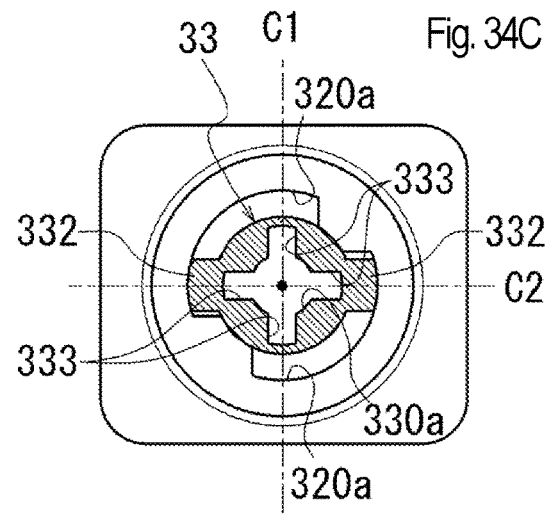
Figure 34D:
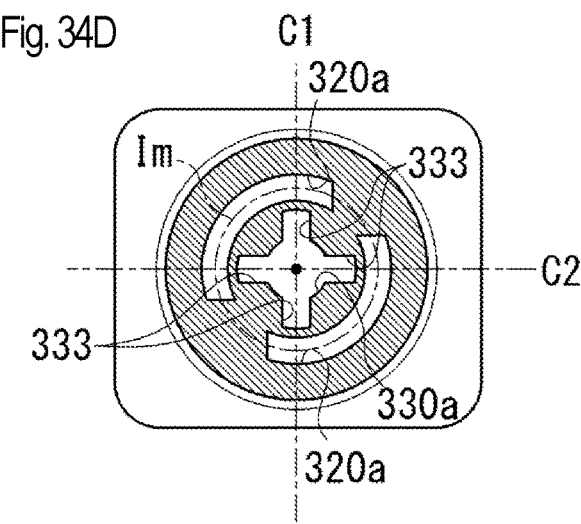
Figure 34E:
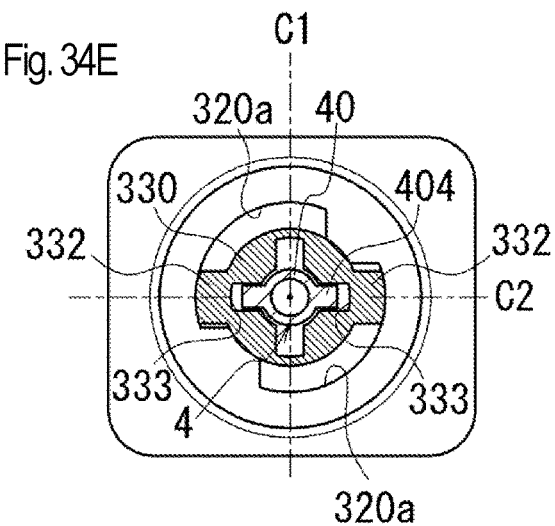

FIG. 34A is a cross section by cutting the cover 3B on plane B in FIG. 33A. FIG. 34B is a drawing illustrating the cover 3B as viewed in a direction of arrows A-A in FIG. 34A. FIG. 34C is a cross section taken in a direction of arrows B-B in FIG. 34A. FIG. 34D is a cross section taken in a direction of arrows C-C in FIG. 34A. FIG. 34E is a cross section taken in a direction of arrows B-B in FIG. 34A together with the rod 4B.

Figure 35B:
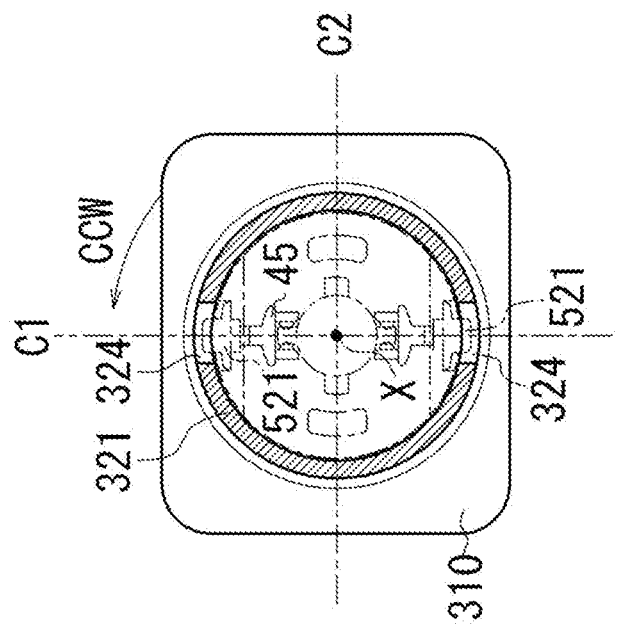
FIG. 35A and FIG. 35B are drawings explaining the cover.
Figure 35A:
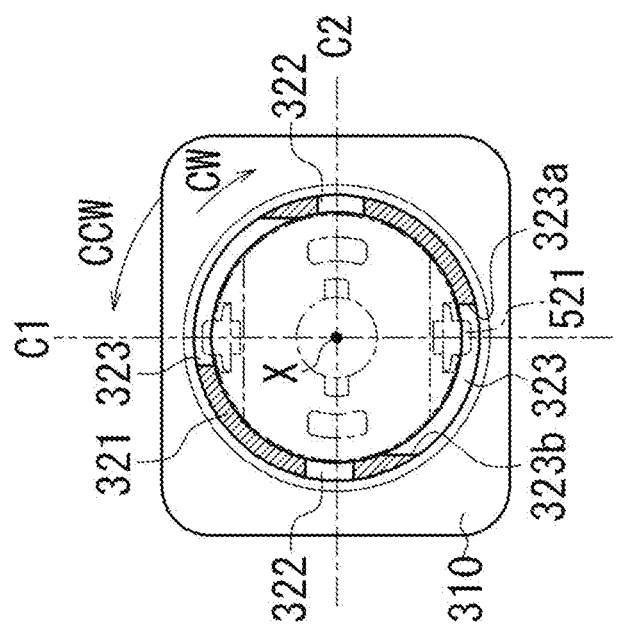

FIG. 35A is a cross section taken in a direction of arrows D-D in FIG. 34A. FIG. 35B is a cross section taken in a direction of arrows E-E in FIG. 34A.

FIGS. 36A to 36F are drawings explaining the displacement of the positions of the locking claws 521, 521 of the engaging pieces 52, 52 in the lock holder 5B-side and the displacement in the position of the cam 45 with the rotation of the cover 3B (the main body case 10) in the process of attaching the switch device 1B to the bracket 110 (refer to FIGS. 2C, 2E).

FIGS. 37A, 37B and FIGS. 38A, 38B are drawings explaining an operation of the cam 45 at the time of attaching the switch device 1B to the bracket 110.

As illustrated in FIG. 33A, the cover 3B includes the outer peripheral wall 31 inserted to surround the outer peripheral side of the annular wall portion 21 of the pole portion 2, the first restriction portion 32 defining the rotational range of the lock holder 5B in the cover 3B, and the second restriction portion 33 restricting the relative rotation between the rod 4B and the cover 3B until the rod 4B reaches a position of being engageable to the movable board 6.

The cover 3B differs in the arrangement of grooves (the positioning groove 322, the guide groove 323, a holding groove 324) in the first restriction portion 32 from the aforementioned cover 3.

As illustrated in FIG. 33C, the positioning groove 322 and the guide groove 323, and the holding groove 324 are located to be shifted in a position in the axis line X direction in the peripheral wall portion 321 of the first restriction portion 32.

As illustrated in FIG. 34A, the holding groove 324 is formed in a position separate to the outer peripheral wall 31-side (the right side in the figure) by a predetermined distance from the guide groove 323.

As illustrated in FIG. 35B, the holding grooves 324 are positioned on the diameter line C1 of the peripheral wall portion 321, and are located to be shifted by a phase of 180 degrees from each other in the circumferential direction around the axis line X.

The locking claw 521 of the engaging piece 52 in the lock holder 5B-side is engaged to the holding groove 324 before attaching the switch device 1B to the bracket 110, thus restricting the relative movement in the axis line X direction between the lock holder 5B and the cover 3B.

As illustrated in FIG. 35A, the positioning grooves 322 and the guide grooves 323 are provided to penetrate through the peripheral wall portion 321 in the thickness direction.

The positioning grooves 322 are positioned on the diameter line C2 of the peripheral wall portion 321 passing through the axis line X, and are located to be shifted by a phase of 180 degrees from each other in the circumferential direction around the axis line X.

The guide groove 323 is formed by cutting the peripheral wall portion 321 over a predetermined range in a direction closer to the positioning groove 322 (a clockwise direction CW in FIG. 35A) from a position overlapping with the diameter line C1.

The one end portion 323a of the guide groove 323 in the circumferential direction around the axis line X and the other end portion 323b are positioned on one end side and on the other end side across the diameter line C1, and are disposed in parallel with each other.

As illustrated in FIG. 33C, the through hole 330a of the rod 4B is provided in the central part of the second restriction portion 33. The through hole 330a penetrates through the second restriction portion 33 in the axis line X direction.

As illustrated in FIG. 34C, the second restriction portion 33 is, as viewed in the axis line X direction, provided with the plurality of restriction grooves 333 opening to the through hole 330a.

The restriction groove 333 is formed to be recessed to the radial outside of the axis line X, and comprises four restriction grooves at intervals of 90 degrees in the circumferential direction around the axis line X.

The engaging ribs 404, 404 of the rod 4B are engageable to the two restriction grooves 333, 333 positioned on the common diameter line C2 among the four restriction grooves 333.

FIG. 34E shows a state where the engaging ribs 404, 404 of the rod 4B are engaged to the two restriction grooves 333, 333 positioned on the diameter line C2, and in this state, the relative rotation around the axis line X between the rod 4B and the lock holder 5B is restricted.

As illustrated in FIG. 34A, the engaging portions 332, 332 are provided on the outer periphery of the second restriction portion 33 in the restriction wall 330-side to protrude to the radial outside.

As illustrated in FIG. 34D, the engaging portions 332, 332 are disposed in a positional relation to be symmetric across the diameter line C1. The engaging portions 332, 332 are positioned on the same diameter line C2, and are disposed in the circumferential direction around the axis line X at intervals of 180 degrees.

As illustrated in FIG. 34A, the outer diameter D2 of the area, in which the engaging portions 332, 332 are disposed, of the second restriction portion 33 is larger than the outer diameter D1 of the area, in which the engaging portions 332, 332 are not disposed, of the second restriction portion 33.

Hereinafter, an explanation will be made of the attachment of the switch device 1B to the bracket 110 in the vehicle side (refer to FIG. 1B).

The attachment of the switch device 1B to the bracket 110 in the vehicle side (refer to FIG. 1B) is performed in a state of causing the rod 4B to be pushed to abut on the bracket 101 in the brake pedal 100-side.

Figure 37A:
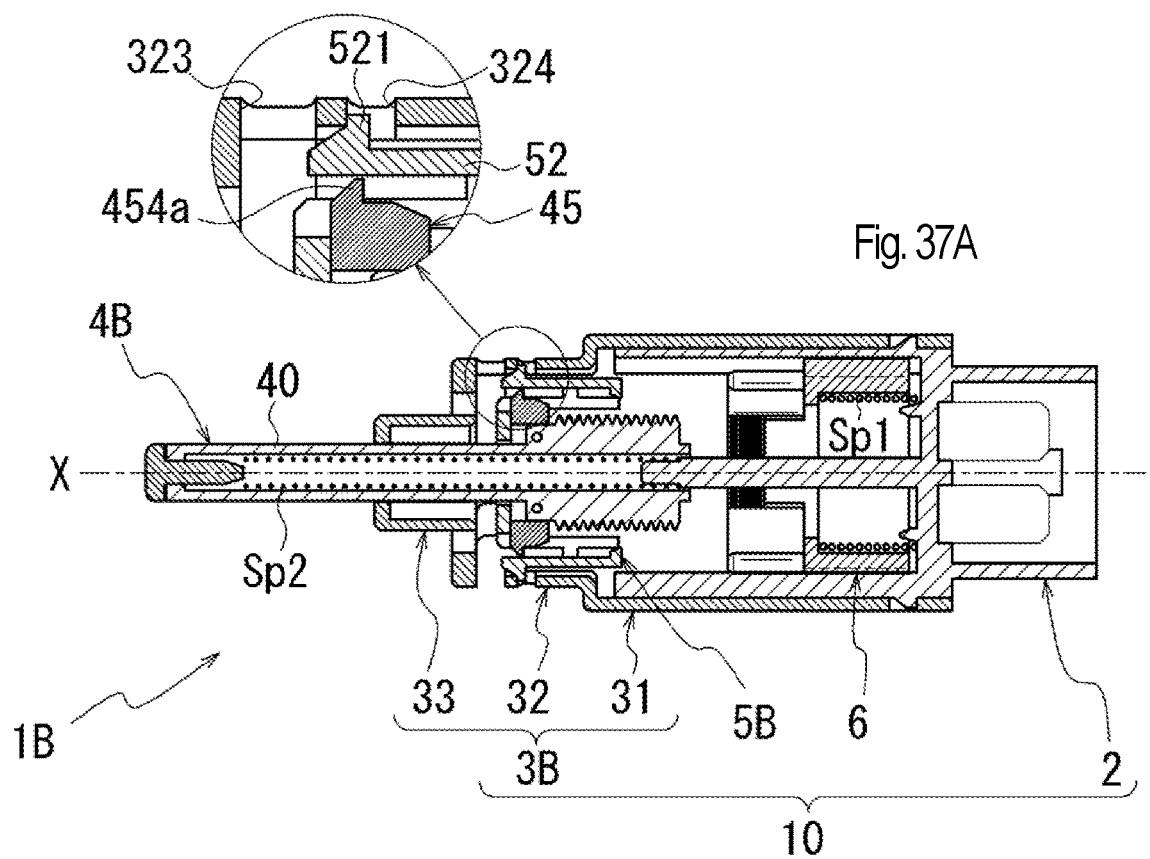
FIG. 37A and FIG. 37B are drawings explaining an operation of the cam at the time of attaching the switch device to a bracket.

FIG. 35B and FIG. 37A illustrate the positional relation between the locking claw 521 of the lock holder 5B and the holding groove 324 in a state prior to attaching the switch device 1B to the bracket 110 in the vehicle side.

For attaching the switch device 1B to the bracket 110, the rotation of the rod 4B and the lock holder 5B is restricted and the rod 4B is moved from a reference position illustrated in FIG. 37A to a cam release position of being pushed into the main body case 10 by a predetermined distance Lx.

Figure 37B:
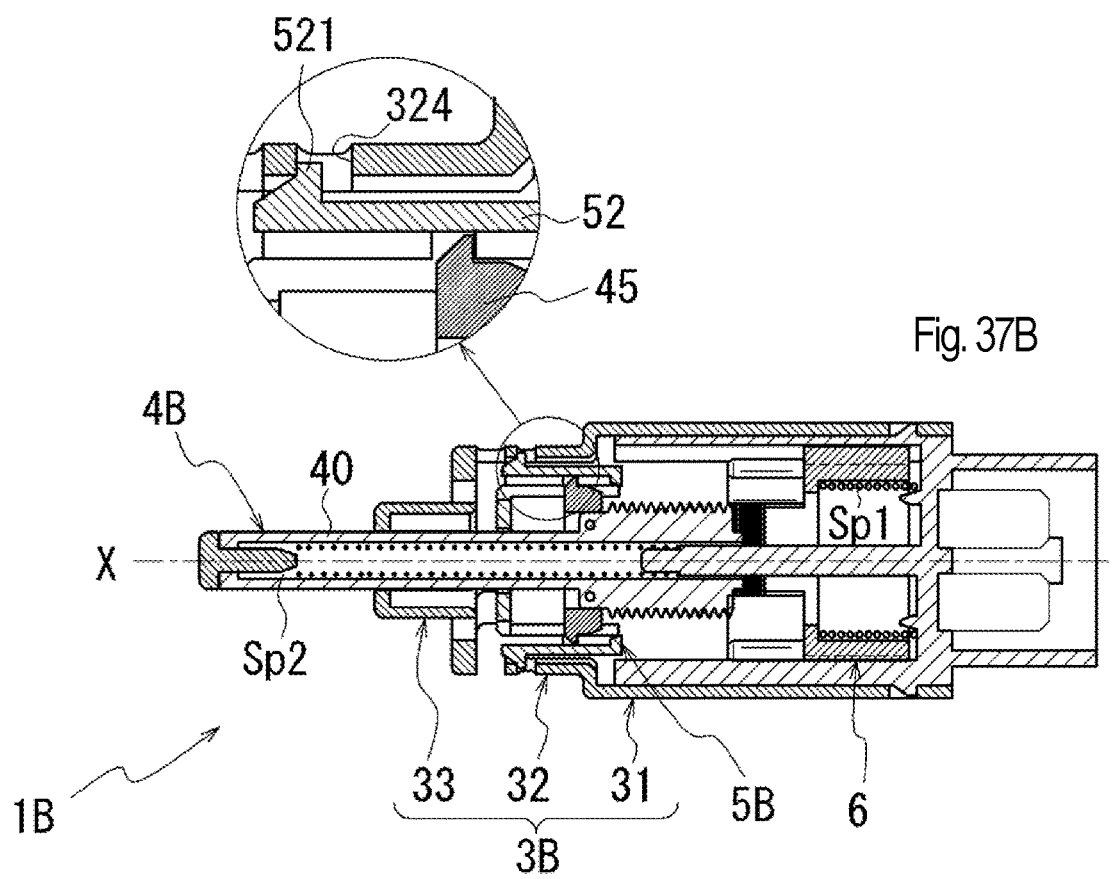

At this moment, since the locking claw 521 is engaged to the holding groove 324 in the cover 3B-side, the rod 4B is inserted in the main body case 10 in a state where the relative rotation around the axis line X between the rod 4B and the lock holder 5B, and the cover 3B is restricted (refer to FIG. 37B).

In the process of inserting the rod 4B in the main body case 10, even when a force rotating the rod 4B and the main body case 10 around the axis line X acts, since the cam 45 restricts the engaging piece 52 from displacing to the inner diameter side, the locking claw 521 does not fall down from the holding groove 324.

Figure 38A:
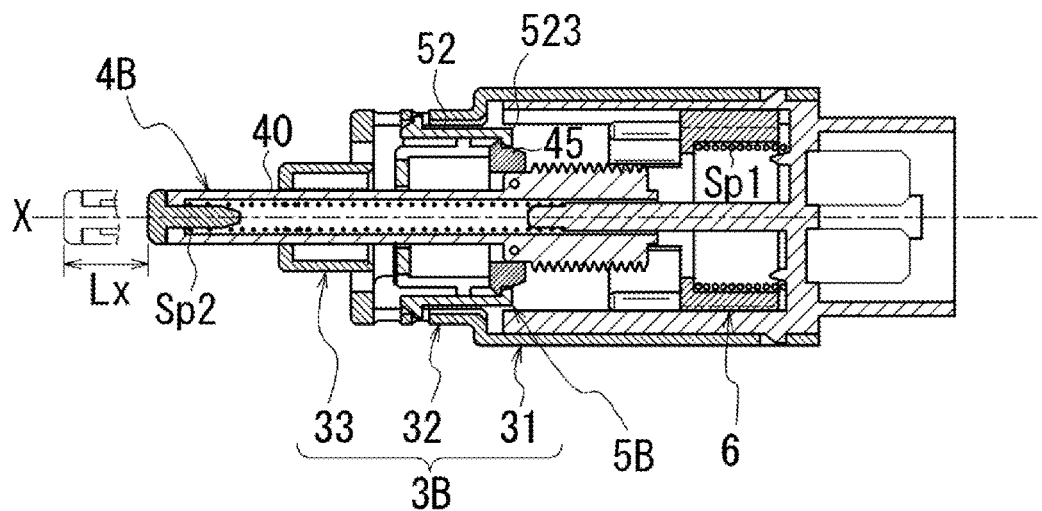
FIG. 38A and FIG. 38B are drawings explaining an operation of the cam at the time of attaching the switch device to the bracket.
Figure 38B:
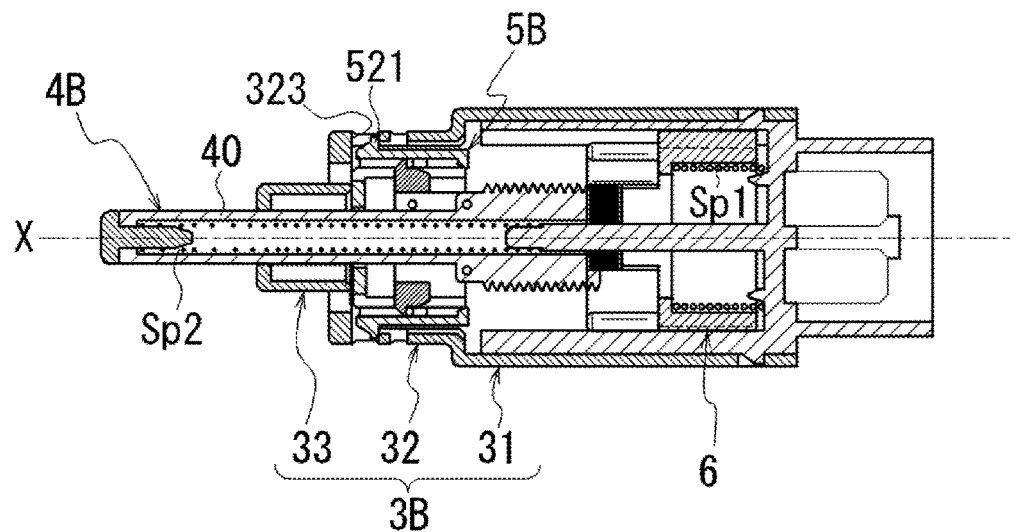

When the rod 4B is pushed into the main body case 10 by the predetermined length Lx to reach the cam release position, the cam 45 attached to the cam attachment portion 407 of the rod 4B is locked to the projection 523 of the lock holder 5B to fall down from the cam attachment portion 407 (refer to FIG. 38B).

Then, the lock holder 5B is pushed by the urging force of the spring to move in a direction separate from the pole board 2.

At this time, since the displacement to the inner diameter side of the locking claw 521-side of the engaging piece 52 is not restricted, the locking claw 521 runs over the boundary between the holding groove 324 and the guide groove 323 to move into the guide groove 323.

Further, the engaging projection 53 of the lock holder 5B protrudes from the arc-shaped groove 320a of the cover 3B to be inserted in the recessed grooves 112, 112 surrounding the attachment hole 111 of the bracket 110 following the movement of the lock holder 5B in the axis line X direction.

As a result in a state where the relative rotation around the axis line X between the main body case 10 and the bracket 110 is made possible, that is, assembly of the switch device 1B to the bracket 110 is made possible.

In this state, the relative rotation around the axis line X between the rod 4B and the lock holder 5B, and the cover 3B is not restricted.

Therefore, for attaching the switch device 1B to the bracket 110, the main body case 10 (the cover 3B) is rotated around the axis line X (the counterclockwise direction CCW in the figure) from a state in FIG. 36A.

Then, the end portion 323b in the guide groove 323-side comes in contact with the locking claw 521 in the circumferential direction around the axis line X. As described before, since the locking claw 521 is flexibly displaceable to the axis line X side (the inner diameter side), when the locking claw 521 is pushed out by the inclined surface of the end portion 323b to be displaced to the inner diameter side, the rotation of the main body case 10 around the axis line X continues (refer to FIG. 36B).

When the locking claw 521 runs over the end portion 323b, the locking claw 521 is engaged to the positioning groove 322 neighbored to the guide groove 323 to restrict the relative rotation between the main body case 10, and the rod 4B and the lock holder 5B (refer to FIG. 36C).

At the same time with this, the screw groove 403*a* provided on the outer periphery of the engaging portion 403 of the rod 4B is meshed with the screw groove 64*a* provided on the inner periphery of the engaging portion 64 of the movable board 6 to connect the rod 4B and the movable board 6. Thereby the rod 4B becomes movable together with the movable board 6 in the axis line X direction in a state of being correctly positioned in the axis line X direction.

Since the rod 4B and the movable board 6 are not connected until the rod 4B is inserted into the main body case 10 by the predetermined length Lx, the rod 4B can be prevented from being positioned in the erroneous position in the axis line X direction.

In the process where the main body case 10 rotates from a state in FIG. 36A to a state in FIG. 36C, the engaging portions 332, 332 in the main body case 10-side are displaced from the position of hiding the engaging projection 53 of the lock holder 5B, and finally, reach a position where the engaging portions 332 and the engaging projections 53 are alternately located at intervals of 90 degrees around the axis line X (refer to FIG. 36D through FIG. 36E to FIG. 36F, and FIGS. 2D, 2E).

Then, as illustrated in FIGS. 2D, 2E, the engaging portions 332, 332 in the main body case 10-side are located in the angle position out of the recessed groove 112 of the bracket 110, and the engaging portions 332, 332 of the second restriction portion 33 are locked in the peripheral edge of the attachment hole 111 of the bracket 110. In this state, the bracket 110 is gripped between the engaging portions 332, 332 and the first restriction portion 32 (refer to FIG. 2E) to complete the attachment of the switch device 1B to the bracket 110.

As described above, the switch device 1B according to the third embodiment has the following configuration.

(10) The switch device 1B comprises:

the rod 4B moving forward/backward in the axis line X direction in association with the operation of the brake pedal 100;

the main body case 10 in which the one end 40*a*-side of the rod 4B in the longitudinal direction is inserted and which supports the rod 4B to be movable in the axis line X direction;

the movable board 6 provided in the main body case 10 to be displaceable in the axis line X direction; and the connecting mechanism configured to connect the rod 4B and the movable board 6.

In the switch device 1B, the movable board 6 is displaced in the axis line X direction by the forward/backward movement of the rod 4B in the axis line X direction to cause the movable contact point 7 provided in the movable board 6 to be in contact with or to be separate from the fixed contact point 8.

In the switch device 1B, the lock holder 5B (the holder) is provided in the main body case 10 to support the rod 4B to be incapable of rotating relatively and to be movable in the axis line X direction.

The connecting mechanism includes:

the engaging portion 403 (the protruding portion) radially protruding from the outer periphery of the rod 4B; and the engaging portion 64 (the wall portion) provided in the movable board 6 and surrounding the outer periphery of the rod 4B by an interval smaller than the protruding height of the engaging portion 403.

The connecting mechanism is configured such that, when the rod 4B and the main body case 10 are relatively rotated around the axis line X after pushing the rod 4B into the main body case 10 by the predetermined length Lx from the initial position, the screw groove 403*a* located on the outer periphery of the engaging portion 403 is meshed with the screw groove 64*a* located on the inner periphery of the engaging portion 64 to connect the rod 4B and the movable board 6.

In the main body case 10, the lock holder 5B rotates relative to the main body case 10 within the predetermined angle range from the reference position around the axis line X.

When the lock holder 5B is located in the reference position, the engaging portion 403 (the screw groove 403*a*) and the engaging portion 64 (the screw groove 64*a*) are located to be shifted in a phase in the circumferential direction around the axis line X.

The switch device 1B has the fixing mechanism configured to fix the positional relation between the main body case 10 and the lock holder 5B at the time of rotating the lock holder 5B from the reference position by the predetermined angle range around the axis line X.

The fixing mechanism includes:

the engaging piece 52 which is cantilever-supported on the outer periphery of the lock holder 5B and the tip end side of which is flexibly displaceable radially, the tip end side being provided with the locking claw (the engaging claw) 521 on the outer periphery.

The peripheral wall portion 321 surrounding the outer periphery of the lock holder 5B in the main body case 10 is provided with the holding groove 324 (the engaging hole) to which the locking claw 521 (the engaging claw) is engaged until the rod 4B is pushed into the main body case 10 (refer to FIG. 38B) by the predetermined length Lx from the initial position (refer to FIG. 38A), to block the relative rotation around the axis line between the main body case 10 and the lock holder 5B, and the engaging grooves (the positioning groove 322, the guide groove 323) to which the locking claw 521 (the engaging claw) is engaged when the rod 4B is pushed into the main body case 10 by the predetermined length Lx from the initial position, to allow the relative rotation around the axis line between the main body case 10 and the lock holder 5B.

The holding groove 324 and the engaging groove are provided to be spaced in the axis line X direction from each other.

The rod 4B is provided with the cam 45 blocking the flexible deformation of the engaging piece 52 to the inner diameter side until the rod 4B is pushed into the main body case 10 by the predetermined length Lx from the initial position.

With this configuration, even when the force rotating the rod 4B and the main body case 10 around the axis line X acts in the process of inserting the rod 4B into the main body case 10, since the engaging piece 52 is restricted from displacing to the inner diameter side by the cam 45, the locking claw 521 does not fall down from the holding groove 324.

Thereby in the process of pushing the rod 4B into the main body case 10 by the predetermined length Lx from the initial position (refer to FIG. 15A), the engaging destination of the locking claw 521 of the engaging piece 52 is not switched to the guide groove 323 neighbored from the holding groove 324.

When the engaging destination of the locking claw 521 is switched to the guide groove 323, the relative rotation around the axis line X between the main body case 10 and the lock holder 5B is made possible.

Then, there is a possibility that the engaging destination of the locking claw 521 is switched from the guide groove 323 to the positioning groove 322 with the relative rotation produced in the middle of inserting the rod 4B in the main body case 10.

In this case, in the middle of attaching the switch device 1B to the bracket 110, the relative rotation between the main body case 10, and the rod 4B and the lock holder 5B is restricted. As a result, the attachment of the switch device 1A to the bracket 110 by the insert of the rod 4B in the main body case 10 cannot be made, but this configuration can appropriately prevent such an event from occurring.

As described above, the switch device 1B has the following configuration.

(11) The engaging groove includes:

the guide groove 323 (the first engaging groove) allowing the relative rotation around the axis line X between the main body case 10 and the lock holder 5B; and the positioning groove 322 (the second engaging groove) blocking the relative rotation around the axis line X between the main body case 10 and the lock holder 5B.

The guide groove 323 and the positioning groove 322 are neighbored to each other to be spaced in the circumferential direction around the axis line X.

The rod 4B is provided with the displacement restriction rib 406 (the rib) blocking the flexible deformation of the engaging piece 52 to the inner diameter side until the rod 4B is pushed into the main body case 10 by the predetermined length Lx (refer to FIG. 38B) from the initial position (refer to FIG. 38A).

With this configuration, when the main body case 10, the rod 4B and the lock holder 5B are rotated relatively around the axis line X by the predetermined angle after releasing the restriction of the relative rotation by the rotation restriction mechanism (the restriction groove 333, the engaging rib 404), the engaging piece 52 causing the locking claw 521 to be engaged to the guide groove 323 is flexibly displaced to the inner diameter side, and the locking claw 521 runs over the area between the guide groove 323 and the positioning groove 322 to be engaged to the positioning groove 322.

Thereby the positional relation of the main body case 10, and the rod 4B and the lock holder 5B is fixed only by rotating the main body case 10, and the rod 4B and the lock holder 5B relatively around the axis line X by the predetermined angle.

As described above, the switch device 1B has the following configuration.

(12) The rod 4B is provided with the cam attachment portion 407 (the attachment portion) to which the cam 45 is removably attached.

The lock holder 5B is provided with the projection 523 to be locked in the cam 45 on the inner periphery of the engaging piece 52. At a point where the rod 4B is pushed into the main body case 10 by the predetermined length Lx from the initial position, the cam 45 falls down from the cam attachment portion 407 by the projection 523 (the locking portion).

With this configuration, when the cam 45 falls down from the cam attachment portion 407, it is possible to quickly switch the engaging destination of the locking claw 521 from the holding groove 324 to the engaging groove (the positioning grove 322, the guide groove 323).

Thereby it is possible to make the main body case 10, and the rod 4B and the lock holder 5B in a state to be rotatable relatively at a point where the rod 4B is pushed into the main body case 10 by the predetermined length Lx from the initial position.

Fourth Embodiment

Figure 39:
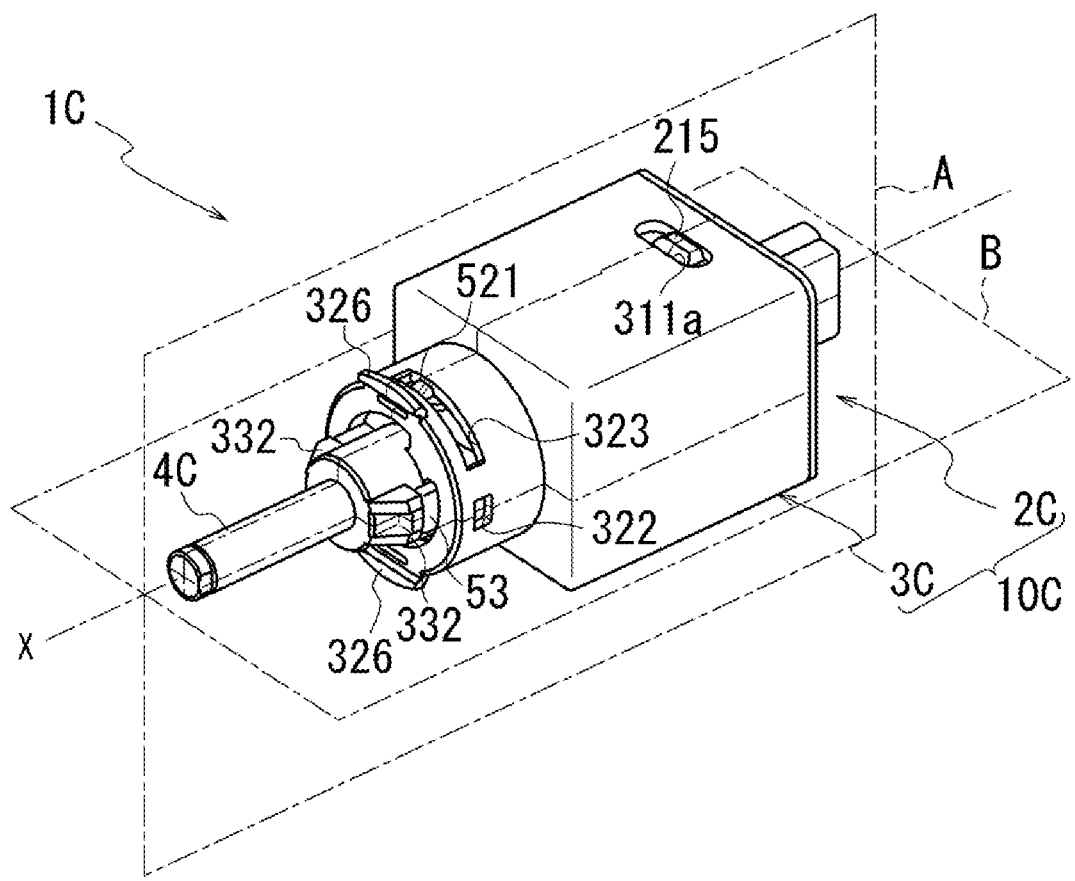
FIG. 39 is a perspective view illustrating a switch device according to a fourth embodiment of the present invention.

FIG. 39 is a perspective view illustrating a switch device 1C according to a fourth embodiment.

FIGS. 40A, 40B are cross sections illustrating the switch device 1C. FIG. 40A is a cross section by cutting the switch device 1C on plane A in FIG. 39. FIG. 40B is a cross section by cutting the switch device 1C on plane B in FIG. 39.

Figure 41:
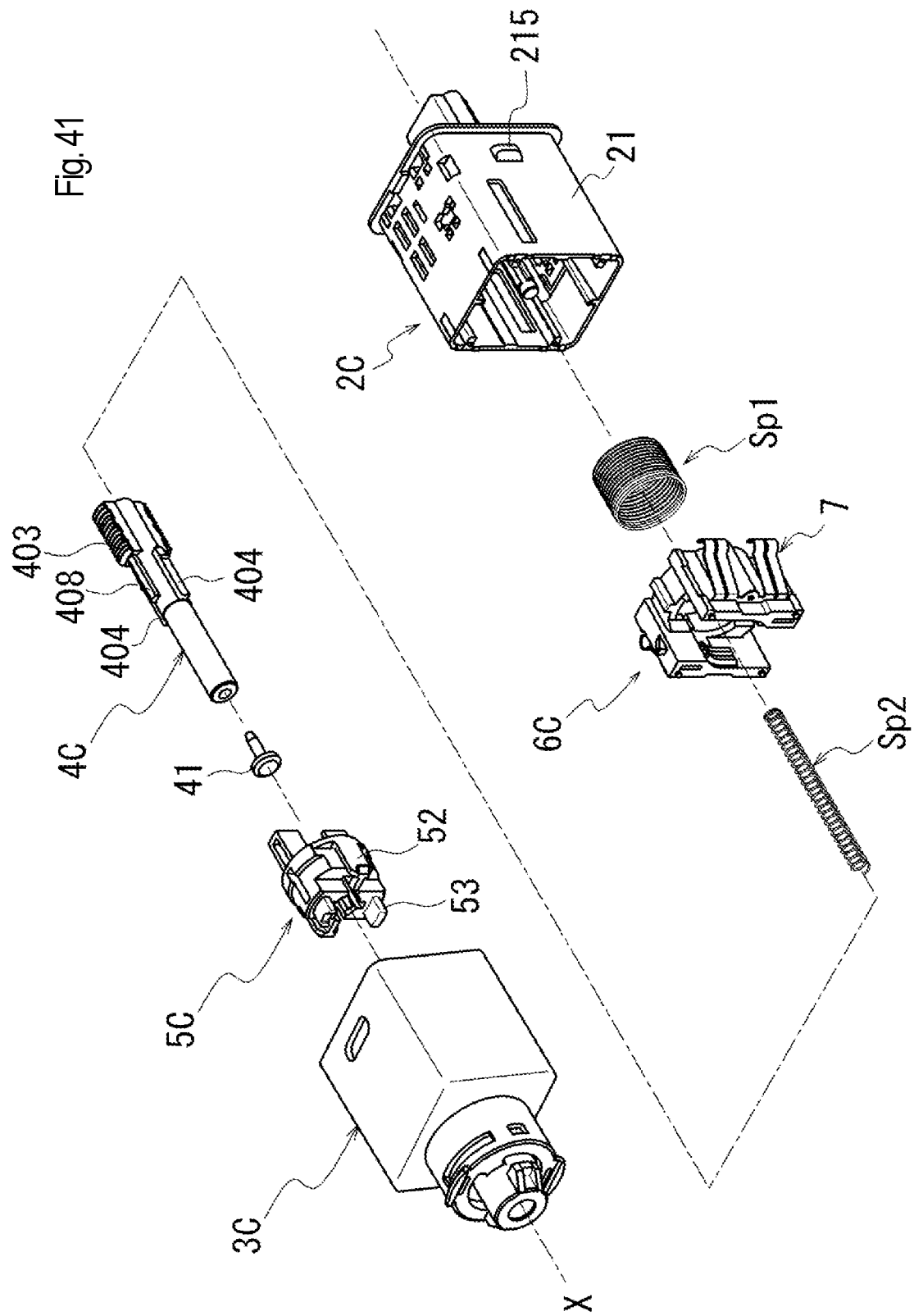
FIG. 41 is an exploded perspective view illustrating the switch device.

FIG. 41 is an exploded perspective view illustrating the switch device 1C.

The switch device 1C differs mainly in a shape of each of a cover 3C, a rod 4C, and a lock holder 5C from the switch device 1 as described before.

Hereinafter, different parts from those in the switch device 1 will be mainly explained, and the other parts will be explained as needed.

[Rod 4C]

Figure 42A:
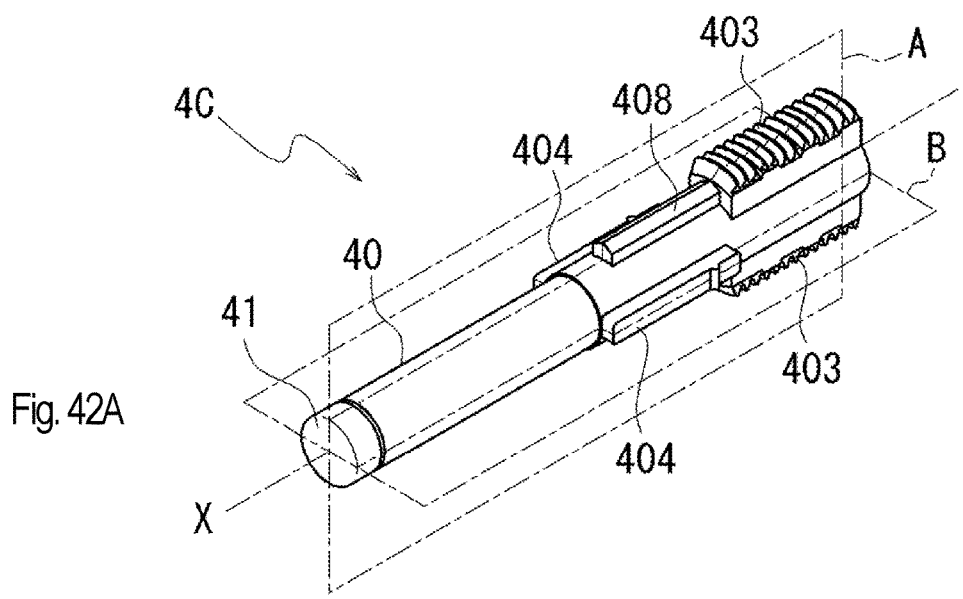
FIG. 42A to FIG. 42D are drawings explaining a rod.
Figure 42B:
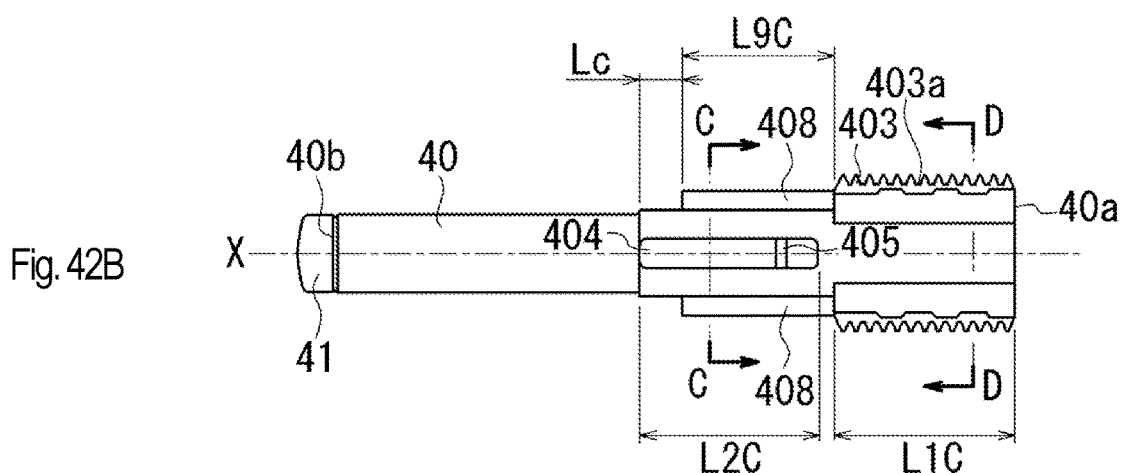
Figure 42C:
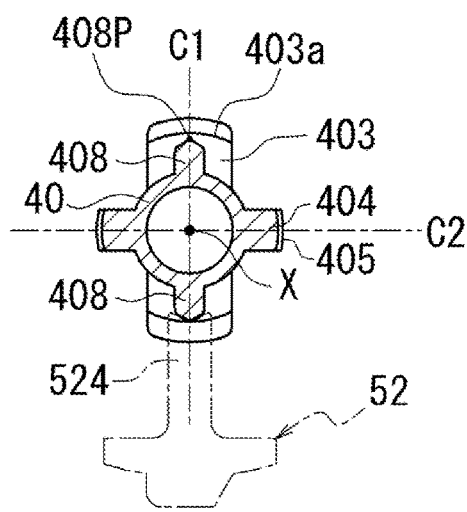
Figure 42D:
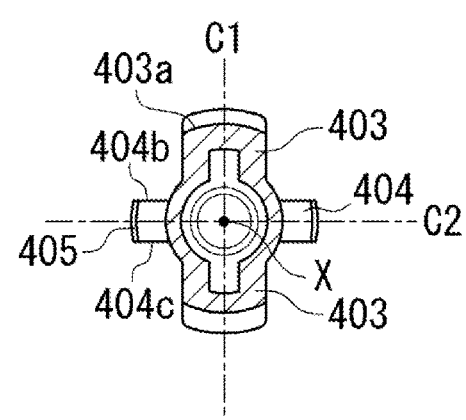

FIG. 42A to FIG. 42D are drawings explaining the rod 4C. FIG. 42A is a perspective view illustrating the rod 4C, FIG. 42B is a side view illustrating the rod 4C, FIG. 42C is a cross section taken along line C-C in FIG. 42B, and FIG. 42D is a cross section taken along line D-D in FIG. 42B.

The rod 4C differs from the rod 4 in a point where the displacement restriction ribs 408 are provided in addition to the engaging portions 403 and the engaging ribs 404 (refer to FIG. 5A).

As illustrated in FIGS. 40A, 40B, the cylindrical base portion 40 is provided with the engaging portions 403, the engaging ribs 404 and the displacement restriction ribs 408 in the area, which is positioned inside of the main body case 10, of the base portion 40.

As illustrated in FIG. 42B, in the base portion 40 the engaging portion 403 extends from the one end portion 40a in the longitudinal direction to the other end portion 40b-side (the left side in FIG. 42B) along the center axis (the axis line X) of the base portion 40, and is formed to have a predetermined length L1C in the center axis direction (the axis line X direction) of the base portion 40.

As illustrated in FIG. 42D, the engaging portion 403 protrudes toward the radial outside of the axis line X from the outer periphery of the base portion 40 in a cross-sectional view perpendicular to the center axis (the axis line X) of the base portion 40.

The engaging portion 403 comprises two engaging portions which are disposed in the circumferential direction around the axis line X at intervals of 180 degrees, and the engaging portions 403, 403 are positioned on the diameter line C1 of the base portion 40.

The outer peripheral portion of the engaging portion 403 is formed in an arc shape in a cross-sectional view, and the plurality of screw grooves 403a are disposed on the outer peripheral portion of the engaging portion 403 at predetermined intervals in the axis line X direction.

The end portion of the engaging portion 403 in the engaging rib 404-side (the left side in FIG. 42B) is provided with the displacement restriction rib 408 together with the engaging portion 403.

The displacement restriction rib 408 also comprises two displacement restriction ribs which are disposed in the circumferential direction around the axis line X at intervals of 180 degrees.

The displacement restriction ribs 408 are located along the axis line X on the extension of the engaging portion 403.

As viewed in the radial direction of the center axis (the axis line X) of the base portion 40, the engaging portion 403 and the displacement restriction rib 408 are serially located on the axis line X, and the displacement restriction rib 408 is also positioned on the diameter line C1 of the base portion 40 (refer to FIG. 42C).

As illustrated in FIG. 42C, the outer peripheral portion of the displacement restriction rib 408 is formed in a tapered shape such that a width in the peripheral direction around the axis line X becomes narrower as progress toward the outer peripheral side, and an outer peripheral end 408P of the displacement restriction rib 408 is positioned on the diameter line C1.

In the switch device 1C, a displacement restriction piece 524 of the engaging piece 52 to be described later is engaged to the outer peripheral end 408P of the displacement restriction rib 408 in the radial direction of the axis line X at a point before the assembly of the switch device 1C to the bracket 110 is completed.

As illustrated in FIG. 42B, the displacement restriction rib 408 is formed to have a predetermined length L9C in the axis line X direction.

The engaging rib 404 is formed to have a predetermined length L2C in the axis line X direction.

The engaging rib 404 protrudes closer to the end portion 40b-side of the base portion 40 by a predetermined length Lc than the displacement restriction rib 408.

In a cross-sectional view, the engaging ribs 404 protrude toward the radial outside of the axis line X from the outer periphery of the base portion 40. The engaging rib 404 comprises two engaging ribs which are disposed in the circumferential direction around the axis line X at intervals of 180 degrees. The engaging ribs 404, 404 are positioned on the diameter line C2 of the base portion 40.

The engaging rib 404 is disposed to be shifted by a phase of 90 degrees in the circumferential direction around the axis line X to the engaging portion 403 and the displacement restriction rib 408.

As viewed in the axis line X direction, the engaging portion 403 and the displacement restriction rib 408, and the engaging rib 404 are alternately disposed at intervals of 90 degrees in the circumferential direction around the axis line X.

As illustrated in FIG. 42D, in a cross-sectional view the engaging rib 404 includes the side surface 404b on one side and the side surface 404c on the other side in a direction of the diameter line C1 which are flat surfaces in parallel with each other.

A projection 405 is provided on the outer periphery, which is in the engaging portion 403-side as mentioned before, of the engaging rib 404.

[Lock Holder 5C]

FIGS. 43A to 43D and FIGS. 44A to 44C are drawings explaining the lock holder 5C.

FIG. 43A and FIG. 43B are perspective views illustrating the lock holder 5C. FIG. 43C is a cross section illustrating the lock holder 5C by cutting the lock holder 5C on plane B in FIG. 43A. FIG. 43D is a cross section illustrating the lock holder 5C by cutting the lock holder 5C on plane A in FIG. 43A.

FIG. 44A is a cross section illustrating the lock holder 5C as viewed in a direction of arrows C-C in FIG. 43C. FIG. 44B is a cross section illustrating the lock holder 5C by cutting the lock holder 5C along line D-D in FIG. 43C. FIG. 44C is a cross section illustrating the lock holder 5C by cutting the lock holder 5C along line E-E in FIG. 43C.

As illustrated in FIGS. 43C, 43D, the lock holder 5C includes the cylindrical base portion 50, and the wall portion 51 closing one end of the base portion 50.

As illustrated in FIG. 44A, as viewed in the axis line X, the base portion 50 is provided with the width across flat portions 501, 501 in parallel with each other.

The width across flat portions 501, 501 are flat surfaces by cutting and removing part of the base portion 50 in the outer peripheral side along the virtual lines Ln, Ln illustrated in FIG. 44A.

Herein, the virtual lines Ln, Ln are virtual lines positioned to be symmetric across the diameter line C2, which are perpendicular to the diameter line C1 and in parallel with each other.

As illustrated in FIG. 43C, the engaging pieces 52, 52 located in a direction along the axis line X are disposed outside of the width across flat portions 501, 501.

One ends of the engaging pieces 52, 52 in the longitudinal direction are connected to the areas (the connecting portions 502) of the base portions 50, 50 in the outside over the width across flat portions 501, 501 in the axis line X direction.

The locking claws 521, 521 are disposed on the outer peripheries of the engaging pieces 52, 52 in the other end side. The locking claw 521 protrudes outward from the outer periphery of the engaging piece 52.

The tip end side of the engaging piece 52 in which the locking claw 521 is disposed is configured to be flexibly displaceable in the radial direction of the axis line X.

As illustrated in FIG. 40A, in the cover 3C the lock holder 5C causes the locking claws 521, 521 to be locked to guide grooves 323, 323 in the cover 3C-side. As illustrated in FIG. 40B, a movable board 6C urged by a spring Sp1 abuts on the lock holder 5C in the axis line X direction, and the lock holder 5C is accommodated inside of the cover 3C.

As illustrated in FIG. 43C, the displacement restriction pieces 524, 524 are disposed on the inner periphery of the engaging pieces 52, 52 in the other end side. The displacement restriction pieces 524, 524 extend to the axis line X side. Therefore the width across flat portions 501, 501 of the base portion 50 are provided with notches 503, 503 for avoiding interference with the displacement restriction pieces 524, 524, on areas in the wall portion 51-side (the left side in FIG. 43C).

As illustrated in FIG. 44A, the displacement restriction pieces 524, 524 are located in a direction perpendicular to the axis line X, and end portions thereof in the axis line X side are provided with recessed portions 524a, 524a.

In the switch device 1C, the recessed portions 524a, 524a of the displacement restriction pieces 524, 524 are elastically engaged to the displacement restriction ribs 408 of the rod 4C in the axis line X direction (refer to FIG. 40A) at a point before the assembly of the switch device 1C to the bracket 110 (refer to FIGS. 48A to 48G) is completed.

As illustrated in FIG. 42C and FIG. 44A, the outer peripheral portion of the displacement restriction rib 408 is formed in a tapered shape such that a width in the peripheral direction around the axis line X becomes narrower as progress toward the outer peripheral side. In the present embodiment, the recessed portion 524a of the displacement restriction piece 524 is formed in such a shape that the opening width in the diameter line C2 direction is wider as progress toward the displacement restriction rib 408.

Therefore the recessed portion 524a of the displacement restriction piece 524 and the displacement restriction rib 408 act as guides when the rod 4C and the lock holder 5C move relative to each other in the axis line X direction.

[Cover 3C]

FIGS. 45A to 45D to FIGS. 46A to 46E are drawings explaining the cover 3C. FIGS. 45A and 45B are perspective views illustrating the cover 3C. FIG. 45C is a cross section by cutting the cover 3C on plane A in FIG. 36A. FIG. 45D is a cross section taken in a direction of arrows C-C in FIG. 45C.

Figure 46A:
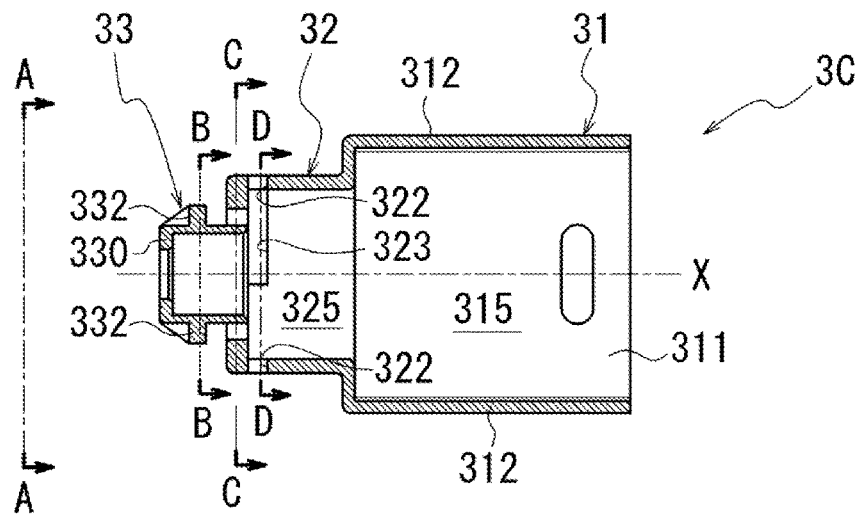
FIG. 46A to FIG. 46E are drawings explaining the cover.

FIG. 46A is a cross section by cutting the cover 3C on plane B in FIG. 45A.

Figure 46B:
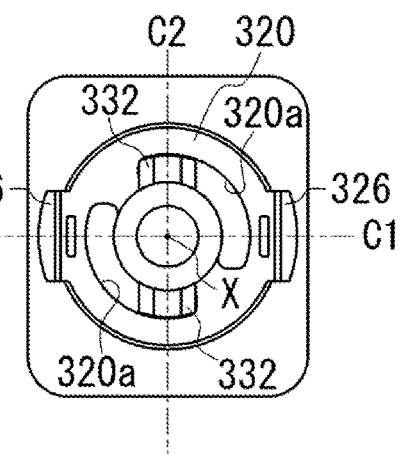
Figure 46C:
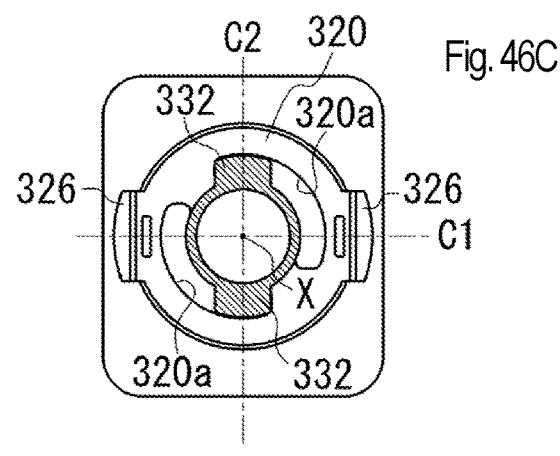
Figure 46D:
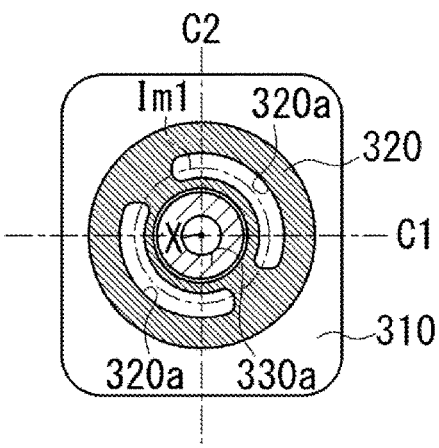
Figure 46E:
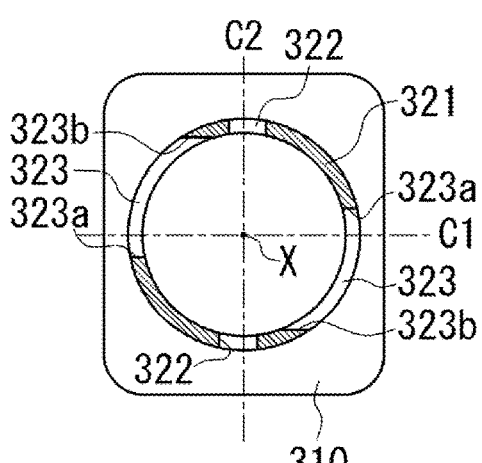

FIG. 46B is a drawing illustrating the cover 3C as viewed in a direction of arrows A-A in FIG. 46A. FIG. 46C is a cross section taken in a direction of arrows B-B in FIG. 46A. FIG. 46D is a cross section taken in a direction of arrows C-C in FIG. 46A. FIG. 46E is a cross section taken in a direction of arrows D-D in FIG. 46A.

As illustrated in FIG. 45A, the cover 3C includes the outer peripheral wall 31 inserted to surround the outer peripheral side of the annular wall portion 21 of the pole portion 2C (refer to FIG. 41), the first restriction portion 32 defining the rotational range of the lock holder 5C, and the second restriction portion 33 restricting the rod 4C from falling down from the cover 3C.

As illustrated in FIGS. 45B, 45D, the outer peripheral wall 31 includes the first wall portions 311, 311 having the engaging portions 311a, 311a in the center in the width direction, and the second wall portions 312, 312 connecting the end portions of the first wall portions 311, 311 to each other. As viewed in the axis line X direction, the outer peripheral wall 31 has a rectangular shape, and is formed in a shape of being inserted to surround the outer peripheral side of the annular wall portion 21 in the pole board 2C-side (refer to FIGS. 40A, 40B) without a clearance.

The engaging holes 311a, 311a of the first wall portions 311, 311 are located to positions corresponding to the engaging claws 215, 215 (refer to FIG. 41A) disposed on the annular wall portion 21 in the pole board 2C-side. At the time of assembling the cover 3C and the pole board 2C in the axis line X direction, the engaging claws 215, 215 in the pole board 2C-side are engaged to the engaging holes 311a, 311a in the cover 3C-side, whereby the cover 3C is restricted from falling down from the pole board 2C.

As illustrated in FIG. 45C, one end of the outer peripheral wall 31 in the axis line X direction is closed by the wall portion 310 perpendicular to the axis line X, and the first restriction portion 32 is disposed in the central part of the wall portion 310.

The first restriction portion 32 includes the tubular peripheral wall portion 321, and the wall portion 320 closing on end of the peripheral wall portion 321. An area, which overlaps with the peripheral wall portion 321, of the wall portion 310 opens, and the columnar space 325 inside of the peripheral wall portion 321 and the rectangular space 315 inside of the outer peripheral wall 31 are communicated with each other.

As illustrated in FIG. 46E, the peripheral wall portion 321 is provided with the positioning grooves 322 and the guide grooves 323.

The positioning grooves 322 and the guide grooves 323 are provided to penetrate through the peripheral wall portion 321 in the thickness direction.

The positioning grooves 322 are positioned on the diameter line C2, which passes through the axis line X, of the peripheral wall portion 321, and are located to be shifted by a phase of 180 degrees from each other in the circumferential direction around the axis line X.

The guide groove 323 is formed by cutting the peripheral wall portion 321 over a predetermined range in a direction closer to the positioning groove 322 (the clockwise direction CW in FIG. 46E) from a position overlapping with the diameter line C1.

The one end portion 323a of the guide groove 323 in the circumferential direction around the axis line X and the other end portion 323b are positioned on one end side and on the other end side across the diameter line C1, and are disposed in parallel with each other.

In the present embodiment the positioning groove 322 and the guide groove 323 each have the same width W1 in the axis line X direction (refer to FIG. 45C).

As illustrated in FIG. 45C, in the peripheral wall portion 321 of the first restriction portion 32, the one end of the peripheral wall portion 321 in the axis line X direction is closed by the wall portion 320 perpendicular to the axis line X, and the columnar second restriction portion 33 is disposed in the central part of the wall portion 320.

Abutting portions 326, 326 are disposed on an outer periphery of the wall portion 320 to protrude to the radial outside.

As illustrated in FIG. 46B, the abutting portions 326, 326 are located in a positional relation to be symmetric across the diameter line C2. The abutting portions 326, 326 are positioned on the same diameter line C1, and located at intervals of 180 degrees in the circumferential direction around the axis line X.

As illustrated in FIGS. 46B, 46D, the wall portion 320 is provided with the arc-shaped grooves 320a, 320a. The arc-shaped grooves 320a are disposed along the circumferential direction around the axis line X on the virtual circle Im at the center of the axis line X. As viewed in the axis line X direction, the arc-shaped grooves 320a, 320a are located in a positional relation to be shifted by a phase of 180 degrees across the axis line X.

The engaging projections 53, 53 of the lock holder 5C are configured to be inserted in the arc-shaped grooves 320a, 320a in the axis line X direction (refer to FIG. 40B).

The arc-shaped grooves 320a, 320a enable the relative rotation around the axis line X between the lock holder 5C and the main body case 10 (the cover 3C), and are provided to define a rotational range thereof.

As illustrated in FIG. 46D, the through hole 330a of the rod 4 (the base portion 40) is provided in the central part of the wall portion 320. The through hole 330a penetrates through the wall portion 320 in the axis line X direction, and communicates the inside of the second restriction portion 33 with the space 325 in the inside of the first restriction portion 32.

As illustrated in FIG. 40B, the peripheral wall portion 331 of the second restriction portion 33 is formed with the inner diameter rl larger than the outer diameter of the engaging rib 404 of the rod 4C.

The peripheral wall portion 321 of the second restriction portion 33 is, which is different from the switch device 1, not provided with the restriction groove 333 (refer to FIG. 13B) to which the engaging rib 404 is engaged.

Therefore in the switch device 1C, when the engaging rib 404 of the rod 4C is positioned in the inner diameter side of the second restriction portion 33, the rotation of the rod 4C around the axis line X is allowed.

As illustrated in FIG. 45C, the second restriction 33 is provided with the restriction wall 330 surrounding the through hole 330a.

As illustrated in FIG. 40B, the engaging rib 404 of the rod 4C pushed by the urging force of the spring Sp2 abuts on the restriction wall 330 in the axis line X direction.

The restriction wall 330 of the second restriction portion 33 acts as a stopper restricting the rod 4C from falling down from the main body case 10C.

As illustrated in FIG. 46B, the engaging portions 332, 332 are provided on the outer periphery of the second restriction portion 33 in the restriction wall 330-side to protrude to the radial outside.

As illustrated in FIG. 46B, the engaging portions 332, 332 are disposed in the positional relation to be symmetric across the diameter line C1. The engaging portions 332, 332 are positioned on the same diameter line C2, and are disposed in the circumferential direction around the axis line X at intervals of 180 degrees.

As illustrated in FIG. 46C, the engaging portion 332 is formed with the outer diameter extending to the outer periphery of the arc-shaped groove 320a in the first restriction portion 32-side as described before as viewed in the axis line X direction.

Figure 48A:
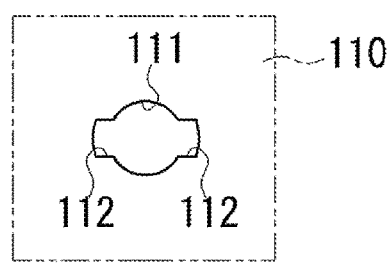
FIG. 48A to FIG. 48G are drawings explaining an installation process of the switch device.
Figure 48B:
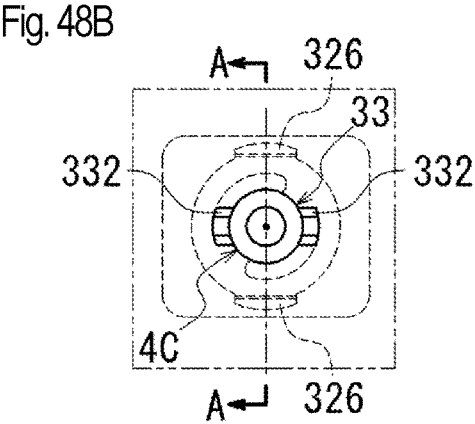
Figure 48C:
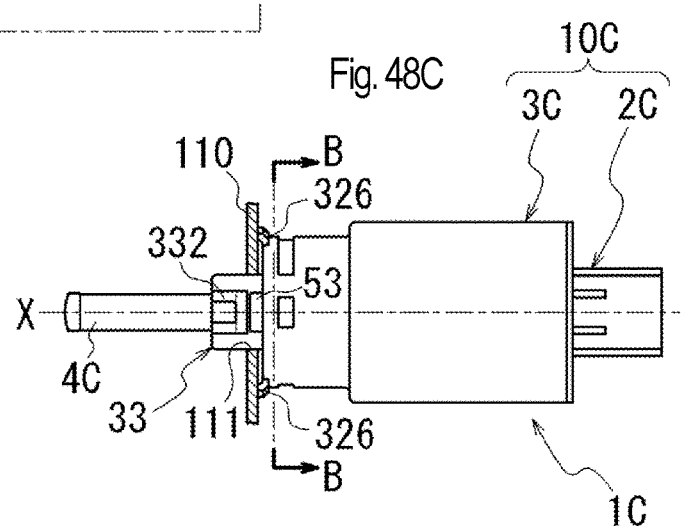

In the switch device 1C, the engaging portions 332, 332 of the first restriction portion 32 are locked in the peripheral edge of the attachment hole 111 of the bracket 110 to grip the bracket 110 between the engaging portions 332, 332 and the first restriction portion 32 (refer to FIG. 48C).

At this time, in a case of the switch device 1C, the abutting portions 326, 326 provided in the first restriction portion 32 abut on the surfaces of the bracket 110 at the opposite side of the engaging portions 332, 332 to securely support the switch device 1C with the bracket 110.

[Movable Board 6C]

FIGS. 47A to 47D are drawings explaining the movable board 6C.

FIG. 47A is a perspective view illustrating the movable board 6c. FIG. 47B is a cross section by cutting the movable board 6C on plane A in FIG. 47A. FIG. 47C is a cross section by cutting the movable board 6C on plane B in FIG. 47A. FIG. 47D is a diagram illustrating the movable board 6C as viewed in a direction of arrows C-C in FIG. 47C.

In FIG. 47A, illustration of the movable contact point 7 on the near side of the sheet surface is omitted for descriptive purposes.

As illustrated in FIG. 47A, the movable board 6C includes the annular base portion 60, the pair of the contact point support portions 63, 63, and the pair of the engaging portions 64, 64 disposed in the portions, which opposes to each other, of the pair of the contact point support portions 63, 63.

As illustrated in FIG. 47C, the annular base portion 60 has a length L6 in the axis line X direction shorter than a length L5 of the contact point support portions 63, 63 in the axis line X direction. The annular base portion 60 is positioned in the one end 63a-side of the contact point support portion 63 in the axis line X direction.

As illustrated in FIG. 47C, the contact point support portions 63, 63 are disposed in the positional relation of being symmetrical across the axis line X, and the annular base portion 60 connects the contact point support portions 63, 63 each other between the contact point support portions 63, 63.

As illustrated in FIGS. 47A, 47C, the movable contact points 7, 7 are fixed on the outer peripheries of the contact point support portions 63, 63 at the opposite side of the axis line X.

As illustrated in FIGS. 47A, 47D, the contact point support portions 63, 63 are provided with reinforcement ribs 632, 632 in the central part in the width direction.

The areas, which are in the other end 63b-side in the axis line X direction, of the contact point support portions 63, 63 face to each other across the axis line X. The engaging portions 64, 64 are disposed on the opposing surfaces of each other of the opposing areas (refer to FIG. 47C).

The engaging portion 64 is a part engaged to the engaging portion 403 in the rod 4C-side at the time of connecting the rod 4C and the movable board 6C.

The engaging portion 64 protrudes to the axis line X side from the contact point support portion 63, and the screw grooves 64a are disposed on the surface of the engaging portion 64 in the axis line X side by predetermined intervals in the axis line X direction.

As illustrated in FIG. 47D, as viewed in the axis line X direction the engaging portion 64 includes the first engaging portion 641 having the inner periphery along the virtual circle ImI centering the axis line X, and the second engaging portion 642 having the inner periphery along the diameter line C1.

The second engaging portion 642 extends linearly in the tangential direction of the virtual circle ImI, and the separate distance ra of the second engaging portion 642 from the axis line X is larger as separate from the first engaging portion 641.

In the movable board 6C, the engaging portions 64, 64 each are disposed on one side and on the other side across the axis line X. As viewed in the axis line X direction, the engaging portion 64 on the one side and the engaging portion 64 on the other side are disposed in the positional relation to be rotated in the circumferential direction around the axis line X by 180 degrees.

In FIG. 47D, the first engaging portion 641 and the second engaging portion 642 line up in this order in each of the engaging portion 64 on the one side and the engaging portion 64 on the other side in the counterclockwise direction around the axis line X.

The reinforcement ribs 632, 632 each are formed to have a length L7 in the axis line X extending to the backside of the engaging portions 64, 64, and the strength in the periphery of the engaging portions 64, 64 is reinforced by the ribs 632, 623.

In the switch device 1C, as illustrated in FIG. 49C, the engaging portions 64, 64 of the movable board 6C are finally connected to the engaging portions 403,403 in the rod 4C-side.

In the present embodiment, for attaching the switch device 1C to the bracket 110, after the rod 4C is pushed into the main body case 10 from the initial position by the predetermined length Lx, the main body case 10C is rotated around the axis line X. At a point where the locking claw 521 of the lock holder 5C is elastically engaged to the positioning groove 322 in the cover 3C (the main body case 10C)-side, the engaging portion 64 is engaged to the engaging portion 403.

As illustrated in FIG. 49A, in a state where the rod 4C is pushed into the main body case 10C from the initial position by the predetermined length Lx, the engaging portions 403, 403 in the rod 4C-side are positioned between the engaging portions 64, 64 opposing across the axis line X.

When the main body case 10C is rotated in the counterclockwise direction from this state, the movable board 6C is also rotated together with the main body case 10C in the counterclockwise direction.

Then, the engaging portions 403, 403 in the rod 4C-side are gradually engaged to the second engaging portion 642 of the engaging portion 64 in the movable board 6C-side with the rotation of the main body case 10C. Finally, the engaging portions 403, 403 in the rod 4C-side are engaged to the first engaging portions 641, 641 in the movable board 6C-side, whereby the rod 4C and the movable board 6C are connected. As a result, the rod 4C and the movable board 6C are connected to be movable together in the axis line X direction.

In the wall portion 61 of the movable board 6C, as illustrated in FIG. 40A, the one end of the spring Sp1 supported by the pole board 2C abuts on the area, which surrounds the central opening 61a, of the wall portion 61 of the movable board 6C in the axis line X direction.

In this state, the movable board 6C is urged to the lock holder 5C-side (the left side in the figure) by the urging force of the spring Sp1. When the brake pedal 100 is depressed, the other end portion 40b-side of the rod 4C protrudes to the outside of the main body case 10C in accordance with the operation amount of the brake pedal 100.

Hereinafter, an explanation will be made of the process of attaching the switch device 1C to the bracket 110.

FIG. 48A to FIG. 48G are diagrams explaining the process of attaching the switch device 1C to the bracket 110.

Figure 48D:
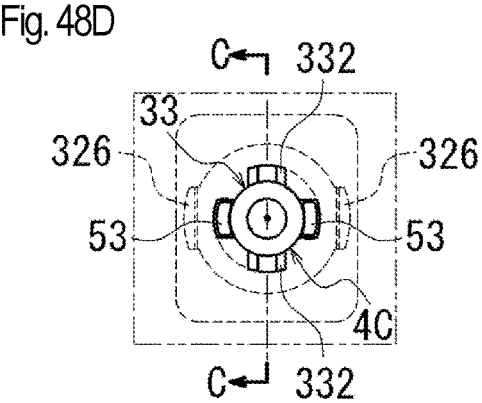
Figure 48E:
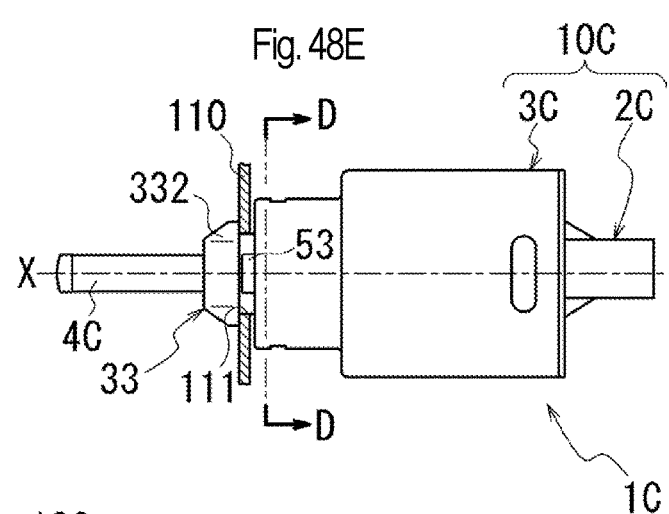
Figure 48F:
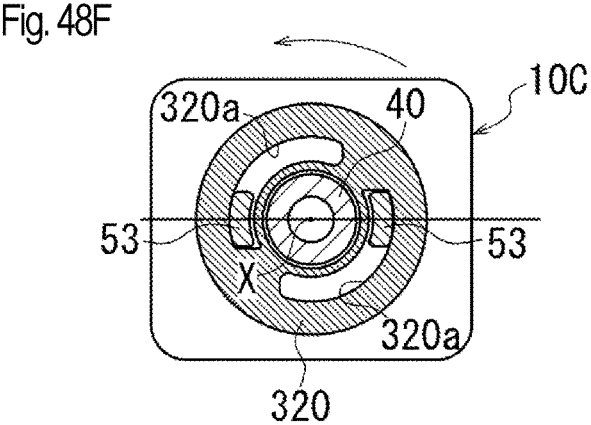
Figure 48G:
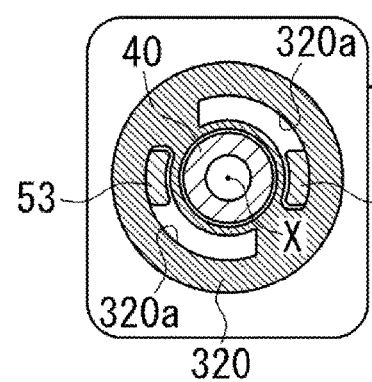

FIG. 48A is a diagram explaining the bracket 110 to which the switch device 1C is attached. FIG. 48B is a diagram explaining a state where the second restriction portion 33 of the switch device 1C is inserted in the attachment hole 111 of the bracket 110. FIG. 48C is a diagram by cutting the bracket 110 alone along line A-A in FIG. 48B. FIG. 48D is a diagram illustrating a state where the main body case 10C of the switch device 1C is rotated around the axis line X from states of FIG. 48B, FIG. 48C to fix the switch device 1C to the bracket 110. FIG. 48E is a diagram by cutting the bracket 110 alone along line C-C in FIG. 48B. FIG. 48F is a cross section taken in a direction of arrows B-B in FIG. 48C. FIG. 48G is a cross section taken in a direction of arrows D-D in FIG. 48E.

FIG. 49A to FIG. 49C are diagrams explaining the process of attaching the switch device 1C to the bracket 110. FIG. 49A is a cross section explaining a state where the rod 4C is pushed into the main body case 10 by the predetermined length Lx. FIG. 49B is a cross section taken in a direction of arrows A-A in FIG. 49A. FIG. 49C is a cross section illustrating a state where the main body case 10C is rotated in an arrow direction from an angle position in FIG. 49B.

FIG. 50A to FIG. 50D are diagrams explaining the process of attaching the switch device 1C to the bracket 110.

Figure 50B:
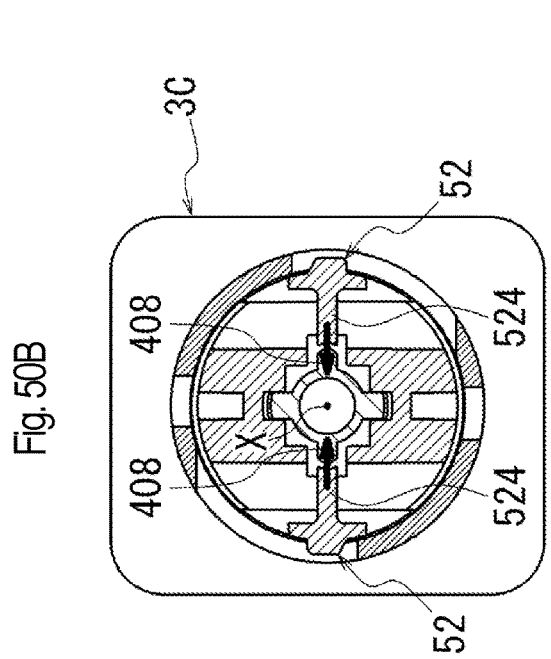
FIG. 50A to FIG. 50D are drawings explaining the installation process of the switch device.
Figure 50D:
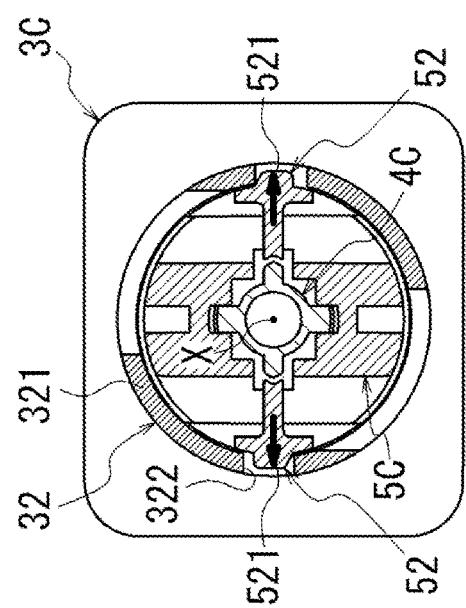
Figure 50A:
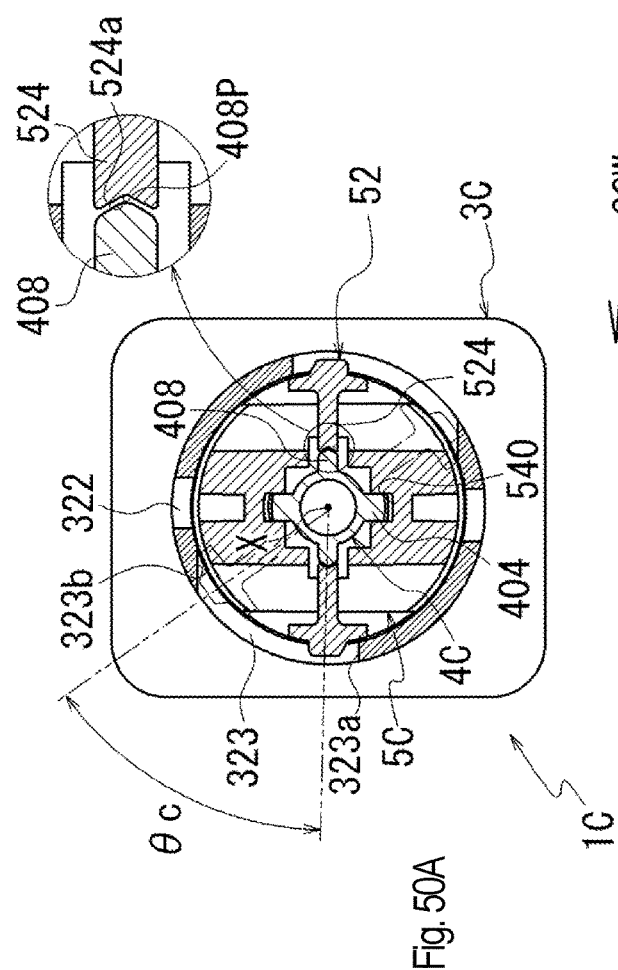
Figure 50C:
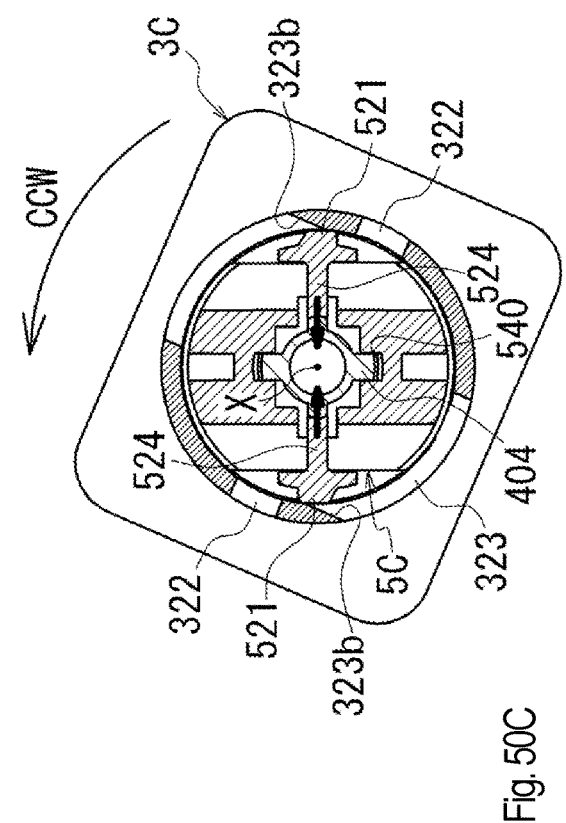

FIG. 50A is a cross section explaining a state before pushing the rod 4C into the main body case 10C. FIG. 50B is a cross section explaining a state where the rod 4C is pushed into the main body case 10C by the predetermined length Lx. FIG. 50C is a cross section explaining a state in the middle of rotating the main body case 10C around the axis line X. FIG. 50D is a cross section at a point where an assembly of attaching the switch device 1C to the bracket 110 is completed.

As illustrated in FIG. 48A, the bracket 110 is provided with the attachment hole 111 having the inner diameter aligning to the outer diameter of the second restriction portion 33 in the main body case 10C, and the recessed grooves 112, 112 through which the engaging portions 332, 332 can pass.

For attaching the switch device 1C to the bracket 110, firstly the positional relation between the rod 4C and the main body case 10C in the switch device 1C is made such that the engaging projection 53 of the lock holder 5c is hidden in the backside of the engaging portions 332, 332 as viewed in the axis line X direction (refer to FIGS. 48B, 48C).

In this state, the second restriction portion 33 in the switch device 1C is inserted in the attachment hole 111 of the bracket 110 to position the first restriction portion 32 to the one side of the bracket 110 in the thickness direction and position the engaging portions 332, 332 to the other side of the bracket 110 in the thickness direction (refer to FIG. 48C).

Then, the abutting portion 326 as the boundary between the first restriction portion 32 and the second restriction portion 33 abuts on the one side of the bracket 110 in the thickness direction to prevent the inclination of the switch device 1C to the bracket 110.

Subsequently the rod 4C is inserted in the main body case 10C for positioning the brake pedal 100 (refer to FIG. 1B).

In a state before inserting the rod 4C in the main body case 10C, the rod 4C is located in the reference position illustrated in FIG. 40B.

In this reference position, the engaging rib 404 of the rod 4C abuts on the restriction wall 330 of the second restriction portion 33 by the urging force of the spring Sp2.

In this state, the displacement restriction rib 408 is positioned in the inner diameter side of the displacement restriction piece 524 to prevent the displacement restriction piece 524 from displacing to the inner diameter side.

The engaging rib 404 of the rod 4C is engaged to the key groove 540 of the lock holder 5C to restrict the relative rotation between the rod 4C and the lock holder 5C having the key groove 540.

Further, the tapered outer peripheral end 408P of the displacement restriction rib 408 is inserted in the recessed portion 524a of the displacement restriction piece 524 to restrict the displacement restriction piece 524 from being shifted in a position in a direction perpendicular to the axis line X (an upper-lower direction in FIG. 50A).

[In a state in FIG. 50A, the locking claw 521 of the lock holder 5C is locked to the guide groove 323 in the cover 3C-side. Since the guide groove 323 is formed with a predetermined length in the circumferential direction around the axis line X, even when the lock holder 5C is restricted from displacing to the inner diameter (the axis line X) side of the displacement restriction piece 524, the lock holder 5C is movable within a constant angle range relative to the cover 3C (the main body case 10C).

Specifically in FIG. 50A the lock holder 5C is relatively rotatable within an angle range ec in which the locking claw 521 of the lock holder 5C is in contact with the one end portion 323a and the other end portion 323b of the guide groove 323 in the circumferential direction around the axis line X.

In the switch device 1C, as illustrated in FIG. 49B, when the rod 4C is pushed into the main body case 10C by the predetermined length Lx, the displacement restriction rib 408 is located in a position out of the inner diameter side of the displacement restriction piece 524 (in a position in the right side out thereof) to allow the displacement of the displacement restriction piece 524 to the inner diameter side.

FIG. 50 B illustrates a state where the displacement restriction rib 408 is located in the depth side of the sheet surface more than the displacement restriction piece 524 and the engaging piece 52 having the displacement restriction piece 524 is displaceable to the axis line X-side.

Therefore in a state in FIG. 50B, when the main body case 10 is rotated around the axis line X (the counterclockwise direction CCW in the figure) from a state in FIG. 50B, the end portion 323b in the guide groove 323-side, as illustrated in FIG. 50C, comes in contact with the locking claw 521 of the engaging piece 52 in the circumferential direction around the axis line X (refer to FIG. 50C).

The engaging piece 52 having the locking claw 521 is flexibly displaceable to the axis line X side (the inner diameter side). Therefore when the main body case 10C is further rotated, the locking claw 521 slides on the inclined surface of the end portion 323b to be displaced to the inner diameter side, whereby the tip end side, which is provided with the locking claw 521, of the engaging piece 52 displaces to the axis line X-side (the inner diameter side).

Thereby the relative rotation around the axis line X between the rod 4C and the lock holder 5C, and the cover 3C (the main body case 10C) continues without being blocked.

The engaging piece 52 is cantilever-supported by the connection portion 502 of the outer periphery of the base portion 50 in the lock holder 5C, and the tip end side, which is provided with the locking claw 521, of the engaging piece 52 is displaceable in the radial direction of the axis line X.

Therefore, when the locking piece 521 runs over the inclined surface of the end portion 323b to the positioning groove 322-side neighbored to the guide groove 323, the locking claw 521 is elastically engaged to the positioning groove 322 (refer to FIG. 50D).

In the process where the cover 3C (the main body case 10C) rotates from a state in FIG. 50A to a state in FIG. 50C, the engaging portions 332, 332 in the main body case 10C-side are displaced from the position of hiding the engaging projection 53 of the lock holder 5C, and finally, reach the position where the engaging portions 332 and the engaging projections 53 are alternately located at intervals of 90 degrees around the axis line X (refer to FIG. 48F to FIG. 48G, and FIG. 49B to FIG. 49C).

Then, as illustrated in FIG. 48D, FIG. 48E, the engaging portions 332, 332 in the main body case 10C-side are located in the angular position out of the recessed groove 112 of the bracket 110, and the engaging portions 332, 332 of the second restriction portion 33 are locked in the peripheral edge of the attachment hole 111 of the bracket 110.

In this state, the bracket 110 is gripped between the engaging portions 332, 332, and the first restriction portion 32 and the abutting portion 326 to complete the attachment of the switch device 1C to the bracket 110.

On this occasion, the movable board 6C in the rotating main body case 10C rotates together with the main body case 10C (refer to FIG. 49B, FIG. 49C).

Thereby the engaging portions 64, 64 in the movable board 6C-side rotating together with the main body case 10C are engaged to the engaging portions 403, 403 of the rod 4C to connect the rod 4C and the movable board 6C.

In this way, in the switch device 1, the rotation of the main body case 10C from the angle position where the locking claw 521 of the lock holder 5C is engaged to the guide groove 323 to the angle position where the locking claw 521 is engaged to the positioning groove 322 is restricted until the rod 4C is pushed into the min body case 10C by the predetermined length Lx. Thereby the rod 4C can be prevented from being positioned in the erroneous position in the axis line direction until the rod 4C is pushed into the main body case 10C by the predetermined length Lx.

At a point where the rod 4C is securely inserted into the main body case 10C by the predetermined length Lx, the tip end side, which is provided with the locking claw 521, of the engaging piece 52 is elastically displaceable to the axis line X side (the inner diameter side).

As a result, the locking claw 521 displaces to the inner diameter side and runs over the end portion 323b of the guide groove 323, thus making it possible to be engaged to the positioning groove 322 neighbored to the guide groove 323. Thereby the main body case 10C enables the locking claw 521 of the lock holder 5C to rotate around the axis line X to the angle position to be engaged to the positioning groove 322.

In this way, after securely inserting the rod 4C in the main body case 10C by the predetermined amount length Lx, the main body case 10C is rotated relative to the rod 4C, making it possible to connect the rod 4C and the movable board 6C. Thereby the rod 4C is movable together with the movable board 6C in the axis line X direction in a state where the rod 4C is correctly positioned in the axis line direction.

As described above, the switch device 1C according to the fourth embodiment has the following configuration.

(10) The switch device 1C comprises:

the rod 4C moving forward/backward in the axis line direction in association with the operation of the brake pedal 100;

the main body case 10C in which the one end 40a-side of the rod 4C in the longitudinal direction is inserted and which supports the rod 4C to be movable in the axis line X direction;

the movable board 6C provided in the main body case 10C to be displaceable in the axis line X direction; and the connecting mechanism configured to connect the rod 4C and the movable board 6C.

In the switch device 1C, the movable board 6C is displaced in the axis line X direction by the forward/backward movement of the rod 4C in the axis line X direction to cause the movable contact point 7 provided in the movable board 6C to be in contact with or to be separate from the fixed contact point 8.

In the switch device 1C, the lock holder 5C (the holder) is provided in the main body case 10C to support the rod 4C to be incapable of rotating relatively and to be movable in the axis line X direction.

The connecting mechanism includes:

the protruding portion 403 (the protruding portion) radially protruding from the outer periphery of the rod 4C; and the engaging portion 64 (the wall portion) provided in the movable board 6C and surrounding the outer periphery of the rod 4C by the interval smaller than the protruding height of the engaging portion 403.

The connecting mechanism is configured such that, when the rod 4C and the main body case 10C is relatively rotated around the axis line X after pushing the rod 4C into the main body case 10C by the predetermined length Lx from the initial position, the screw groove 403a located on the outer periphery of the engaging portion 403 is meshed with the screw groove 64a located on the inner periphery of the engaging portion 64 to connect the rod 4C and the movable board 6C.

In the main body case 10C, the lock holder 5C rotates relative to the main body case 10C within the predetermined angle range from the reference position around the axis line X.

When the lock holder 5C is located in the reference position, the engaging portion 403 (the screw groove 403a) and the engaging portion 64 (the screw groove 64a) are located to be shifted in a phase in the circumferential direction around the axis line X.

The switch device 1C has the fixing mechanism configured to fix the positional relation between the main body case 10C and the lock holder 5C at the time of rotating the lock holder 5C in the predetermined angle range from the reference position around the axis line X.

The fixing mechanism includes:

the engaging piece 52 which is cantilever-supported on the outer periphery of the lock holder 5C and the tip end side of which is flexibly displaceable radially, the tip end side being provided with the locking claw (the engaging claw) 521 on the outer periphery; and the engaging grooves (the positioning groove 322, the guide groove 323) which are provided on the peripheral wall portion 321 surrounding the outer periphery of the lock holder 5C in the main body case 10C and to which the locking claw 521 is engaged.

The engaging groove includes:

the guide groove 323 (the first engaging groove) allowing the relative rotation around the axis line X between the main body case 10C and the lock holder 5C; and the positioning groove 322 (the second engaging groove) blocking the relative rotation around the axis line X between the main body case 10C and the lock holder 5C.

The guide groove 323 and the positioning groove 322 are neighbored to each other to be spaced in the circumferential direction around the axis line X.

The rod 4C is provided with the displacement restriction rib 408 (the rib) blocking the flexible deformation of the engaging piece 52 to the inner diameter side until the rod 4C is pushed into the main body case 10C by the predetermined length Lx (refer to FIGS. 49A, 49B) from the initial position (refer to FIGS. 40A, 40B).

With this configuration, since no another component is present in the connection part between the rod 4C and the movable board 6C, a reduction in manufacturing costs of the switch device 1C is made possible more than in a case of connecting the rod and the movable board using the another component therebetween.

Even when the main body case 10C, the rod 4C and the lock holder 5C are rotated relatively around the axis line X in the process of inserting the rod 4C into the main body case 10C, the displacement restriction rib 408 blocks the movement to the inner diameter side of the locking claw 521 of the engaging piece 52 (refer to FIG. 50A).

Therefore, the locking claw 521 of the engaging piece 52 cannot be engaged to the positioning groove 322 neighbored to the guide groove 323 in the process of inserting the rod 4C from the initial position illustrated in FIGS. 40A, 40B to the predetermined position illustrated in FIGS. 49A, 49B.

That is, in the process of attaching the switch device 1C to the bracket 110, the relative rotation between the main body case 10C, and the rod 4C and the lock holder 5C is allowed until the rod 4C is inserted in the main body case 10C by the predetermined length Lx, but the possible relative rotation range is restricted within a range where the locking claw 521 of the engaging piece 52 is engaged to the guide groove 323.

At a point where the rod 4C is inserted in the main body case 10C by the predetermined length Lx, the main body case 10C, and the rod 4C and the lock holder 5C are configured to be rotatable relatively until the locking claw 521 of the engaging piece 52 is engaged to the positioning groove 322.

When the locking claw 521 of the engaging piece 52 is engaged to the positioning groove 322, the main body case 10C, and the rod 4C and the lock holder 5C cannot rotated relatively, whereby the attaching of the switch device 1C to the bracket 110 is completed.

At the same time therewith, the screw groove 403a located on the outer periphery of the engaging portion 403 is meshed with the screw groove 64a located on the inner periphery of the engaging portion 64, thus connecting the rod 4C and the movable board 6C.

Since the rod 4C and the movable board 6C are not connected until the rod 4C is inserted in the main body case 10C by the predetermined length LX, the switch device 1C is configured not to be attached in the erroneous position.

In this way, before the rod 4C is inserted in the main body case 10C by the predetermined length Lx, even when the main body case 10C, and the rod 4C and the lock holder 5C rotate relatively, the rotation cannot be performed until the locking claw 521 of the engaging piece 52 is engaged to the positioning groove 322 to make it impossible to rotate relatively.

That is, the attachment is not completed until the rod 4C is inserted in the main body case 10C by the predetermined length Lx.

The switch device 1C has the following configuration.

(13) The engaging piece 52 is provided with the displacement restriction piece 524 (the projection piece) protruding to the inner diameter side, on the inner periphery in the position where the locking claw 521 is provided, and the displacement restriction rib 408 is provided in the inner diameter side of the displacement restriction piece 524.

With this configuration, the locking claw 521 of the engaging piece 52 can be appropriately prevented from being engaged to the positioning groove 322 until the rod 4C is inserted in the main body case 10C by the predetermined length Lx.

The switch device 1C has the following configuration.

(14) The recessed portion 524a to which the outer peripheral end 408P (the upper end) of the displacement restriction rib 408 is engaged is provided in the end portion of the displacement restriction piece 524 in the inner diameter side.

As viewed in the axis line X direction, the recessed portion 524a is formed in such a shape that the width in the circumferential direction around the axis line X is wider as progress toward the inner diameter side.

As viewed in the axis line direction, the outer peripheral end 408P of the displacement restriction rib 408 is formed in a tapered shape such that the width in the peripheral direction around the axis line X becomes narrower as progress toward the outer peripheral side.

With this configuration, the recessed portion 524a of the displacement restriction piece 524 and the displacement restriction rib 408 act as guides when the rod 4C and the lock holder 5C move relative to each other in the axis line X direction.

The switch device 1C has the following configuration.

(15) The relative rotation between the lock holder 5C and the main body case 10C (the cover 3C) is allowed within the angle range ec (refer to FIG. 50A) to the guide groove 323 (the first engaging groove) until the rod 4C is pushed into the main body case 10C by the predetermined length Lx from the initial position.

With this configuration, at the time of attaching the switch device 1C to the bracket 110, the load (the load in a torsional direction) acting on the periphery of the main body case 10C is reduced more than in a case where the relative rotation between the rod and the lock holder, and the main body case is completely restricted.

While only the selected embodiment and modifications have been chosen to illustrate the present invention, it will be apparent to those skilled in the art from this disclosure that various changes and modifications can be made therein without departing from the scope of the invention as defined in the appended claims. Furthermore, the foregoing descriptions of the embodiment and the modifications according to the present invention are provided for illustration only, and not for the purpose of limiting the invention as defined by the appended claims and their equivalents.

What is claimed is:

1. A switch device comprising:
   a rod movable forward/backward along an axis line in an axis line direction in association with an operation of a brake pedal;

a main body case in which one end side of the rod in a longitudinal direction is disposed and which supports the rod such that the rod is movable in the axis line direction;

a movable board disposed in the main body case such that the movable board is displaceable in the axis line direction;

a connecting mechanism configured to connect the rod and the movable board;

the movable board displaceable in the axis line direction via the forward/backward movement of the rod in the axis line direction such that a movable contact point provided in the movable board is in contact with or separate from a fixed contact point;

a holder disposed in the main body case to support the rod to be incapable of rotating relatively and to be movable in the axis line direction;

the connecting mechanism including:
 a protruding portion radially protruding from an outer periphery of the rod; and
 a wall portion provided in the movable board and surrounding the outer periphery of the rod, the wall portion configured such that, when the rod is rotated around the axis line after pushing the rod into the main body case by a predetermined length from an initial position, a tooth portion disposed on an outer periphery of the protruding portion is meshed with a tooth portion disposed on an inner periphery of the wall portion connecting the rod and the movable board;

wherein, in the main body case, the holder is rotatable relative to the main body case within a predetermined angle range from a reference position around the axis line; and wherein, when the holder is located in the reference position, the protruding portion and the wall portion are disposed to be shifted in a phase in a circumferential direction around the axis line.

2. The switch device according to claim 1, further comprising a fixing mechanism configured to fix a positional relation between the main body case and the holder at a time of rotating the holder from the reference position around the axis line by the predetermined angle range.

3. The switch device according to claim 2, wherein the fixing mechanism includes:
 an engaging piece which is cantilever-supported on an outer periphery of the holder, the engaging piece having a tip end side which is flexibly displaceable radially, the tip end side including an engaging claw on the outer periphery;
 an engaging hole disposed on a peripheral wall portion surrounding the outer periphery of the holder in the main body case, the engaging claw engaged in the engaging hole until the rod is pushed into the main body case by the predetermined length from the initial position to block a relative rotation around the axis line between the main body case and the holder;
 an engaging groove disposed on the peripheral wall portion surrounding the outer periphery of the holder in the main body case, the engaging claw engaged in the engaging groove when the rod is pushed into the main body case by the predetermined length from the initial position to facilitate the relative rotation around the axis line between the main body case and the holder;
 the engaging hole and the engaging groove disposed spaced apart from one another in the axis line direction; and
 wherein the rod includes a cam blocking a flexible deformation of the engaging piece to an inner diameter side until the rod is pushed into the main body case by the predetermined length from the initial position.

4. The switch device according to claim 3, wherein the engaging groove includes:
 a first engaging groove facilitating the relative rotation around the axis line between the main body case and the holder; and
 a second engaging groove blocking the relative rotation around the axis line between the main body case and the holder;
 the first engaging groove and the second engaging groove disposed adjacent to each other and spaced apart from one another in the circumferential direction around the axis line.

5. The switch device according to claim 4, wherein:
 the rod includes an attachment portion to which the cam is removably attached;
 the holder includes a locking portion configured to be locked in the cam; and
 at a point where the rod is pushed into the main body case by the predetermined length from the initial position, the cam is detached from the attachment portion by the locking portion.

6. The switch device according to claim 3, wherein:
 the rod includes an attachment portion to which the cam is removably attached;
 the holder includes a locking portion configured to be locked in the cam; and
 the cam is detached from the attachment portion by the locking portion at a point where the rod is pushed into the main body case by the predetermined length from the initial position.

7. The switch device according to claim 2, wherein the fixing mechanism includes:
 an engaging piece which is cantilever-supported on an outer periphery of the holder, the engaging piece having a tip end side which is flexibly displaceable radially, the tip end side including an engaging claw on the outer periphery;
 an engaging groove disposed on a peripheral wall portion, which surrounds the outer periphery of the holder, in the main body case and in which the engaging claw is engaged;
 the engaging groove including:
 a first engaging groove facilitating a relative rotation around the axis line between the main body case and the holder; and
 a second engaging groove blocking the relative rotation around the axis line between the main body case and the holder, the first engaging groove and the second engaging groove disposed adjacent to each other and spaced apart from one another in the circumferential direction around the axis line.

8. The switch device according to claim 7, wherein the rod includes a displacement restriction rib blocking a flexible deformation of the engaging piece to an inner diameter side until the rod is pushed into the main body case by the predetermined length from the initial position.

9. The switch device according to claim 8, wherein the engaging piece includes a protruding piece protruding to the inner diameter side, the protruding piece disposed on an inner periphery in a region of the engaging claw, and wherein the displacement restriction rib is disposed in the inner diameter side of the protruding piece.

10. The switch device according to claim 9, wherein an end portion of the protruding piece in the inner diameter side includes a recessed portion in which an upper end of the displacement restriction rib is engaged.

11. The switch device according to claim 10, wherein the relative rotation between the main body case and the holder is facilitated within an angle range of the first engaging groove until the rod is pushed into the main body case by the predetermined length from the initial position.

12. The switch device according to claim 9, further comprising:
a rib protruding to a radial outside from the outer periphery of the rod; and
a key groove disposed in the main body case and in which the rib is engaged;
wherein, as viewed in the axis line direction, the key groove extends within an angle range below an angle range of the first engaging groove around the axis line; and
wherein the key groove has a predetermined length in the axis line direction and restricts the relative rotation around the axis line between the main body case and the holder within the angle range of the first engaging groove when the rib is arranged in the key groove.

13. The switch device according to claim 12, wherein:
an end portion of the protruding piece in the inner diameter side includes a recessed portion;
as viewed in the axis line direction, the recessed portion is shaped such that a width in the circumferential direction around the axis line widens in a direction toward the inner diameter side; and
as viewed in the axis line direction, the displacement restriction rib has a tapered shape such that a width in the circumferential direction around the axis line narrows in a direction toward an outer peripheral side.

14. The switch device according to claim 13, wherein the relative rotation around the axis line between the main body case and the holder is facilitated within an angle range of the first engaging groove until the rod is pushed into the main body case by the predetermined length from the initial position.

15. The switch device according to claim 8, further comprising:
a rib protruding to a radial outside from the outer periphery of the rod; and
a key groove disposed in the main body case and in which the rib is engaged;
wherein, as viewed in the axis line direction, the key groove extends within an angle range below an angle range of the first engaging groove around the axis line; and
wherein the key groove has a predetermined length in the axis line direction and restricts the relative rotation around the axis line between the main body case and the holder within the angle range of the first engaging groove when the rib is arranged in the key groove.

16. The switch device according to claim 15, wherein:
the engaging piece includes a protruding piece protruding to the inner diameter side;
an end portion of the protruding piece in the inner diameter side includes a recessed portion;
as viewed in the axis line direction, the recessed portion is shaped such that a width in the circumferential direction around the axis line widens in a direction toward the inner diameter side; and
as viewed in the axis line direction, the displacement restriction rib has a tapered shape such that a width in the circumferential direction around the axis line narrows in a direction toward an outer peripheral side.

17. The switch device according to claim 7, further comprising a rotation restriction mechanism configured to restrict a relative rotation around the axis line between the rod and the main body case until the rod is pushed into the main body case from the initial position by the predetermined length.

18. The switch device according to claim 17, wherein the rotation restriction mechanism includes:
a rib protruding to a radial outside from the outer periphery of the rod; and
a key groove disposed in the main body case and in which the rib is engaged, the key groove having a predetermined length in the axis line direction and restricting the relative rotation around the axis line between the rod and the main body case when the rib is arranged in the key groove.

19. The switch device according to claim 1, further comprising a rotation restriction mechanism configured to restrict a relative rotation around the axis line between the rod and the main body case until the rod is pushed into the main body case from the initial position by the predetermined length.

20. The switch device according to claim 19, wherein the rotation restriction mechanism includes:
a rib protruding to a radial outside from the outer periphery of the rod; and
a key groove disposed in the main body case and in which the rib is engaged, the key groove having a predetermined length in the axis line direction and restricting the relative rotation between the rod and the main body case when the rib is arranged in the key groove.

* * * * *